United States Patent
Yang et al.

(10) Patent No.: US 12,156,022 B2
(45) Date of Patent: Nov. 26, 2024

(54) DATA TRANSMISSION METHOD, TERMINAL DEVICE, AND NETWORK DEVICE

(71) Applicant: HUAWEI TECHNOLOGIES CO., LTD., Shenzhen (CN)

(72) Inventors: Chenchen Yang, Santa Clara, CA (US); Huan Li, Shenzhen (CN); Yinghao Jin, Boulogne Billancourt (FR); Feng Han, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 382 days.

(21) Appl. No.: 17/672,177

(22) Filed: Feb. 15, 2022

(65) Prior Publication Data

US 2022/0174575 A1    Jun. 2, 2022

Related U.S. Application Data

(63) Continuation of application No. PCT/CN2020/108320, filed on Aug. 11, 2020.

(30) Foreign Application Priority Data

Aug. 16, 2019 (CN) .......................... 201910760501.2
Aug. 30, 2019 (CN) .......................... 201910811311.9

(51) Int. Cl.
*H04W 76/20* (2018.01)
*H04W 76/27* (2018.01)
*H04W 84/04* (2009.01)

(52) U.S. Cl.
CPC ........... *H04W 76/20* (2018.02); *H04W 76/27* (2018.02); *H04W 84/042* (2013.01)

(58) Field of Classification Search
CPC ..... H04W 36/32; H04W 36/14; H04W 76/20; H04W 84/042; H04W 40/36; H04W 36/0016; H04W 76/11; H04W 36/0058; H04W 76/27
USPC .......................................... 370/331
See application file for complete search history.

(56) References Cited

U.S. PATENT DOCUMENTS

| | | | |
|---|---|---|---|
| 2018/0317137 A1* | 11/2018 | Loehr | H04L 1/1614 |
| 2018/0352483 A1* | 12/2018 | Youn | H04W 36/00 |
| 2019/0394698 A1* | 12/2019 | Jeong | H04W 36/08 |
| 2022/0007180 A1* | 1/2022 | Liao | H04L 67/14 |
| 2022/0109991 A1* | 4/2022 | Fujishiro | H04W 48/16 |

OTHER PUBLICATIONS

Suman Deswal et al., A Vertical Handover Algorithm in Integrated Macrocell Femtocell Networks. International Journal of Electrical and Computer Engineering (IJECE), vol. 7, No. 1, Feb. 2017, pp. 299-308.

(Continued)

*Primary Examiner* — Mang Hang Yeung
(74) *Attorney, Agent, or Firm* — HAUPTMAN HAM, LLP

(57) ABSTRACT

In a data transmission method, a terminal device determines a first message, where the first message indicates that the terminal device is to move from a first network to a second network. The terminal device sends the first message to a first network device in the first network. The first network device is an access and mobility management function network element or an access network device.

20 Claims, 30 Drawing Sheets

(56) References Cited

OTHER PUBLICATIONS

3GPP TS 23.501 V16.1.0 (Jun. 2019), 3rd Generation Partnership Project; Technical Specification Group Services and System Aspects; System Architecture for the 5G System; Stage 2(Release 16), 367 pages.
CATT, RRC procedure in NR. TSG-RAN WG2 Meeting #97bis, Spokane, USA, Apr. 3-7, 2017, R2-1703103, 5 pages.
Extended European Search Report issued in corresponding European Application No. 20854665.5, dated Sep. 14, 2022, pp. 1-11.

* cited by examiner

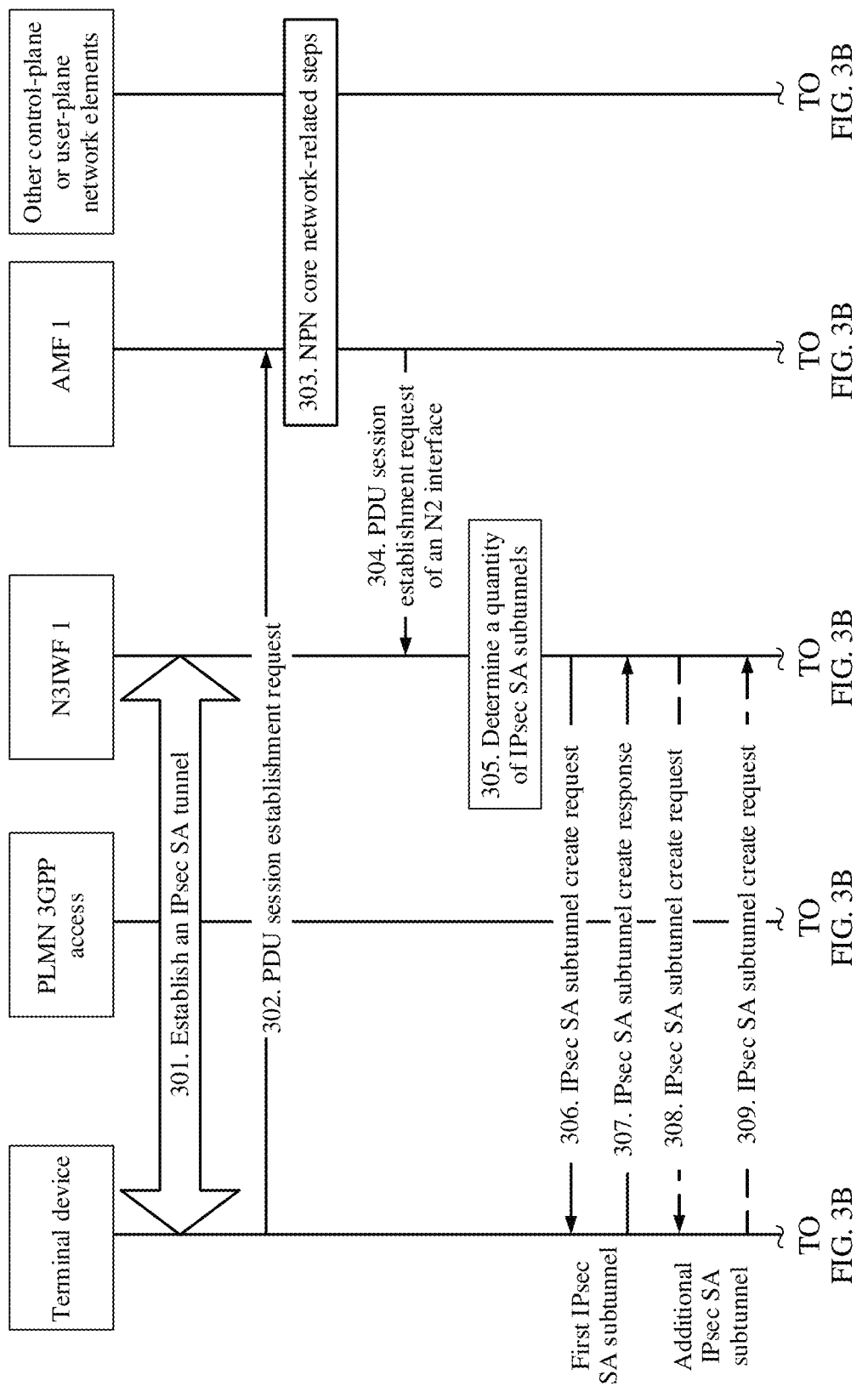

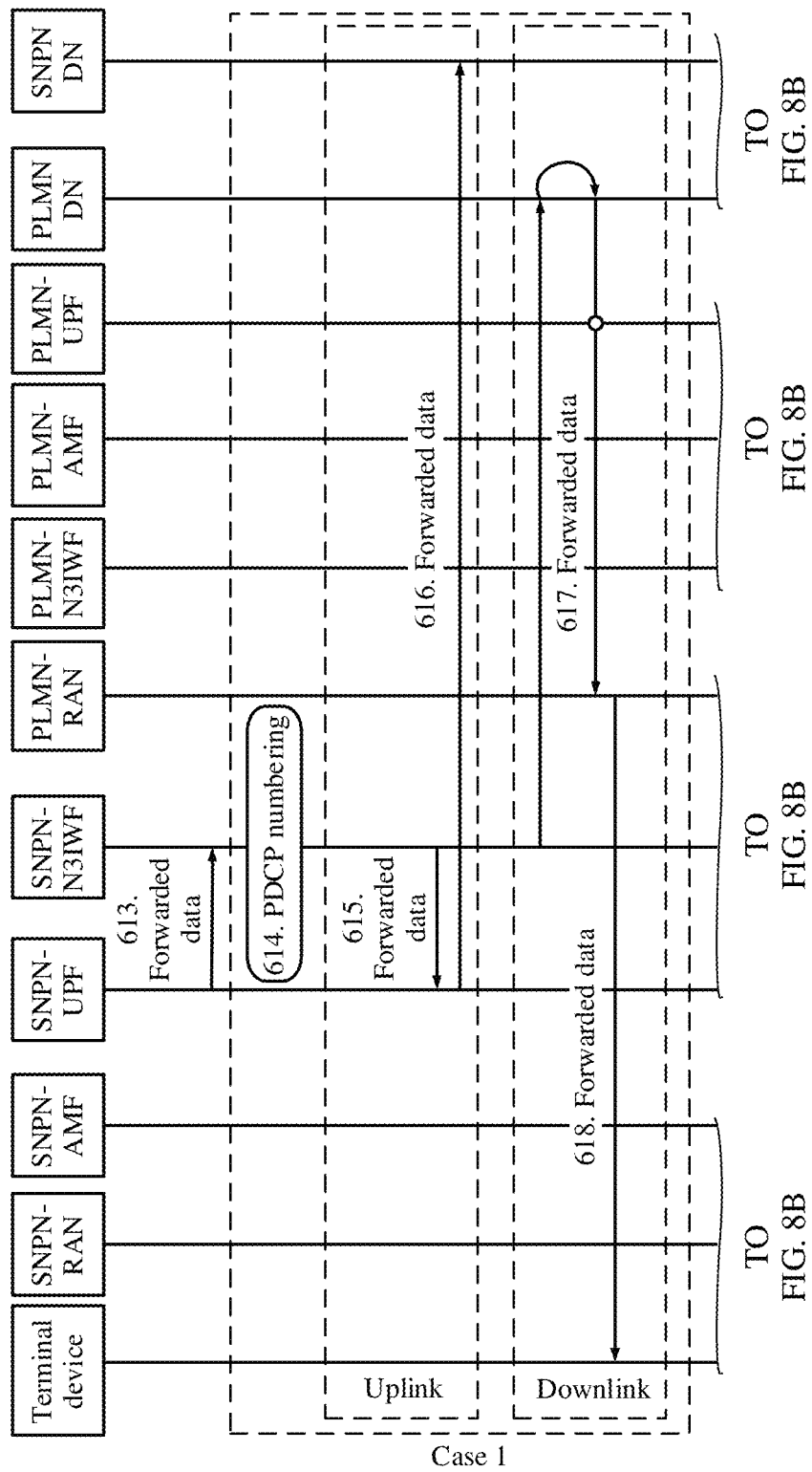

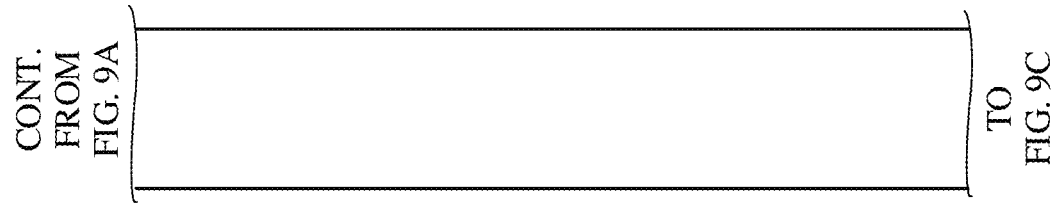
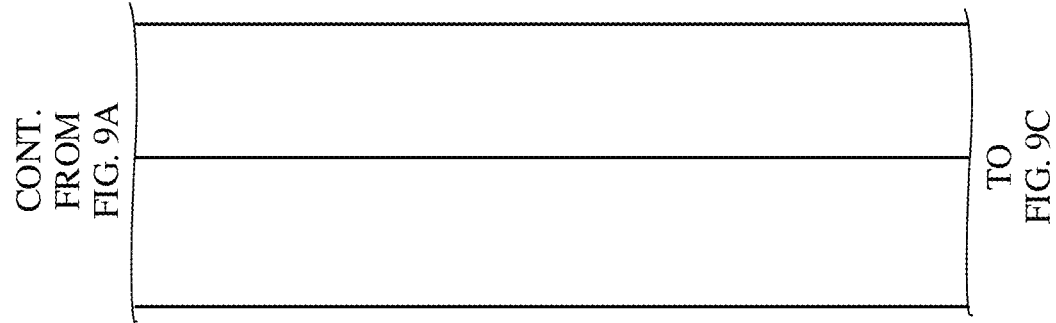
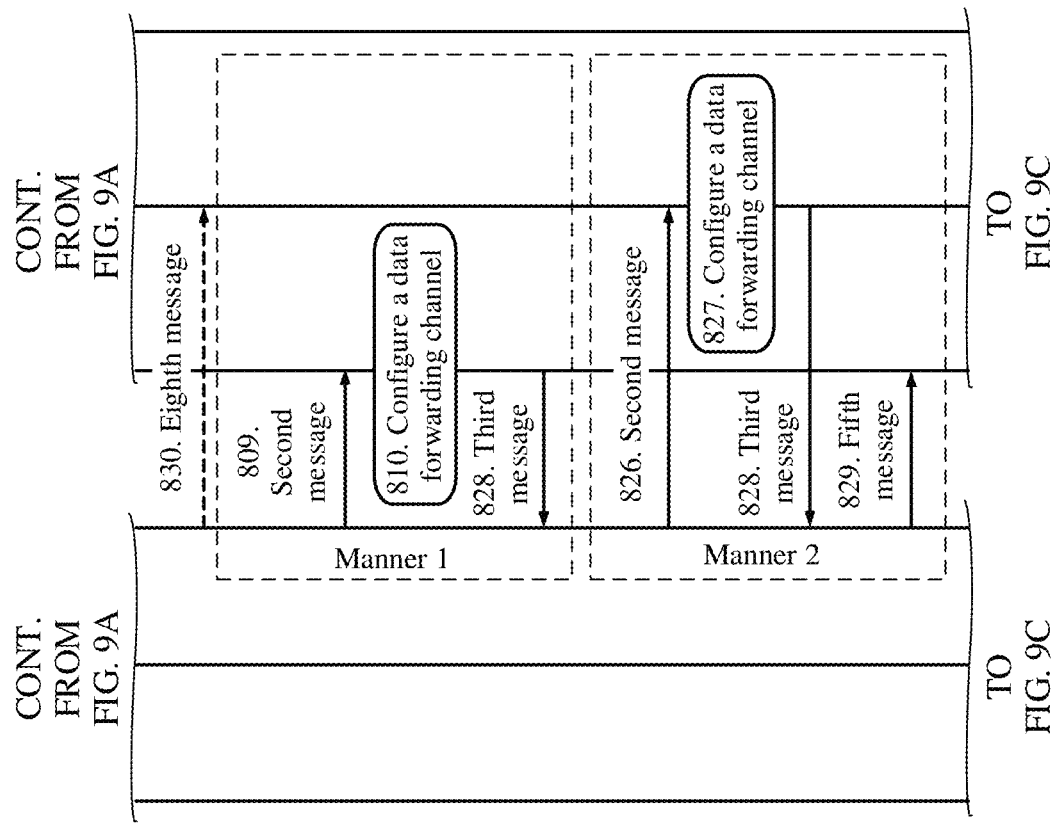
FIG. 9B

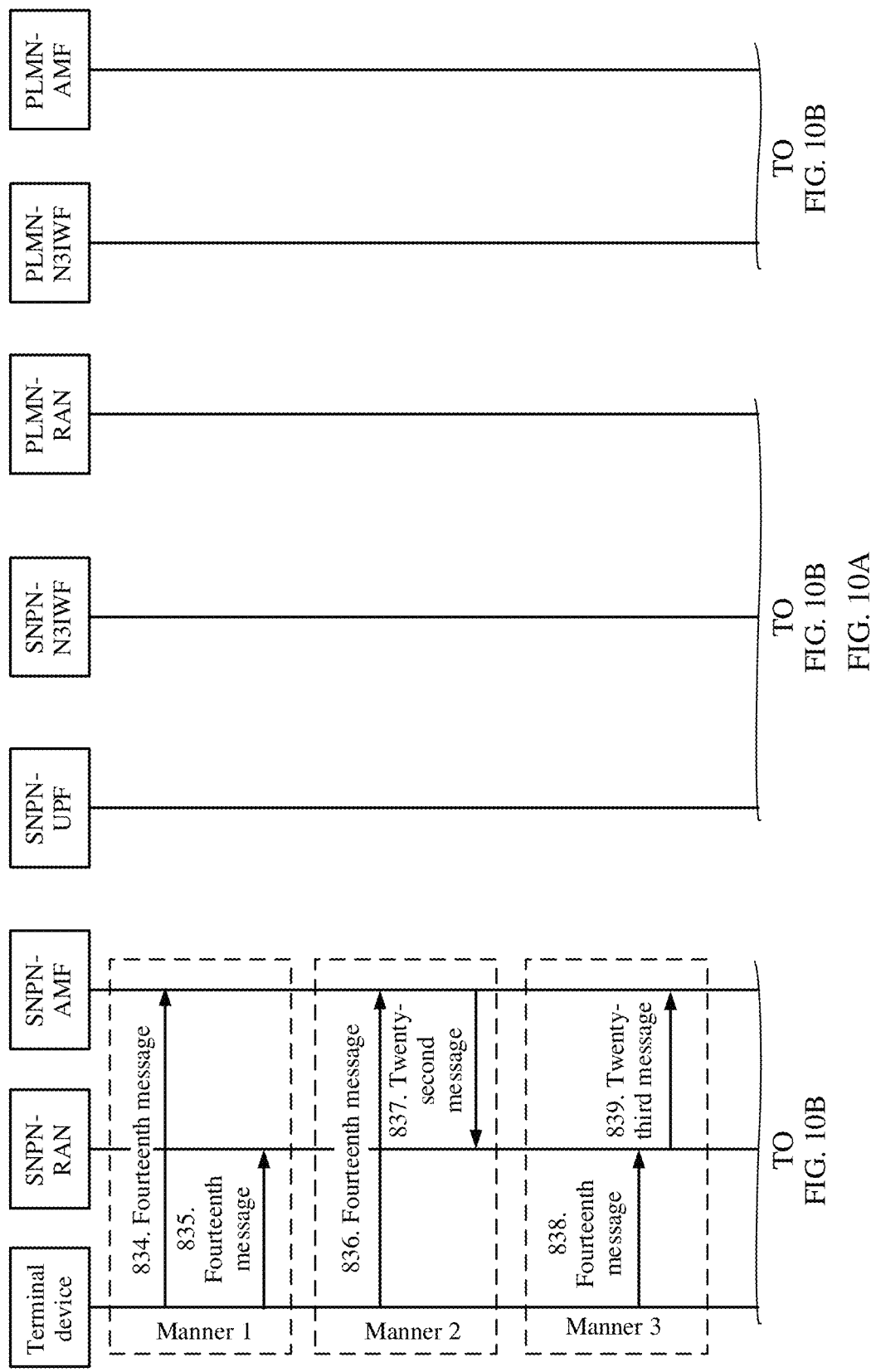

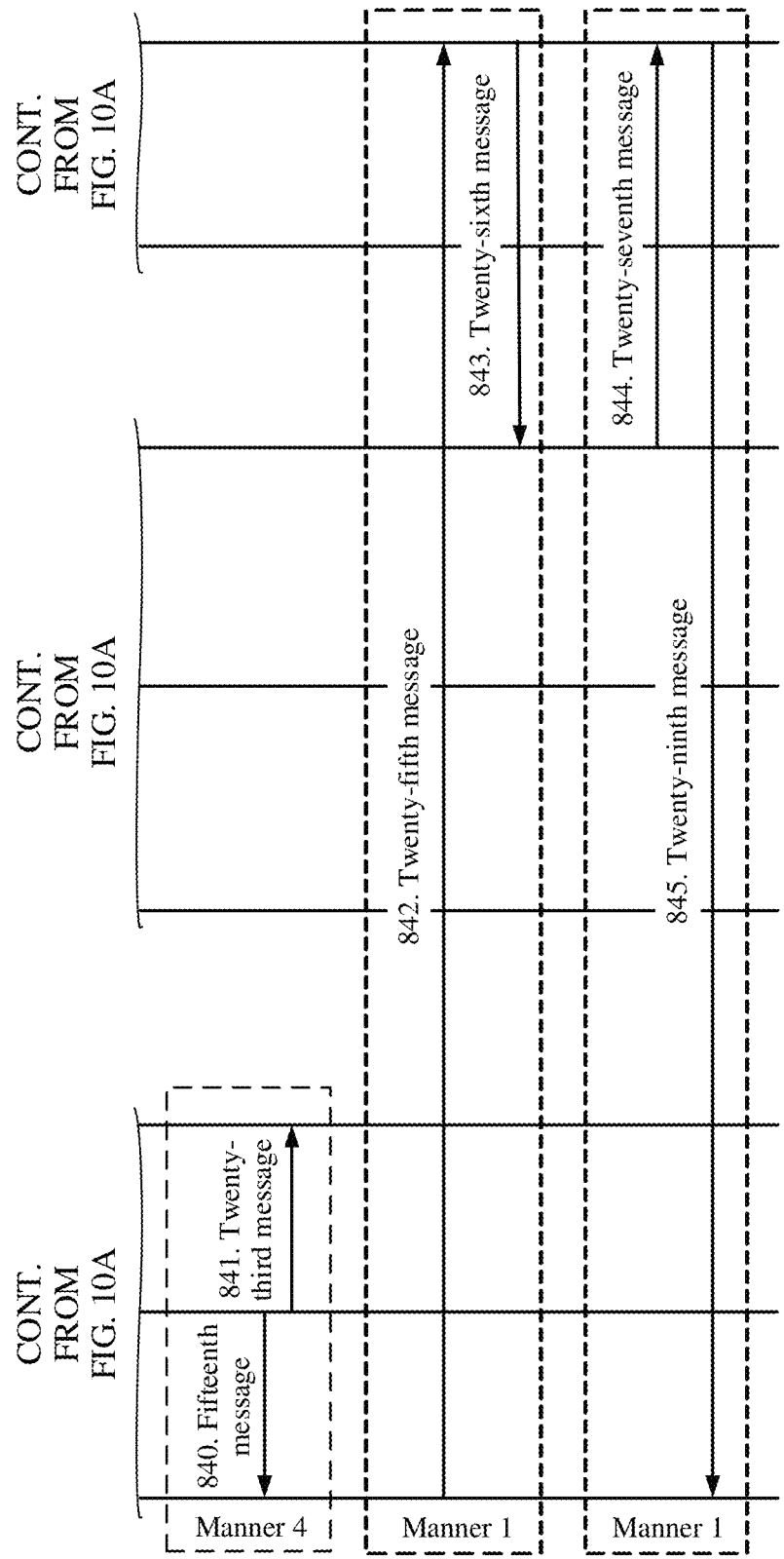

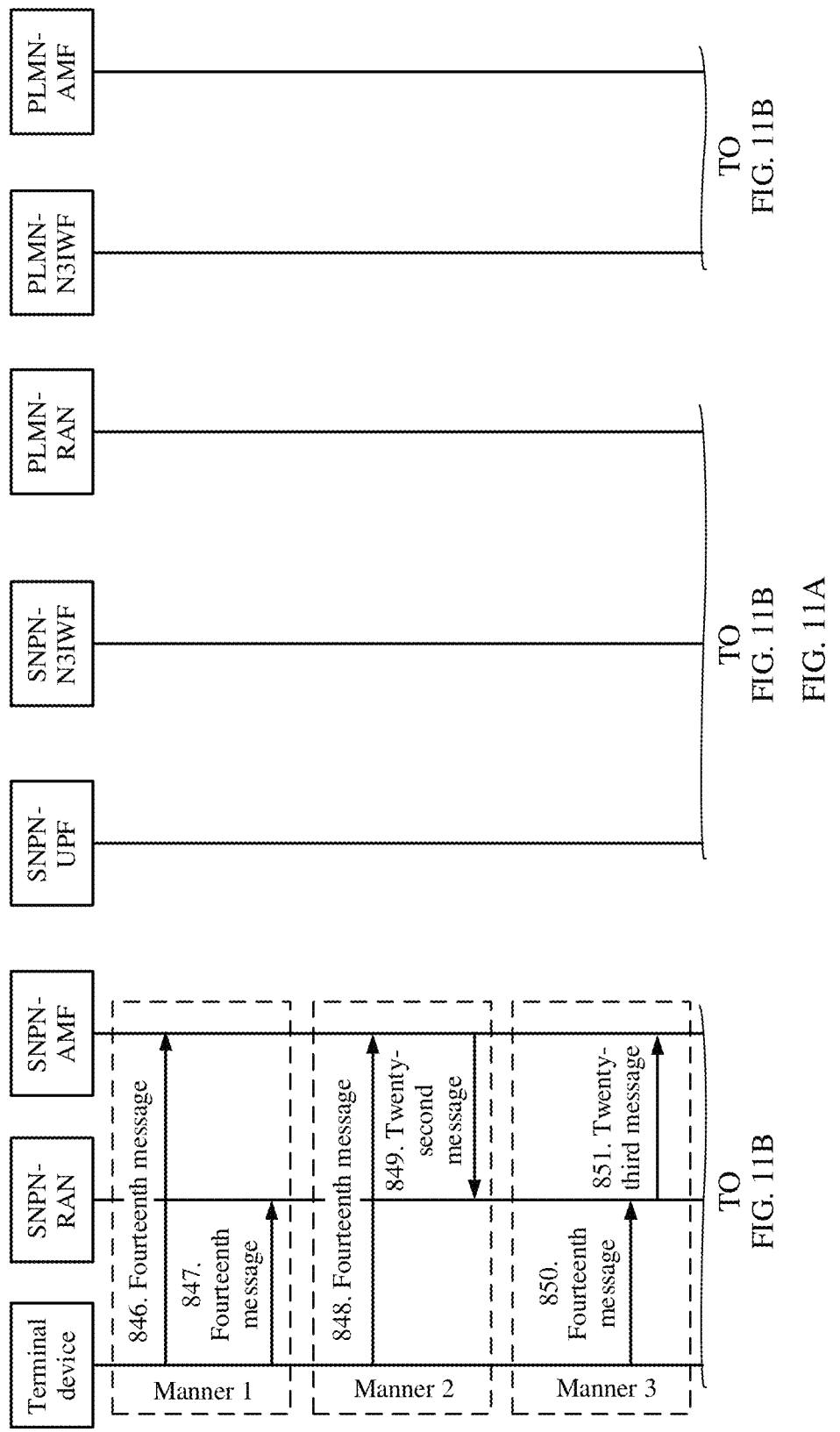

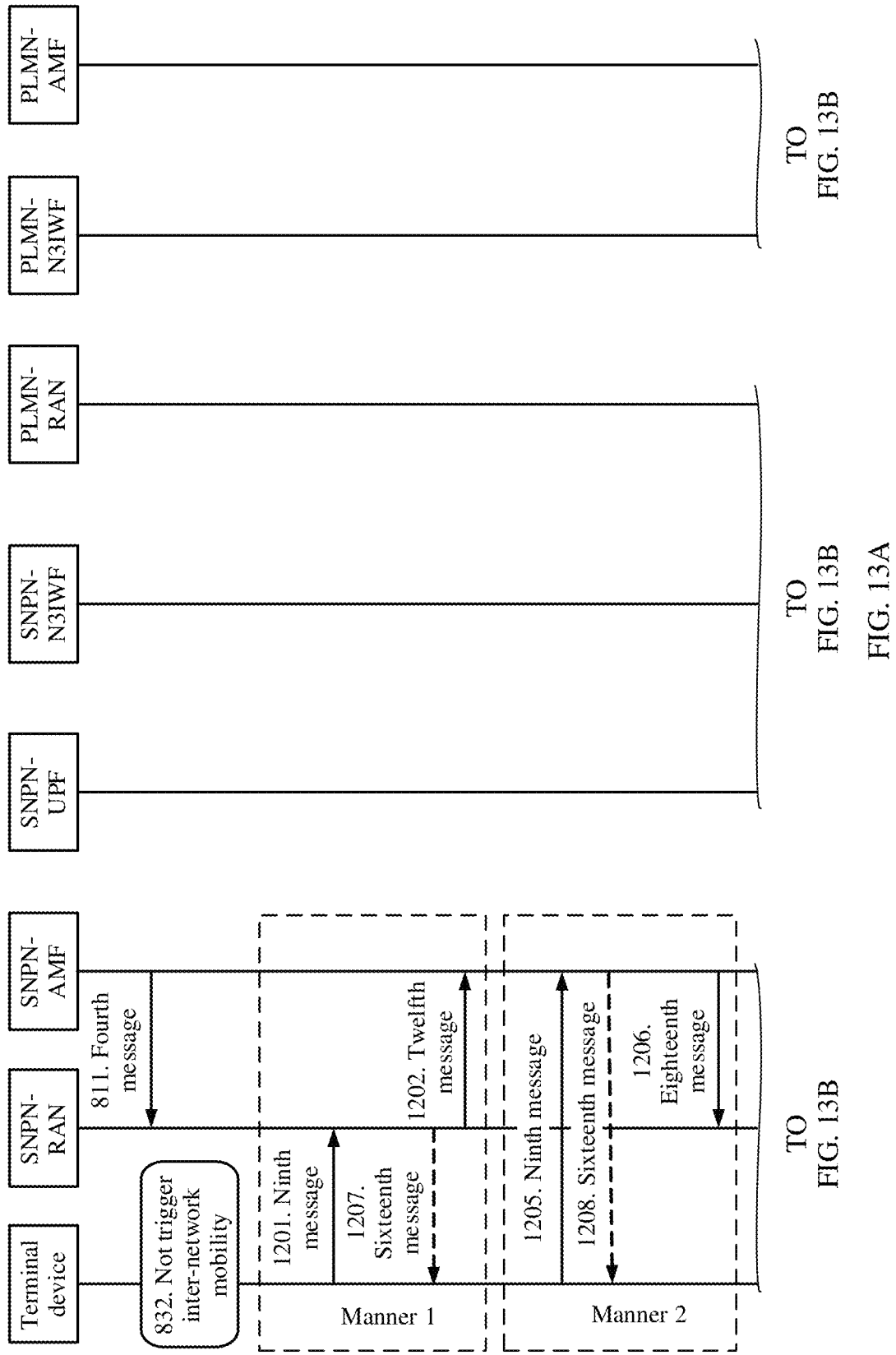

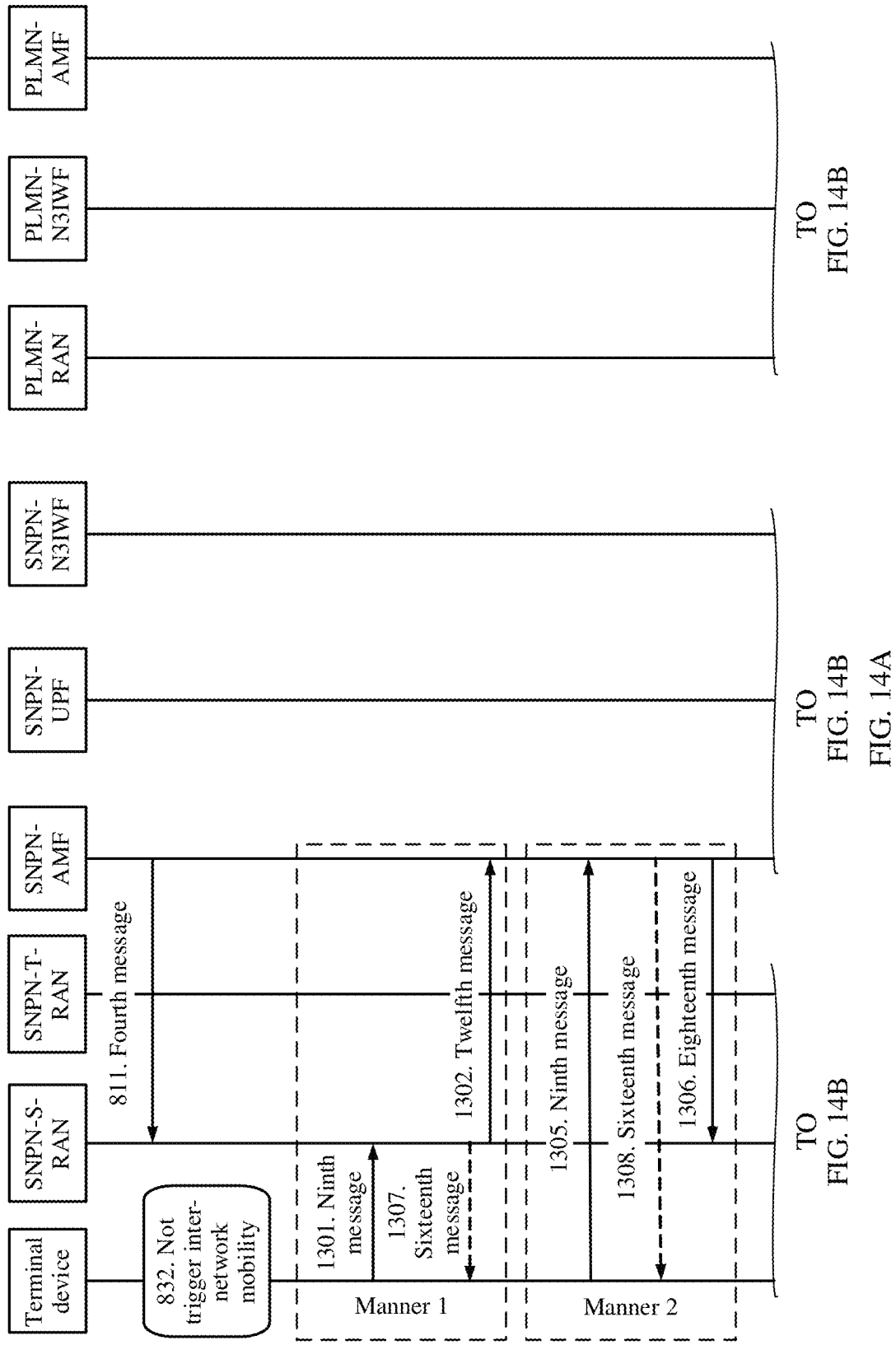

DATA TRANSMISSION METHOD, TERMINAL DEVICE, AND NETWORK DEVICE

CROSS-REFERENCE TO RELATED APPLICATIONS

This application is a continuation of International Application No. PCT/CN2020/108320, filed on Aug. 11, 2020, which claims priority to Chinese Patent Application No. 201910811311.9, filed on Aug. 30, 2019, and Chinese Patent Application No. 201910760501.2, filed on Aug. 16, 2019. The disclosures of the aforementioned applications are hereby incorporated by reference in their entireties.

TECHNICAL FIELD

This application relates to the communication field, and more specifically, to a data transmission method, a terminal device, and a network device.

BACKGROUND

A non-public network (NPN)/private network is a network being discussed in the 3rd generation partnership project (3GPP) 5th generation (5G) standard. Different from a conventional cellular network, the NPN network allows only users with specific rights to access the network. The NPN network has two networking modes: standalone and non-standalone, and is referred to as a standalone NPN (SNPN) network and a public network integrated NPN (PNI-NPN) network. The standalone NPN network may be considered as a non-3GPP network.

FIG. 1 shows a network architecture that includes both the NPN network and a public land mobile network (PLMN) network. FIG. 1 uses the SNPN in the NPN network as an example. A first network is the SNPN network, and a second network is the PLMN network. As shown in FIG. 1, the SNPN network and the PLMN network each have an independent radio access network (RAN) and an independent core network. The core networks of the SNPN network and the PLMN network are connected via a non-3GPP interworking function (N3IWF) network element. The core networks can communicate with each other via the N3IWF network element in a user plane and a control plane.

In the network architecture shown in FIG. 1, when a terminal device moves within a network, that is, a source access network device and a target access network device both belong to the SNPN network or both belong to the PLMN network, the target access network device and the source access network device exchange information. After the target access network device establishes a session resource for the terminal device, the source access network device indicates the terminal device to perform handover. The source access network device and the target access network device may alternatively forward downlink data or uplink data to the target access network device in an NG-based or Xn-based manner, so as to ensure service continuity of the terminal device. The downlink data has been transmitted to the source access network device but has not been sent to the terminal device, and the uplink data has been sent to a core network device.

However, in the network architecture shown in FIG. 1, the terminal device may alternatively move across networks, that is, move from the SNPN network to the PLMN network or move from the PLMN network to the SNPN network. In this case, the source access network device and the target access network device belong to different networks. In this case, because there is no direct interface between the access network of the SNPN network and the access network of the PLMN network, a network side does not know the mobility of the terminal device, and cannot process a related session in time.

Therefore, in a scenario in which the terminal device may move across networks, how to notify the network side of the mobility of the terminal device becomes an urgent problem to be resolved.

SUMMARY

This application provides a data transmission method and apparatus, so that a network side can learn of mobility of a terminal device.

According to a first aspect, this application provides a data transmission method. The method includes: A terminal device determines a first message, where the first message is used to indicate that the terminal device is to move from a first network to a second network. The terminal device sends the first message to a first network device. The first network device is a network element in the first network, and the first network device is an access and mobility management function AMF network element or an access network device.

Optionally, the first network is an SNPN network, and the second network is a PLMN network or a PNI-NPN network.

Optionally, the first network is a PNI-NPN network, and the second network is a PLMN network or an SNPN network.

Optionally, the first network is a PLMN network, and the second network is a PNI-NPN network or an SNPN network.

Optionally, the first network is an SNPN network, the second network is an SNPN network, and network identities (IDs) of the first network and the second network are different.

Optionally, the first network is a PNI-NPN network, the second network is a PNI-NPN network, and network IDs of the first network and the second network are different.

Optionally, the first network is a PLMN network, the second network is a PLMN network, and network IDs of the first network and the second network are different.

Optionally, the first network is a non-3GPP network, the second network is a non-3GPP network, and network IDs of the first network and the second network are different.

It should be understood that a scenario in which the terminal device moves across networks from the first network to the second network is not limited in this application. For example, the terminal device may move in an inter-network cell reselection process, or the terminal device may move in an inter-network cell handover process.

It should be further understood that, "the terminal device moves from the first network to the second network" may alternatively be described as: "the terminal device performs reselection from the first network to the second network", "the terminal device is handed over from the first network to the second network", or the like.

It should be further understood that cell reselection in this application is different from cell reselection performed by a conventional terminal device in an idle state. The cell reselection in this application is that the terminal device in a connected state autonomously decides to perform inter-network cell "handover", instead of being controlled by a network side to perform cell "handover". That is, the cell reselection in this application is different from the conventional cell reselection and handover process and may also be referred to as another term, for example, inter-network autonomous handover.

In the foregoing technical solution, when the terminal device is to move across networks, the terminal device actively reports to the network side that the terminal device is to move across networks, so that the network side can: for example, reserve a context of the terminal device, stop data transmission of the terminal device in time, and preconfigure a data forwarding resource in time. According to the foregoing technical solution, the network side can learn of mobility of the terminal device, and perform corresponding session processing in time.

In a possible implementation, the first message is further used to indicate, to the first network device, a connection management status or a radio resource control status of the terminal device in the first network. The connection management status includes a connection management connected state and a connection management idle state, and the radio resource control status includes a radio resource control connected state, a radio resource control idle state, and a radio resource control inactive state.

In a possible implementation, the method further includes: The terminal device sends a fourteenth message to the first network device, where the fourteenth message is used to indicate, to the first network device, a connection management status or a radio resource control status of the terminal device in the first network. The connection management status includes a connection management connected state and a connection management idle state, and the radio resource control status includes a radio resource control connected state, a radio resource control idle state, and a radio resource control inactive state.

It may be understood that the terminal device may indicate the connection management status or the radio resource control status of the terminal device in the first network by including an indication identifier in the first message or the fourteenth message, or by using the message. For example, the foregoing message is a radio resource control release (RRC release) message, a proximity indication, an uplink information transfer (UL information transfer) indication, a measurement report, a radio resource control setup request (RRC setup request) message, a radio resource control setup complete (RRC setup complete) message, a radio resource control reestablishment request (RRC reestablishment request) message, a radio resource control reestablishment complete (RRC reestablishment complete) message, a radio resource control resume request (RRC resume request) message, a radio resource control reconfiguration complete (RRC reconfiguration complete) message, a location measurement indication, or other newly defined signaling.

It may be understood that the terminal device not only performs an information exchange process with the first network, but also needs the information and needs to perform the information exchange process with the second network.

In the foregoing technical solution, when reporting to the network side that the terminal device is to move from the first network to the second network or after reporting to the network side that the terminal device is to move from the first network to the second network, the terminal device may further notify the network side of the connection management status or the radio resource control status. In this way, the network side can correctly process the context. For example, the terminal device reports, to the network side, that the radio resource control status of the terminal device in the first network is the radio resource control inactive state. In this case, the network side may store a context corresponding to the terminal device, so as to quickly establish or resume a connection to the terminal device when the terminal device does not leave the first network or returns to the first network.

It can be learned that, in the foregoing technical solution, the terminal device determines the connection management status and the radio resource control status, and then reports the connection management status and the radio resource control status to the network side.

In a possible implementation, the method further includes: The terminal device receives a fifteenth message from the first network device, where the fifteenth message is used to indicate, to the terminal device, a connection management status or a radio resource control status of the terminal device in the first network. The connection management status includes a connection management connected state and a connection management idle state, and the radio resource control status includes a radio resource control connected state, a radio resource control idle state, and a radio resource control inactive state.

It may be understood that the first network device may indicate the connection management status or the radio resource control status of the terminal device in the first network by including an indication identifier in the fifteenth message, or by using the message. For example, the foregoing message is a radio resource control release (RRC release) message, a proximity indication, a downlink information transfer (DL information transfer) indication, a measurement configuration, a radio resource control setup (RRC setup) message, a radio resource control reestablishment (RRC reestablishment) message, a radio resource control resume (RRC resume) message, a radio resource control reconfiguration (RRC reconfiguration) message, a location measurement indication, or other newly defined signaling.

It may be understood that the terminal device not only performs an information exchange process with the first network, but also needs the information and needs to perform the information exchange process with the second network.

In the foregoing technical solution, after reporting to the network side that the terminal device is to move from the first network to the second network, the terminal device may further determine, based on a network-side indication, the connection management status or the radio resource control status of the terminal device in the first network after the terminal device moves. For example, the network side indicates that the radio resource control status of the terminal device in the first network is the radio resource control inactive state, and the terminal device knows that the network side stores the context corresponding to the terminal device. When the terminal device does not leave the first network or returns to the first network, the terminal device may quickly establish or resume a connection to the network side.

It can be learned that, in the foregoing technical solution, the network side determines the connection management status and the radio resource control status, and then indicates the connection management status and the radio resource control status to the terminal device.

In a possible implementation, the first message is further used to indicate at least one of information about forwarded data or a cause for data forwarding.

In a possible implementation, the information about the forwarded data includes at least one of the following information: a protocol data unit PDU session identifier, a quality of service QoS flow identifier, a data radio bearer DRB identifier, a mapping list between a DRB and a QoS flow, and transmission status information of data on the DRB, or the cause for data forwarding includes inter-network mobility.

In a possible implementation, the method further includes: The terminal device sends a ninth message to the first network device, where the ninth message is used to indicate that the terminal device has not moved from the first network to the second network. Alternatively, the terminal device sends a tenth message to the first network device, where the tenth message is used to indicate that the terminal device has moved from the first network to the second network.

Optionally, the ninth message and the tenth message each may be a radio resource control resume request (RRC resume request) message, a radio resource control setup request (RRC setup request) message, a radio resource control setup complete (RRC setup complete) message, a radio resource control reestablishment request (RRC reestablishment request) message, an uplink information transfer (UL information transfer) message, and the like.

In a possible implementation, after the terminal device sends the ninth message or the tenth message to the first network device, the method further includes: The terminal device receives a sixteenth message from the first network device, where the sixteenth message is a response message of the ninth message, and the sixteenth message is used to indicate the terminal device to perform at least one of the following operations in the first network: performing RRC resume, performing RRC reestablishment, performing RRC release, changing or maintaining the connection management status, or establishing or resuming a control plane or user plane bearer resource; or the terminal device receives a seventeenth message from the first network device, where the seventeenth message is a response message of the tenth message, and the seventeenth message is used to indicate the terminal device to perform at least one of the following operations in the first network: performing RRC resume, performing RRC reestablishment, performing RRC release, changing or maintaining the connection management status, or establishing or resuming a control plane or user plane bearer resource.

Optionally, the sixteenth message and the seventeenth message each may be a radio resource control resume (RRC resume) message, a radio resource control setup (RRC setup) message, a radio resource control reestablishment (RRC reestablishment) message, a downlink information transfer (DL information transfer) message, or the like.

In a possible implementation, the ninth message and the sixteenth message include a cause value, and the cause value is used to indicate that the terminal device has not moved from the first network to the second network; and the tenth message and the seventeenth message include a cause value, and the cause value is used to indicate that the terminal device has moved from the first network to the second network.

Optionally, the cause value in the ninth message and the sixteenth message may be that, the terminal device has not moved from an NPN, an SNPN, a PNI-NPN, or a non-3GPP network to a 5G system, or the terminal device has not moved from a 5G system to an NPN, an SNPN, a PNI-NPN, or a non-3GPP network, or the terminal device has not moved from an NPN, an SNPN, a PNI-NPN, or a non-3GPP network to another NPN, SNPN, PNI-NPN, or non-3GPP network.

Optionally, the cause value in the tenth message and the seventeenth message may be NPN to 5GS, 5GS to NPN, SNPN to 5GS, 5GS to SNPN, PNI-NPN to 5GS, 5GS to PNI-NPN, non-3GPP to 5GS, 5GS to non-3GPP, SNPN, NPN, PNI-NPN, non-3GPP, 5GS, SNPN to SNPN, PNI-NPN to PNI-NPN, NID to NID, PLMN, SNPN to PLMN, PLMN to SNPN, NPN to PLMN, PLMN to NPN, PNI-NPN to PLMN, PLMN to PNI-NPN, non-3GPP to PLMN, PLMN to non-3GPP, non-3GPP to non-3GPP, InterNetwork-mobility, or the like, to indicate that the terminal device has moved from an NPN, an SNPN, a PNI-NPN, or a non-3GPP network to a 5G system, or indicate that the terminal device has moved from a 5G system to an NPN, an SNPN, a PNI-NPN, or a non-3GPP network, or indicate that the terminal device has moved from an NPN, an SNPN, a PNI-NPN, or a non-3GPP network to another NPN, SNPN, PNI-NPN, or non-3GPP network.

In a possible implementation, the first network is a non-public network NPN network, and the second network is a public land mobile network PLMN network. Alternatively, the first network is a PLMN network, and the second network is an NPN network. Alternatively, the first network is an NPN network, and the second network is another NPN network. Alternatively, the first network is a non-3GPP network, and the second network is another non-3GPP network.

According to a second aspect, this application provides a data transmission method. The method includes: A first network device receives a first message from a terminal device, where the first message is used to indicate that the terminal device is to move from a first network to a second network. After receiving the first message, the first network device configures a session resource used for data forwarding for the terminal device. The first network device is a network element in the first network, and the first network device is an access and mobility management function AMF network element or an access network device.

Optionally, the first network is an SNPN network, and the second network is a PLMN network or a PNI-NPN network.

Optionally, the first network is a PNI-NPN network, and the second network is a PLMN network or an SNPN network.

Optionally, the first network is a PLMN network, and the second network is a PNI-NPN network or an SNPN network.

Optionally, the first network is an SNPN network, the second network is an SNPN network, and network IDs of the first network and the second network are different.

Optionally, the first network is a PNI-NPN network, the second network is a PNI-NPN network, and network IDs of the first network and the second network are different.

Optionally, the first network is a PLMN network, the second network is a PLMN network, and network IDs of the first network and the second network are different.

Optionally, the first network is a non-3GPP network, the second network is a non-3GPP network, and network IDs of the first network and the second network are different.

It should be understood that a scenario in which the terminal device moves across networks from the first network to the second network is not limited in this application. For example, the terminal device may move in an inter-network cell reselection process, or the terminal device may move in an inter-network cell handover process.

It should be further understood that, "the terminal device moves from the first network to the second network" may alternatively be described as: "the terminal device performs reselection from the first network to the second network", "the terminal device is handed over from the first network to the second network", or the like.

It should be further understood that cell reselection in this application is different from cell reselection performed by a conventional terminal device in an idle state. The cell reselection in this application is that the terminal device in a connected state autonomously decides to perform inter-network cell "handover", instead of being controlled by a network side to perform cell "handover". That is, the cell reselection in this application is different from the conventional cell reselection and handover process and may also be referred to as another term, for example, inter-network autonomous handover.

In the foregoing technical solution, when the terminal device is to move across networks, the terminal device actively reports to the network side that the terminal device is to move across networks, so that the network side can: for example, reserve a context of the terminal device, stop data transmission of the terminal device in time, and preconfigure a data forwarding resource in time. According to the foregoing technical solution, the network side can learn of mobility of the terminal device, and perform corresponding session processing in time.

In a possible implementation, the first message is further used to indicate, to the first network device, a connection management status or a radio resource control status of the terminal device in the first network. The connection management status includes a connection management connected state and a connection management idle state, and the radio resource control status includes a radio resource control connected state, a radio resource control idle state, and a radio resource control inactive state.

In a possible implementation, the method further includes: The first network device receives a fourteenth message from the terminal device, where the fourteenth message is used to indicate, to the first network device, a connection management status or a radio resource control status of the terminal device in the first network. The connection management status includes a connection management connected state and a connection management idle state, and the radio resource control status includes a radio resource control connected state, a radio resource control idle state, and a radio resource control inactive state.

It may be understood that the terminal device may indicate the connection management status or the radio resource control status of the terminal device in the first network by including an indication identifier in the first message or the fourteenth message, or by using the message. For example, the foregoing message is a radio resource control release (RRC release) message, a proximity indication, an uplink information transfer (UL information transfer) indication, a measurement report, a radio resource control setup request (RRC setup request) message, a radio resource control setup complete (RRC setup complete) message, a radio resource control reestablishment request (RRC reestablishment request) message, a radio resource control reestablishment complete (RRC reestablishment complete) message, a radio resource control resume request (RRC resume request) message, a radio resource control reconfiguration complete (RRC reconfiguration complete) message, a location measurement indication, or other newly defined signaling.

It may be understood that the terminal device not only performs an information exchange process with the first network, but also needs the information and needs to perform the information exchange process with the second network.

In the foregoing technical solution, when reporting to the network side that the terminal device is to move from the first network to the second network or after reporting to the network side that the terminal device is to move from the first network to the second network, the terminal device may further notify the network side of the connection management status or the radio resource control status. In this way, the network side can correctly process the context. For example, the terminal device reports, to the network side, that the radio resource control status of the terminal device in the first network is the radio resource control inactive state. In this case, the network side may store a context corresponding to the terminal device, so as to quickly establish a connection to the terminal device when the terminal device does not leave the first network or returns to the first network.

It can be learned that, in the foregoing technical solution, the terminal device determines the connection management status and the radio resource control status, and then reports the connection management status and the radio resource control status to the network side.

In a possible implementation, the method further includes: The first network device sends a fifteenth message to the terminal device, where the fifteenth message is used to indicate, to the terminal device, a connection management status or a radio resource control status of the terminal device in the first network. The connection management status includes a connection management connected state and a connection management idle state, and the radio resource control status includes a radio resource control connected state, a radio resource control idle state, and a radio resource control inactive state.

It may be understood that the terminal device may indicate the connection management status or the radio resource control status of the terminal device in the first network by including an indication identifier in the first message or the fourteenth message, or by using the message. For example, the foregoing message is a radio resource control release (RRC release) message, a proximity indication, an uplink information transfer (UL information transfer) indication, a measurement report, a radio resource control setup request (RRC setup request) message, a radio resource control setup complete (RRC setup complete) message, a radio resource control reestablishment request (RRC reestablishment request) message, a radio resource control reestablishment complete (RRC reestablishment complete) message, a radio resource control resume request (RRC resume request) message, a radio resource control reconfiguration complete (RRC reconfiguration complete) message, a location measurement indication, or other newly defined signaling.

It may be understood that the terminal device not only performs an information exchange process with the first network, but also needs the information and needs to perform the information exchange process with the second network.

In the foregoing technical solution, after reporting to the network side that the terminal device is to move from the first network to the second network, the terminal device may further determine, based on a network-side indication, the connection management status or the radio resource control status of the terminal device in the first network after the terminal device moves. For example, the network side indicates that the radio resource control status of the terminal device in the first network is the radio resource control inactive state, and the terminal device knows that the network side stores the context corresponding to the terminal device. When the terminal device does not leave the first network or returns to the first network, the terminal device may quickly establish a connection to the network side.

It can be learned that, in the foregoing technical solution, the network side determines the connection management status and the radio resource control status, and then indicates the connection management status and the radio resource control status to the terminal device.

In a possible implementation, the first message is further used to indicate at least one of information about forwarded data or a cause for data forwarding.

In a possible implementation, the information about the forwarded data includes at least one of the following information: a protocol data unit PDU session identifier, a quality of service QoS flow identifier, a data radio bearer DRB identifier, a mapping list between a DRB and a QoS flow, and transmission status information of data on the DRB, or the cause for data forwarding includes inter-network mobility.

In a possible implementation, the method further includes: The first network device receives a ninth message from the terminal device, where the ninth message is used to indicate that the terminal device has not moved from the first network to the second network. Alternatively, the first network device receives a tenth message from the terminal device, where the tenth message is used to indicate that the terminal device has moved from the first network to the second network.

Optionally, the ninth message and the tenth message each may be a radio resource control resume request (RRC resume request) message, a radio resource control setup request (RRC setup request) message, a radio resource control setup complete (RRC setup complete) message, a radio resource control reestablishment request (RRC reestablishment request) message, an uplink information transfer (UL information transfer) message, and the like.

In a possible implementation, after the first network device receives the ninth message or the tenth message from the terminal device, the method further includes: The first network device sends a sixteenth message to the terminal device, where the sixteenth message is a response message of the ninth message, and the sixteenth message is used to indicate the terminal device to perform at least one of the following operations in the first network: performing RRC resume, performing RRC reestablishment, performing RRC release, changing or maintaining the connection management status, or establishing or resuming a control plane or user plane bearer resource; or the first network device sends a seventeenth message to the terminal device, where the seventeenth message is a response message of the tenth message, and the seventeenth message is used to indicate the terminal device to perform at least one of the following operations in the first network: performing RRC resume, performing RRC reestablishment, performing RRC release, changing or maintaining the connection management status, or establishing or resuming a control plane or user plane bearer resource.

Optionally, the sixteenth message and the seventeenth message each may be a radio resource control resume (RRC resume) message, a radio resource control setup (RRC setup) message, a radio resource control reestablishment (RRC reestablishment) message, a downlink information transfer (DL information transfer) message, or the like.

In a possible implementation, the ninth message and the sixteenth message include a cause value, and the cause value is used to indicate that the terminal device has not moved from the first network to the second network; and the tenth message and the seventeenth message include a cause value, and the cause value is used to indicate that the terminal device has moved from the first network to the second network.

Optionally, the cause value in the ninth message and the sixteenth message may be that, the terminal device has not moved from an NPN, an SNPN, a PNI-NPN, or a non-3GPP network to a 5G system, or the terminal device has not moved from a 5G system to an NPN, an SNPN, a PNI-NPN, or a non-3GPP network, or the terminal device has not moved from an NPN, an SNPN, a PNI-NPN, or a non-3GPP network to another NPN, SNPN, PNI-NPN, or non-3GPP network.

Optionally, the cause value in the tenth message and the seventeenth message may be NPN to 5G system (5GS), 5GS to NPN, SNPN to 5GS, 5GS to SNPN, PNI-NPN to 5GS, 5GS to PNI-NPN, non-3GPP to 5GS, 5GS to non-3GPP, SNPN, NPN, PNI-NPN, non-3GPP, and 5GS, to indicate that the terminal device has moved from an NPN, an SNPN, a PNI-NPN, or a non-3GPP network to a 5G system, or indicate that the terminal device has moved from a 5G system to an NPN, an SNPN, a PNI-NPN, or a non-3GPP network, or indicate that the terminal device has moved from an NPN, an SNPN, a PNI-NPN, or a non-3GPP network to another NPN, SNPN, PNI-NPN, or non-3GPP network.

In a possible implementation, the first network is a non-public network NPN network, and the second network is a public land mobile network PLMN network. Alternatively, the first network is a PLMN network, and the second network is an NPN network. Alternatively, the first network is an NPN network, and the second network is another NPN network. Alternatively, the first network is a non-3GPP network, and the second network is another non-3GPP network.

According to a third aspect, this application provides a data transmission method. The method includes: A terminal device determines a first message, where the first message is used to indicate that the terminal device has moved from a first network to a second network. The terminal device sends the first message to a first network device. The first network device is a network element in the first network, and the first network device is an access and mobility management function AMF network element or an access network device.

Optionally, the first network is an SNPN network, and the second network is a PLMN network or a PNI-NPN network.

Optionally, the first network is a PNI-NPN network, and the second network is a PLMN network or an SNPN network.

Optionally, the first network is a PLMN network, and the second network is a PNI-NPN network or an SNPN network.

Optionally, the first network is an SNPN network, the second network is an SNPN network, and network IDs of the first network and the second network are different.

Optionally, the first network is a PNI-NPN network, the second network is a PNI-NPN network, and network IDs of the first network and the second network are different.

Optionally, the first network is a PLMN network, the second network is a PLMN network, and network IDs of the first network and the second network are different.

Optionally, the first network is a non-3GPP network, the second network is a non-3GPP network, and network IDs of the first network and the second network are different.

It should be understood that a scenario in which the terminal device moves across networks from the first network to the second network is not limited in this application. For example, the terminal device may move in an inter-network cell reselection process, or the terminal device may move in an inter-network cell handover process.

It should be further understood that, "the terminal device moves from the first network to the second network" may alternatively be described as: "the terminal device performs reselection from the first network to the second network", "the terminal device is handed over from the first network to the second network", or the like.

It should be further understood that cell reselection in this application is different from cell reselection performed by a conventional terminal device in an idle state. The cell reselection in this application is that the terminal device in a connected state autonomously decides to perform inter-network cell "handover", instead of being controlled by a network side to perform cell "handover". That is, the cell reselection in this application is different from the conventional cell reselection and handover process and may also be referred to as another term, for example, inter-network autonomous handover.

In the foregoing technical solution, when the terminal device is to move across networks, the terminal device actively reports to the network side that the terminal device is to move across networks, so that the network side can: for example, resume a context of the terminal device, resume, reestablish, or release a control plane or user plane resource, and resume data transmission of the terminal device. According to the foregoing technical solution, the network side can learn of mobility of the terminal device, perform corresponding session processing in time, and start to forward data of the terminal device.

In a possible implementation, the first message is further used to indicate at least one of information about forwarded data or a cause for data forwarding.

In a possible implementation, the information about the forwarded data includes at least one of the following information: a protocol data unit PDU session identifier, a quality of service QoS flow identifier, a data radio bearer DRB identifier, a mapping list between a DRB and a QoS flow, and transmission status information of data on the DRB, or the cause for data forwarding includes inter-network mobility.

In a possible implementation, after the terminal device sends the first message to the first network device, the method further includes: The terminal device receives a seventeenth message from the first network device, where the seventeenth message is a response message of the first message, and the seventeenth message is used to indicate the terminal device to perform at least one of the following operations in the first network: performing RRC resume, performing RRC reestablishment, performing RRC release, changing or maintaining a connection management status, or establishing or resuming a control plane or user plane bearer resource.

Optionally, the seventeenth message may be a radio resource control resume (RRC resume) message, a radio resource control setup (RRC setup) message, a radio resource control reestablishment (RRC reestablishment) message, a downlink information transfer (DL information transfer) message, or the like.

In a possible implementation, the first message and the seventeenth message include a cause value, and the cause value is used to indicate that the terminal device has moved from the first network to the second network.

Optionally, the cause value in the seventeenth message may be NPN to 5GS, 5GS to NPN, SNPN to 5GS, 5GS to SNPN, PNI-NPN to 5GS, 5GS to PNI-NPN, non-3GPP to 5GS, 5GS to non-3GPP, SNPN, NPN, PNI-NPN, non-3GPP, 5GS, SNPN to SNPN, PNI-NPN to PNI-NPN, NID to NID, PLMN, SNPN to PLMN, PLMN to SNPN, NPN to PLMN, PLMN to NPN, PNI-NPN to PLMN, PLMN to PNI-NPN, non-3GPP to PLMN, PLMN to non-3GPP, non-3GPP to non-3GPP, non-3GPP to non-3GPP, InterNetwork-mobility, or the like, to indicate that the terminal device has moved from an NPN, an SNPN, a PNI-NPN, or a non-3GPP network to a 5G system, or indicate that the terminal device has moved from a 5G system to an NPN, an SNPN, a PNI-NPN, or a non-3GPP network, or indicate that the terminal device has moved from an NPN, an SNPN, a PNI-NPN, or a non-3GPP network to another NPN, SNPN, PNI-NPN, or non-3GPP network.

In a possible implementation, the first network is a non-public network NPN network, and the second network is a public land mobile network PLMN network. Alternatively, the first network is a PLMN network, and the second network is an NPN network. Alternatively, the first network is an NPN network, and the second network is another NPN network. Alternatively, the first network is a non-3GPP network, and the second network is another non-3GPP network.

According to a fourth aspect, this application provides a data transmission method. The method includes: A first network device receives a first message from a terminal device, where the first message is used to indicate that the terminal device has moved from a first network to a second network. After receiving the first message, the first network device configures a session resource used for data forwarding for the terminal device. The first network device is a network element in the first network, and the first network device is an access and mobility management function AMF network element or an access network device.

Optionally, the first network is an SNPN network, and the second network is a PLMN network or a PNI-NPN network.

Optionally, the first network is a PNI-NPN network, and the second network is a PLMN network or an SNPN network.

Optionally, the first network is a PLMN network, and the second network is a PNI-NPN network or an SNPN network.

Optionally, the first network is an SNPN network, the second network is an SNPN network, and network IDs of the first network and the second network are different.

Optionally, the first network is a PNI-NPN network, the second network is a PNI-NPN network, and network IDs of the first network and the second network are different.

Optionally, the first network is a PLMN network, the second network is a PLMN network, and network IDs of the first network and the second network are different.

Optionally, the first network is a non-3GPP network, the second network is a non-3GPP network, and network IDs of the first network and the second network are different.

It should be understood that a scenario in which the terminal device moves across networks from the first network to the second network is not limited in this application. For example, the terminal device may move in an inter-network cell reselection process, or the terminal device may move in an inter-network cell handover process.

It should be further understood that, "the terminal device moves from the first network to the second network" may alternatively be described as: "the terminal device performs reselection from the first network to the second network", "the terminal device is handed over from the first network to the second network", or the like.

It should be further understood that cell reselection in this application is different from cell reselection performed by a conventional terminal device in an idle state. The cell reselection in this application is that the terminal device in a connected state autonomously decides to perform inter-network cell "handover", instead of being controlled by a network side to perform cell "handover". That is, the cell reselection in this application is different from the conventional cell reselection and handover process and may also be referred to as another term, for example, inter-network autonomous handover.

In the foregoing technical solution, when the terminal device is to move across networks, the terminal device actively reports to the network side that the terminal device is to move across networks, so that the network side can: for example, resume a context of the terminal device, resume, reestablish, or release a control plane or user plane resource, and resume data transmission of the terminal device. According to the foregoing technical solution, the network side can learn of mobility of the terminal device, perform corresponding session processing in time, and start to forward data of the terminal device.

In a possible implementation, the first message is further used to indicate at least one of information about forwarded data or a cause for data forwarding.

In a possible implementation, the information about the forwarded data includes at least one of the following information: a protocol data unit PDU session identifier, a quality of service QoS flow identifier, a data radio bearer DRB identifier, a mapping list between a DRB and a QoS flow, and transmission status information of data on the DRB, or the cause for data forwarding includes inter-network mobility.

In a possible implementation, after the first network device receives the first message from the terminal device, the method further includes: The first network device sends a seventeenth message to the terminal device, where the seventeenth message is a response message of the first message, and the seventeenth message is used to indicate the terminal device to perform at least one of the following operations in the first network: performing RRC resume, performing RRC reestablishment, performing RRC release, changing or maintaining a connection management status, or establishing or resuming a control plane or user plane bearer resource.

Optionally, the seventeenth message may be a radio resource control resume (RRC resume) message, a radio resource control setup (RRC setup) message, a radio resource control reestablishment (RRC reestablishment) message, a downlink information transfer (DL information transfer) message, or the like.

In a possible implementation, the first message and the seventeenth message include a cause value, and the cause value is used to indicate that the terminal device has moved from the first network to the second network.

Optionally, the cause value in the seventeenth message may be NPN to 5GS, 5GS to NPN, SNPN to 5GS, 5GS to SNPN, PNI-NPN to 5GS, 5GS to PNI-NPN, non-3GPP to 5GS, 5GS to non-3GPP, SNPN, NPN, PNI-NPN, non-3GPP, 5GS, SNPN to SNPN, PNI-NPN to PNI-NPN, NID to NID, PLMN, SNPN to PLMN, PLMN to SNPN, NPN to PLMN, PLMN to NPN, PNI-NPN to PLMN, PLMN to PNI-NPN, non-3GPP to PLMN, PLMN to non-3GPP, non-3GPP to non-3GPP, non-3GPP to non-3GPP, InterNetwork-mobility, or the like, to indicate that the terminal device has moved from an NPN, an SNPN, a PNI-NPN, or a non-3GPP network to a 5G system, or indicate that the terminal device has moved from a 5G system to an NPN, an SNPN, a PNI-NPN, or a non-3GPP network, or indicate that the terminal device has moved from an NPN, an SNPN, a PNI-NPN, or a non-3GPP network to another NPN, SNPN, PNI-NPN, or non-3GPP network.

In a possible implementation, the first network is a non-public network NPN network, and the second network is a public land mobile network PLMN network. Alternatively, the first network is a PLMN network, and the second network is an NPN network. Alternatively, the first network is an NPN network, and the second network is another NPN network. Alternatively, the first network is a non-3GPP network, and the second network is another non-3GPP network.

According to a fifth aspect, this application provides a data transmission method. The method includes: A first network device receives a first message from a terminal device, where the first message is used to indicate that the terminal device has moved or is to move from a first network to a second network. After receiving the first message, the first network device sends a second message to a second network device, where the second message is used to indicate that the terminal device has moved or is to move from the first network to the second network. The first network device and the second network device are network elements in the first network.

Optionally, the first network is an SNPN network, and the second network is a PLMN network or a PNI-NPN network.

Optionally, the first network is a PNI-NPN network, and the second network is a PLMN network or an SNPN network.

Optionally, the first network is a PLMN network, and the second network is a PNI-NPN network or an SNPN network.

Optionally, the first network is an SNPN network, the second network is an SNPN network, and network IDs of the first network and the second network are different.

Optionally, the first network is a PNI-NPN network, the second network is a PNI-NPN network, and network IDs of the first network and the second network are different.

Optionally, the first network is a PLMN network, the second network is a PLMN network, and network IDs of the first network and the second network are different.

Optionally, the first network is a non-3GPP network, the second network is a non-3GPP network, and network IDs of the first network and the second network are different.

It should be understood that a scenario in which the terminal device moves across networks from the first network to the second network is not limited in this application. For example, the terminal device may move in an inter-network cell reselection process, or the terminal device may move in an inter-network cell handover process.

It should be further understood that, "the terminal device moves from the first network to the second network" may alternatively be described as: "the terminal device performs reselection from the first network to the second network", "the terminal device is handed over from the first network to the second network", or the like.

It should be further understood that cell reselection in this application is different from cell reselection performed by a conventional terminal device in an idle state. The cell reselection in this application is that the terminal device in a connected state autonomously decides to perform inter-network cell "handover", instead of being controlled by a network side to perform cell "handover". That is, the cell reselection in this application is different from the conventional cell reselection and handover process and may also be referred to as another term, for example, inter-network autonomous handover.

In the foregoing technical solution, when the terminal device is to move or has moved from across networks, the network side learns, by using the first message sent by the terminal device, that the terminal device has moved or is to move across networks, and configures a corresponding session resource for the terminal device in time for data forwarding, thereby ensuring service continuity of the terminal.

In a possible implementation, the second message is further used to indicate at least one of information about forwarded data or a cause for data forwarding.

In a possible implementation, the information about the forwarded data includes at least one of the following information: a protocol data unit PDU session identifier, a quality of service QoS flow identifier, a data radio bearer DRB identifier, a mapping list between a DRB and a QoS flow, and transmission status information of data on the DRB, or the cause for data forwarding includes inter-network mobility.

In a possible implementation, the first network device is an access and mobility management function AMF network element, the second network device is a user plane function UPF network element or an interworking function network element, and the interworking function network element is used for transmission of user plane data and control plane data between the first network and the second network.

In a possible implementation, the method further includes: The AMF receives a third message from the UPF or the interworking function network element, where the third message is used to indicate configuration information of a first data forwarding channel for the terminal device. The AMF sends a fourth message to a first access network device, where the fourth message is used to indicate the configuration information, and the first access network device is a network element in the first network.

In a possible implementation, when the second network device is the interworking function network element, the method further includes: The AMF sends a fifth message to the UPF, where the fifth message is used to indicate the configuration information.

In a possible implementation, the method further includes: The AMF receives a sixth message from the first access network device, where the sixth message is further used to indicate at least one of information about forwarded data or a cause for data forwarding, and the first access network device is a network element in the first network. The AMF determines, based on the sixth message, the information about the forwarded data and the cause for data forwarding. Alternatively, the AMF determines, based on the first message, the information about the forwarded data and the cause for data forwarding. The first message includes the information about the forwarded data and the cause for data forwarding.

In a possible implementation, the method further includes: After receiving the first message, the AMF sends a seventh message to the first access network device. The seventh message is used to indicate, to the first access network device, that the terminal device has moved or is to move from the first network to the second network, and the first access network device is a network element in the first network.

In a possible implementation, when the interworking function network element has a packet data convergence protocol PDCP coding function, the method further includes: The AMF sends an eighth message to the interworking function network element. The eighth message is used to indicate the information about the forwarded data, and the information about the forwarded data includes a PDCP sequence number available for the forwarded data.

In a possible implementation, the first message indicates that the terminal device is to move from the first network to the second network, the first network device is the first access network device, and the second network device is the access and mobility management AMF network element.

In a possible implementation, the method further includes: The first access network device receives a fourth message from the AMF, where the fourth message is used to indicate configuration information of a first data forwarding channel for the terminal device. The first access network device sends forwarded data to a user plane function UPF network element or an interworking function network element based on the configuration information, where the interworking function network element is used for transmission of user plane data and data plane data between the first network and the second network.

In a possible implementation, the first network is an NPN network, and the second network is a PLMN network. Alternatively, the first network is a PLMN network, and the second network is an NPN network. Alternatively, the first network is an NPN network, and the second network is another NPN network. Alternatively, the first network is a non-3GPP network, and the second network is another non-3GPP network.

According to a sixth aspect, this application provides a data transmission method. The method includes: A second network device receives a second message from a first network device, where the second message is used to indicate that a terminal device has moved or is to move from a first network to a second network. The second network device configures a first data forwarding channel for the terminal device based on the second message. The second network device sends a third message to the first network device, where the third message is used to indicate configuration information of the first data forwarding channel for the terminal device. The first network device and the second network device are network elements in the first network.

Optionally, the first network is an SNPN network, and the second network is a PLMN network or a PNI-NPN network.

Optionally, the first network is a PNI-NPN network, and the second network is a PLMN network or an SNPN network.

Optionally, the first network is a PLMN network, and the second network is a PNI-NPN network or an SNPN network.

Optionally, the first network is an SNPN network, the second network is an SNPN network, and network IDs of the first network and the second network are different.

Optionally, the first network is a PNI-NPN network, the second network is a PNI-NPN network, and network IDs of the first network and the second network are different.

Optionally, the first network is a PLMN network, the second network is a PLMN network, and network IDs of the first network and the second network are different.

Optionally, the first network is a non-3GPP network, the second network is a non-3GPP network, and network IDs of the first network and the second network are different.

It should be understood that a scenario in which the terminal device moves across networks from the first network to the second network is not limited in this application. For example, the terminal device may move in an inter-network cell reselection process, or the terminal device may move in an inter-network cell handover process.

It should be further understood that, "the terminal device moves from the first network to the second network" may alternatively be described as: "the terminal device performs reselection from the first network to the second network", "the terminal device is handed over from the first network to the second network", or the like.

It should be further understood that cell reselection in this application is different from cell reselection performed by a conventional terminal device in an idle state. The cell reselection in this application is that the terminal device in a connected state autonomously decides to perform inter-network cell "handover", instead of being controlled by a network side to perform cell "handover". That is, the cell reselection in this application is different from the conventional cell reselection and handover process and may also be referred to as another term, for example, inter-network autonomous handover.

In the foregoing technical solution, when the terminal device is to move or has moved from across networks, the network side learns, by using the first message sent by the terminal device, that the terminal device has moved or is to move across networks, and configures a corresponding session resource for the terminal device in time for data forwarding, thereby ensuring service continuity of the terminal.

In a possible implementation, the second message is further used to indicate at least one of information about forwarded data or a cause for data forwarding.

In a possible implementation, the information about the forwarded data includes at least one of the following information: a PDU session identifier, a QoS flow identifier, a DRB identifier, a mapping list between a DRB and a QoS flow, or transmission status information of data on the DRB.

In a possible implementation, the method further includes: The second network device receives the forwarded data from the first network device.

In a possible implementation, the second network device is an interworking function network element, the interworking function network element is used for data transmission between the first network and the second network, and the method further includes: The interworking function network element receives an eighth message from the first network device, where the eighth message is used to indicate the information about the forwarded data. The interworking function network element establishes a first forwarding channel in the second network based on the eighth message, where the first forwarding channel is used to transmit the forwarded data from the interworking function network element to a target network device in the second network.

Optionally, the first forwarding channel may belong to a PDU session resource that is for a service of the first network and that is established for the terminal device via the second network, or belong to a dedicated forwarding channel resource.

Optionally, the target network device may be an access network device in the second network.

Optionally, the eighth message includes the transmission status information of the data on the DRB, and the transmission status information of the data on the DRB includes an uplink packet data convergence protocol serial number (PDCP SN) and hyper frame number (HFN) receiver status information, or a downlink PDCP SN and HFN transmitter status information.

In a possible implementation, the method further includes: The interworking function network element performs packet data convergence protocol PDCP numbering on downlink forwarded data based on the eighth message. The interworking function network element sends the downlink forwarded data based on a PDCP numbering result, and selectively transmits uplink forwarded data.

Optionally, the eighth message may be RAN status transfer signaling.

Optionally, when the uplink forwarded data or the downlink forwarded data is of a PDU session granularity, the interworking function network element only needs to sequentially send the forwarded data and newly arrived data to the terminal device or an NPN core network. In a possible implementation, the first message indicates that the terminal device is to move from the first network to the second network, and the method further includes: The second network device receives an eleventh message, where the eleventh message is used to indicate that the terminal device has not moved from the first network to the second network. The second network device releases the first data forwarding channel.

In a possible implementation, the eleventh message is further used to indicate that the terminal device switches from a first access network device to a second access network device, and the method further includes: The second network device establishes a second data forwarding channel for the terminal device. The second data forwarding channel includes a data forwarding channel between the first access network device and the second access network device.

In a possible implementation, the first network is an NPN network, and the second network is a PLMN network. Alternatively, the first network is a PLMN network, and the second network is an NPN network. Alternatively, the first network is an NPN network, and the second network is another NPN network. Alternatively, the first network is a non-3GPP network, and the second network is another non-3GPP network.

According to a seventh aspect, this application provides a terminal device, including modules configured to perform any one of the first aspect or the implementations of the first aspect.

According to an eighth aspect, this application provides a network device, including modules configured to perform any one of the second aspect or the implementations of the second aspect.

According to a ninth aspect, this application provides a terminal device, including modules configured to perform any one of the third aspect or the implementations of the third aspect.

According to a tenth aspect, this application provides a network device, including modules configured to perform any one of the fourth aspect or the implementations of the fourth aspect.

According to an eleventh aspect, this application provides a terminal device, including modules configured to perform any one of the fifth aspect or the implementations of the fifth aspect.

According to a twelfth aspect, this application provides a network device, including modules configured to perform any one of the sixth aspect or the implementations of the sixth aspect.

According to a thirteenth aspect, this application provides a chip. The chip is connected to a memory, and is configured to read and execute a software program stored in the memory, to implement the method according to any one of the first aspect or the implementations of the first aspect.

According to a fourteenth aspect, this application provides a chip. The chip is connected to a memory, and is configured to read and execute a software program stored in the memory, to implement the method according to any one of the second aspect or the implementations of the second aspect.

According to a fifteenth aspect, this application provides a chip. The chip is connected to a memory, and is configured to read and execute a software program stored in the memory, to implement the method according to any one of the third aspect or the implementations of the third aspect.

According to a sixteenth aspect, this application provides a chip. The chip is connected to a memory, and is configured to read and execute a software program stored in the memory, to implement the method according to any one of the fourth aspect or the implementations of the fourth aspect.

According to a seventeenth aspect, this application provides a chip. The chip is connected to a memory, and is configured to read and execute a software program stored in the memory, to implement the method according to any one of the fifth aspect or the implementations of the fifth aspect.

According to an eighteenth aspect, this application provides a chip. The chip is connected to a memory, and is configured to read and execute a software program stored in the memory, to implement the method according to any one of the sixth aspect or the implementations of the sixth aspect.

According to a nineteenth aspect, this application provides a terminal device. The terminal device includes a transceiver, a processor, and a memory, and is configured to perform the method according to any one of the first aspect or the implementations of the first aspect.

According to a twentieth aspect, this application provides a network device. The network device includes a transceiver, a processor, and a memory, and is configured to perform the method according to any one of the second aspect or the implementations of the second aspect.

According to a twenty-first aspect, this application provides a terminal device. The terminal device includes a transceiver, a processor, and a memory, and is configured to perform the method according to any one of the third aspect or the implementations of the third aspect.

According to a twenty-second aspect, this application provides a network device. The network device includes a transceiver, a processor, and a memory, and is configured to perform the method according to any one of the fourth aspect or the implementations of the fourth aspect.

According to a twenty-third aspect, this application provides a terminal device. The terminal device includes a transceiver, a processor, and a memory, and is configured to perform the method according to any one of the fifth aspect or the implementations of the fifth aspect.

According to a twenty-fourth aspect, this application provides a network device. The network device includes a transceiver, a processor, and a memory, and is configured to perform the method according to any one of the sixth aspect or the implementations of the sixth aspect.

According to a twenty-fifth aspect, this application provides a computer-readable storage medium. The computer-readable storage medium includes instructions. When the instructions are run on a terminal device, the terminal device is enabled to perform the method according to any one of the first aspect or the implementations of the first aspect.

According to a twenty-sixth aspect, this application provides a computer-readable storage medium. The computer-readable storage medium includes instructions. When the instructions are run on a network device, the network device is enabled to perform the method according to any one of the second aspect or the implementations of the second aspect.

According to a twenty-seventh aspect, this application provides a computer-readable storage medium. The computer-readable storage medium includes instructions. When the instructions are run on a terminal device, the terminal device is enabled to perform the method according to any one of the third aspect or the implementations of the third aspect.

According to a twenty-eighth aspect, this application provides a computer-readable storage medium. The computer-readable storage medium includes instructions. When the instructions are run on a network device, the network device is enabled to perform the method according to any one of the fourth aspect or the implementations of the fourth aspect.

According to a twenty-ninth aspect, this application provides a computer-readable storage medium. The computer-readable storage medium includes instructions. When the instructions are run on a terminal device, the terminal device is enabled to perform the method according to any one of the third aspect or the implementations of the third aspect.

According to a thirtieth aspect, this application provides a computer-readable storage medium. The computer-readable storage medium includes instructions. When the instructions are run on a network device, the network device is enabled to perform the method according to any one of the fourth aspect or the implementations of the fourth aspect.

According to a thirty-first aspect, this application provides a computer-readable storage medium. The computer-readable storage medium includes instructions. When the instructions are run on a terminal device, the terminal device is enabled to perform the method according to any one of the fifth aspect or the implementations of the fifth aspect.

According to a thirty-second aspect, this application provides a computer-readable storage medium. The computer-readable storage medium includes instructions. When the instructions are run on a network device, the network device is enabled to perform the method according to any one of the sixth aspect or the implementations of the sixth aspect.

According to a thirty-third aspect, this application provides a computer program product. When the computer program product runs on a terminal device, the terminal device is enabled to perform the method according to any one of the first aspect or the implementations of the first aspect.

According to a thirty-fourth aspect, this application provides a computer program product. When the computer program product runs on a network device, the network device is enabled to perform the method according to any one of the second aspect or the implementations of the second aspect.

According to a thirty-fifth aspect, this application provides a computer program product. When the computer program product runs on a terminal device, the terminal device is enabled to perform the method according to any one of the third aspect or the implementations of the third aspect.

According to a thirty-sixth aspect, this application provides a computer program product. When the computer program product runs on a network device, the network device is enabled to perform the method according to any one of the fourth aspect or the implementations of the fourth aspect.

According to a thirty-seventh aspect, this application provides a computer program product. When the computer program product runs on a terminal device, the terminal device is enabled to perform the method according to any one of the fifth aspect or the implementations of the fifth aspect.

According to a thirty-eighth aspect, this application provides a computer program product. When the computer program product runs on a network device, the network device is enabled to perform the method according to any one of the sixth aspect or the implementations of the sixth aspect.

Alternatively, the network device or the terminal device may be another apparatus, communication device, or integrated circuit (IC) chip, or the like that can implement a similar function.

BRIEF DESCRIPTION OF DRAWINGS

FIG. 3A and FIG. 3B are a schematic flowchart of configuring an NPN PDU session resource for a terminal device via a PLMN network;

FIG. 8A and FIG. 8B are a schematic flowchart of data forwarding according to at least one embodiment of this application;

FIG. 9A, FIG. 9B, and FIG. 9C are a schematic flowchart of a process of establishing a data forwarding channel before a terminal device moves according to at least one embodiment of this application;

FIG. 10A and FIG. 10B are a schematic diagram of determining RRC statuses of a terminal device in an SNPN network and a PLMN network according to at least one embodiment of this application;

FIG. 11A and FIG. 11B are a schematic diagram of determining CM statuses of a terminal device in an SNPN network and a PLMN network according to at least one embodiment of this application;

FIG. 13A and FIG. 13B are a schematic flowchart of a processing process when a terminal device does not move across networks according to at least one embodiment of this application;

FIG. 14A and FIG. 14B are a schematic flowchart of a processing process when a terminal device moves across networks according to at least one embodiment of this application;

DESCRIPTION OF EMBODIMENTS

Figure 1:
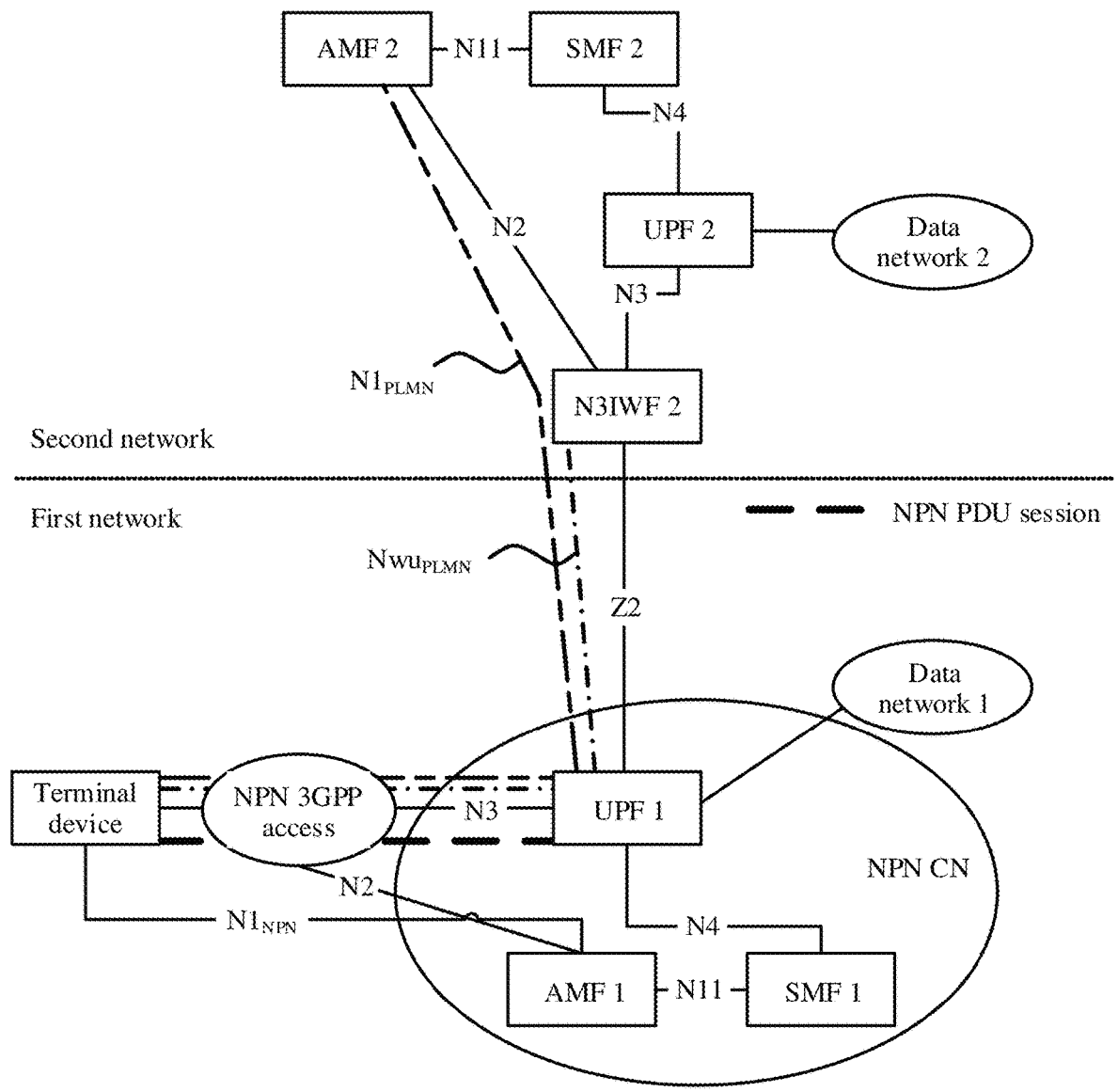
FIG. 1 is a schematic diagram of providing an NPN service for a terminal device via an SNPN network.

The following describes technical solutions of this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5G system, or a new radio (NR) system.

A terminal device in the embodiments of this application may also be referred to as user equipment, an access terminal, a subscriber unit, a subscriber station, a mobile station, a remote station, a remote terminal, a mobile device, a user terminal, a terminal, a wireless communication device, a user agent, a user apparatus, or the like. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved PLMN, or the like. This is not limited in the embodiments of this application.

A network device in the embodiments of this application may be a device configured to communicate with the terminal device, and the network device may be any device having a wireless transceiver function. The device includes but is not limited to an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), an access point (AP) in a wireless fidelity (Wi-Fi) system, a wireless relay node, a wireless backhaul node, a transmission point (transmission point, TP), a transmission reception point (TRP), or the like. Alternatively, the device may be a gNB or a transmission point (TRP or TP) in a 5G system such as an NR system, may be one antenna panel or a group of antenna panels (including a plurality of antenna panels) of a base station in a 5G system, or may be a network node, such as a baseband unit (BBU) or a distributed unit (DU), that constitutes a gNB or a transmission point. In some deployments, the gNB may include a centralized unit (CU) and a DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, to implement functions of a radio link control (RLC) layer, a media access control (MAC) layer, and a physical (PHY) layer. The AAU implements some processing functions of the physical layer, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, or an AAU node. In addition, the CU may be classified into a network device in an access network (RAN), or may be classified into a network device in a core network (CN). This is not limited in this application.

This application may be applied to various scenarios in which there are at least two different networks. In this application, the technical solutions of this application are described by using an example in which there are two different networks: a first network and a second network. Specific types of the first network and the second network are not limited in this application. For example, the first network is an SNPN network, and the second network is a PLMN network or a PNI-NPN network. Alternatively, the first network is a PNI-NPN network, and the second network is a PLMN network or an SNPN network. Alternatively, the first network is a PLMN network, and the second network is a PNI-NPN network or an SNPN network. Alternatively, the first network is an SNPN network, the second network is an SNPN network, and network IDs of the first network and the second network are different. In this application, the technical solutions of this application are described by using an example in which the first network is an SNPN network and the second network is a PLMN network.

In a scenario in which there is an SNPN network and a PLMN network, an NPN service may be provided for the terminal device via the SNPN network, a PLMN service may be provided for the terminal device via the SNPN network, an NPN service may be provided for the terminal device via the PLMN network, or a PLMN service may be provided for the terminal device via the PLMN network. The following is described by using an example in which the NPN service is provided for the terminal device via the SNPN network or the PLMN network.

With reference to FIG. 1, the NPN service is provided for the terminal device via the SNPN network. The NPN service is provided for the terminal device via the SNPN network, to be specific, the terminal device is in the SNPN network, and an NPN protocol data unit (PDU) session resource is established for the terminal device. As shown in FIG. 1, the SNPN network includes an NPN 3GPP access device (that is, an access network device), an access and mobility management function (AMF) network element 1, a session management function (SMF) 1, a user plane management function (UPF) 1, a data network (DN) 1, and the like. The PLMN network includes an N3IWF 2, an AMF 2, an SMF 2, a UPF 2, a data network 2, and the like. The terminal device located in the SNPN network is connected to the AMF 1 through an N1-type interface N1NPN. An access network device in the SNPN network is connected to the AMF 1 through an N2 interface, connected to the UPF 1 through an N3 interface, and connected to an N3IWF network element through an $Nwu_{PLMN}$ interface. The UPF 1 is connected to the data network 1 in the SNPN network and connected to the SMF 1 through an N4 interface. The AMF 1 is connected to the SMF 1 through an N11 interface. The N3IWF network element is connected to the AMF 2 through an N2 interface, and connected the UPF 2 through an N3 interface. The UPF 2 is connected to the data network 2, and connected to the SMF 2 through an N4 interface. The SMF 2 is connected to the AMF 2 through an N11 interface.

The AMF network element is mainly used for mobility management and access management, and may be configured to implement functions other than session management in mobility management entity (MME) functions, for example, functions such as lawful interception and access authorization/authentication. The SMF network element is mainly configured to: manage sessions, allocate and manage an internet protocol (IP) address of a terminal device, and select and manage a user plane function. The SMF network element is a termination point of a policy control and charging function interface, and is used to notify downlink data. The UPF network element is mainly configured to route and forward packets, process quality of service (QoS) of user plane data, and the like. The data network is used to provide a network for transmitting data.

It may be understood that, in a future communication system, names of the foregoing network elements may remain unchanged. For example, the AMF network element is still an AMF network element, and the UPF network element is still a UPF network element. Alternatively, there may be other names. This is not limited in this application.

A PDU session resource establishment process is a process of configuring wireless and wired resources for user plane data transmission. PDU session establishment involves a plurality of network elements (for example, the AMF, the SMF, and the UPF) from the terminal device to the data network, and is an end-to-end configuration process. In FIG. 1, radio resources (for example, a data radio bearer (DRB), and a signaling radio bearer (SRB)) established by the network device for an NPN PDU session of the terminal device when the terminal device is in a service range of the SNPN network are carried on an access network device (for example, a next generation radio access network (next generation radio access network, NG-RAN) device) of the SNPN network, and wired resources (for example, a core network data transmission tunnel) are carried on a core network device (for example, the UPF) of the SNPN network. A process of configuring the NPN PDU session for the terminal device is similar to an existing process of establishing a PDU session. Details are not described herein.

In FIG. 1, uplink data of the NPN service is sent by the terminal device to an NPN access network device, and then sent by the NPN access network device to an NPN core network device. Downlink data of the NPN service is sent by the NPN core network device to the NPN access network device, and then sent by the NPN access network device to the terminal device.

Figure 2:
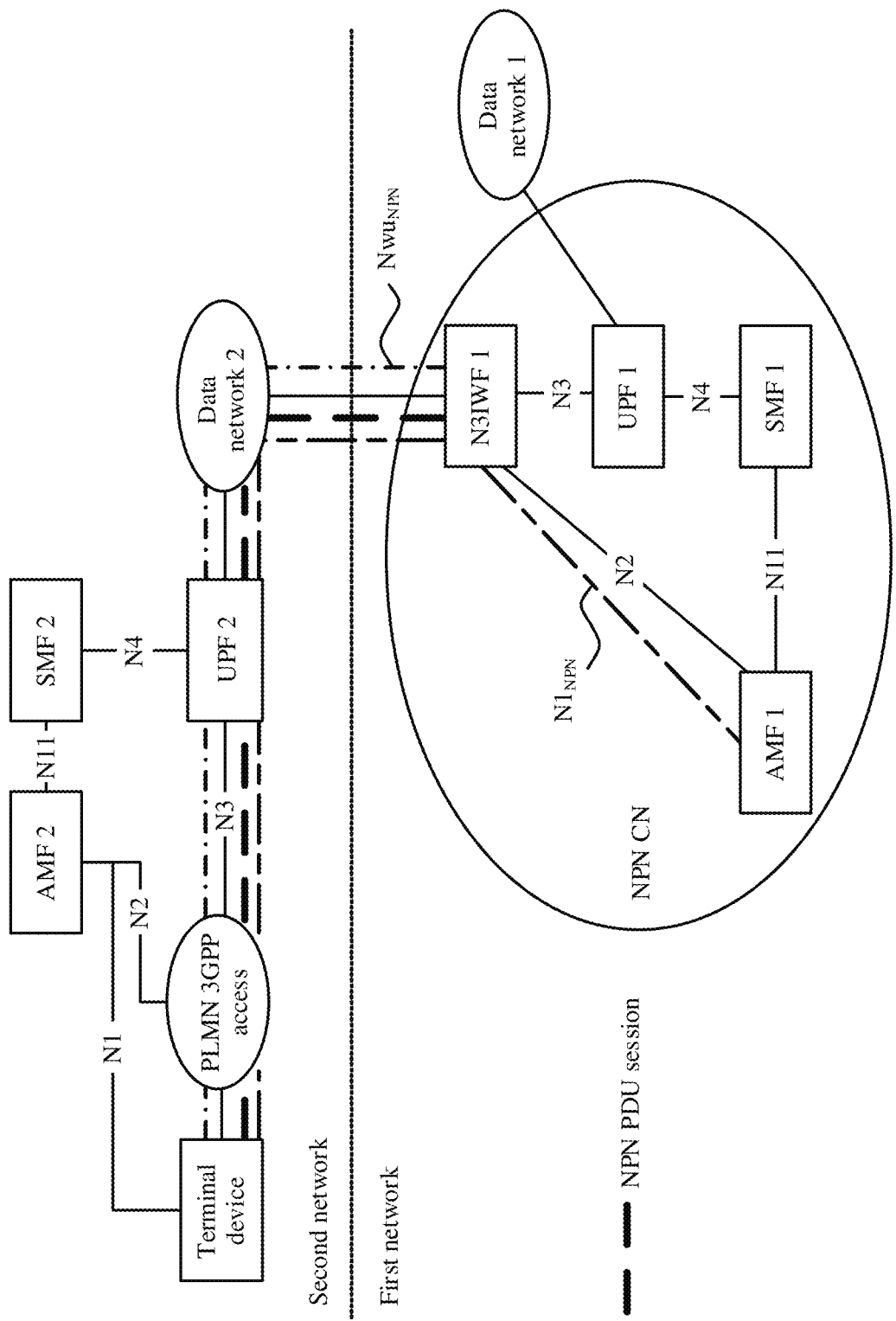
FIG. 2 is a schematic diagram of providing an NPN service for a terminal device via a PLMN network.

FIG. 2 is a schematic diagram of providing an NPN service for a terminal device via a PLMN network. In the network architecture shown in FIG. 2, components and a connection manner of an SNPN network and the PLMN network are similar to those in FIG. 1, and a difference lies in that the SNPN network includes an N3IWF 1. The terminal device in the PLMN network is connected to an AMF 2 through an N1 interface, and connected to the N3IWF 1 network element through an $Nwu_{NPN}$ interface. An access network device in the PLMN is connected to a UPF 2 through an N3 interface. In FIG. 2, radio resources established by a network device for an NPN PDU session of the terminal device in a service range of the PLMN network are carried on an access network device of the SNPN network, and wired resources are carried on core network devices of the SNPN network and the PLMN network. A process of configuring the NPN PDU session for the terminal device via the PLMN network is shown in FIG. 3A and FIG. 3B.

Figure 3B:
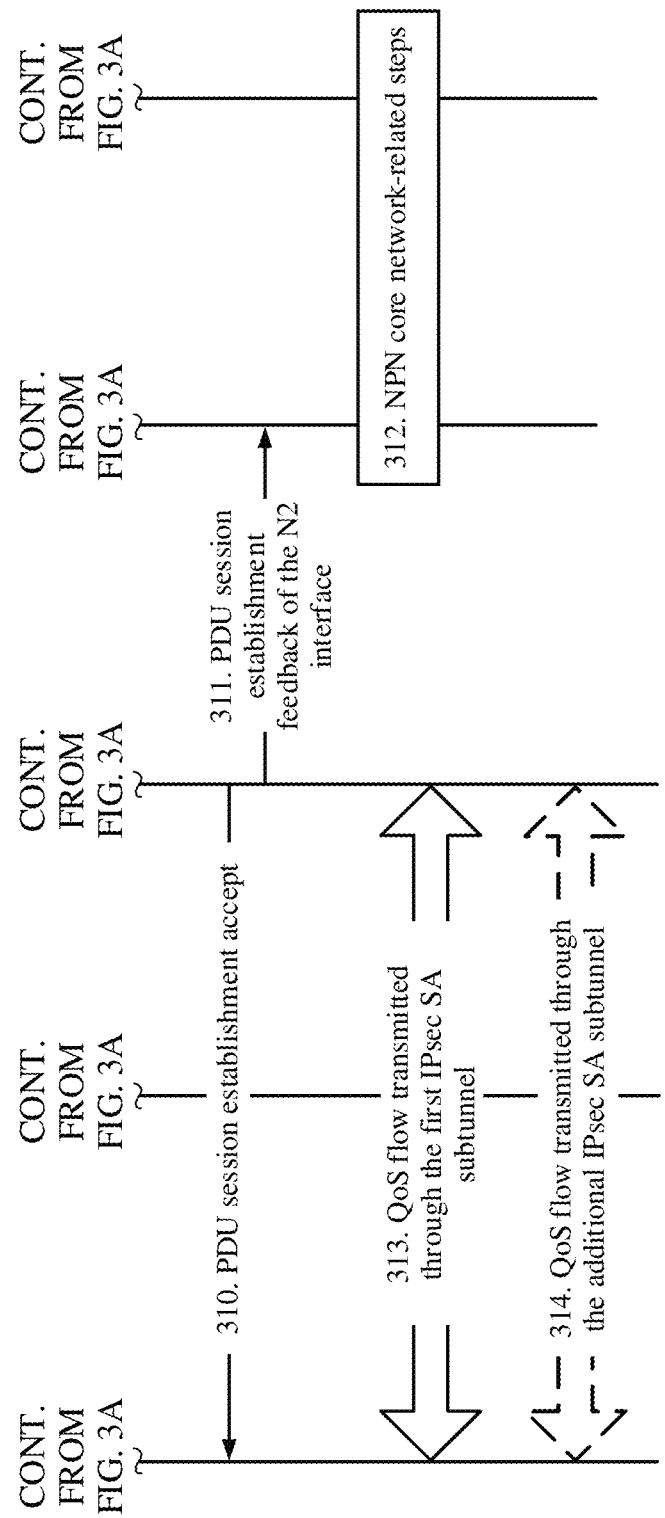

FIG. 3A and FIG. 3B are a schematic flowchart of a process of establishing an NPN PDU session resource for a terminal device via a PLMN network.

In step 301, the terminal device establishes, with an N3IWF 1, an IPsec security association (SA) tunnel for transmitting control signaling, and the N3IWF 1 may be connected to an AMF 1 through an N2 interface. In this way, the terminal device may exchange signaling with the AMF 1 in an SNPN network based on the network elements in the PLMN network, that is, establish an $N1_{NPN}$ interface shown in FIG. 2.

In step 302, the terminal device sends non-access stratum (NAS) signaling to the AMF 1 via a PLMN-3GPP access device (for example, a base station) and the N3IWF 1. That is, the terminal device sends NAS signaling to the AMF 1 through the $N1_{NPN}$ interface established in step 301, to request to establish a PDU session resource of the SNPN network.

The NAS signaling may carry information related to establishing the NPN PDU session, for example, information such as a PDU session identifier ID, a session and service continuity mode (SSC) mode, and a session type.

In step 303, the AMF 1 performs control plane-related and user plane-related steps with related network elements of the NPN core network to establish a PDU session.

In step 304, the AMF 1 sends a PUD session establishment request to the N3IWF 1 through the N2 interface. The request message may carry information such as a PDU session ID, quality of service (QoS) flow related information included in the PDU session, and a QoS flow identifier (QFI).

In step 305, the N3IWF 1 determines, based on the QoS flow related information (for example, a quantity of QoS flows) in step 304, a quantity of IPsec SA subtunnels to be established. The IPsec SA subtunnel is used to transmit user plane data.

For example, if the N3IWF 1 determines to establish, for a PDU session, an IPsec SA subtunnel for user plane data transmission, all QoS flows in the PDU session in step 304 are bound to the IPsec SA subtunnel. That is, data is transmitted through the IPsec SA subtunnel.

In steps 306 to 309, the IPsec SA subtunnel determined in step 305 is established between the N3IWF 1 and the terminal device through the $N1_{NPN}$ interface. An IPsec SA subtunnel create request (IKE_Create_child_SA Req) sent by the N3IWF 1 to the terminal device carries the following information: an ID of a PDU session and an identifier of a QoS flow, where the PDU session and the QoS flow are transmitted through the IPsec SA subtunnel.

Optionally, the IPsec SA subtunnel create request may further carry a differentiated services code point (DSCP) value. If the IPsec SA subtunnel create request carries the DSCP value, a data packet to be transmitted subsequently between the terminal device and the N3IWF 1 carries a corresponding DSCP value. The DSCP value is carried to ensure QoS of communication. The DSCP value is coded in an identifier byte of an internet protocol (IP) header of a data packet, and may be used to classify service types and differentiate between service priorities.

In step 310, after the IPsec SA subtunnel is established, the N3IWF 1 sends a PDU session establishment accept message to the terminal device, to notify the terminal device that the PDU session is successfully established.

In step 311, the N31WF 1 sends a session establishment request feedback to the AMF 1 through the N2 interface, to notify the AMF 1 that the PDU session is successfully established.

In step 312, the AMF 1 performs related steps with related network elements of the NPN core network to establish a PDU session.

In steps 313 and 314, user plane data transmission is performed. When the terminal device transmits an uplink PDU packet to the N3IWF 1 through an IPsec SA subtunnel, the uplink PDU packet needs to carry QFI information. When the N31WF 1 receives a downlink PDU packet from the UPF 1, the N3IWF 1 determines, based on a PDU session ID and a QFI, an IPsec SA subtunnel through which the downlink PDU is transmitted to the terminal device. Similarly, the downlink PDU packet carries the QFI.

In FIG. 2, uplink data of an NPN service is sent by the terminal device to a PLMN access network device, sent by the PLMN access network device to the UPF 2, sent by the UPF 2 to the data network 2, sent by the data network 2 to the N3IWF 1, sent by the N3IWF 1 to the UPF 1, and finally sent by the UPF 1 to the data network 1; downlink data of the NPN service is sent by the data network 1 to the UPF 1, sent by the UPF 1 to the N3IWF 1, sent by the N3IWF 1 to the data network 2, sent by the data network 2 to the UPF 2, sent by the UPF 2 to the PLMN access network device, and finally sent by the PLMN access network device to the terminal device.

It may be understood that providing a PLMN service for the terminal device via a PLMN network is similar to providing an NPN service for the terminal device via an SNPN network, and providing a PLMN service for the terminal device via the SNPN network is similar to providing an NPN service for the terminal device via the PLMN network. Details are not described herein.

In the network architecture shown in FIG. 1 or FIG. 2, when the terminal device needs to perform intra-network handover, that is, a source radio access network (S-RAN) device and a target radio access network (T-RAN) device both belong to the SNPN network or the PLMN network, the target access network device exchanges information with the source access network device. After the target access network device establishes a session resource for the terminal device, the source access network device indicates the terminal device to perform handover. To ensure service continuity of the terminal device, the source access network device and the target access network device may alternatively forward downlink data to the terminal device or forward uplink data to the target access network device in an NG-based or Xn-based manner. The downlink data has been transmitted to the source access network device but has not been sent to the terminal device, and the uplink data has been sent to a core network device.

Figure 4:
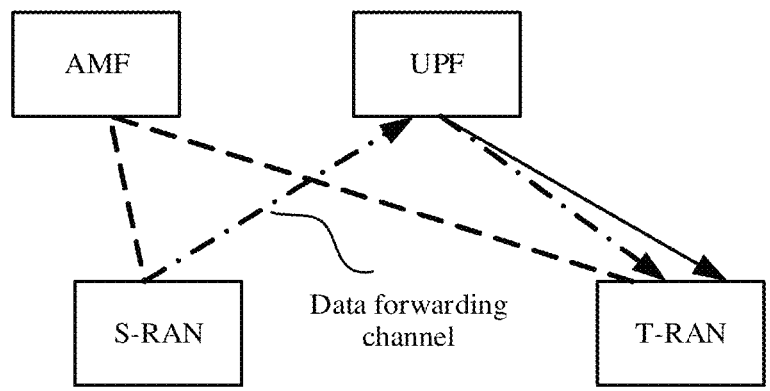
FIG. 4 is a schematic diagram of a data forwarding manner during NG-based intra-network handover.

FIG. 4 is a schematic diagram of a data forwarding manner during NG-based intra-network mobility. As shown in FIG. 4, when a terminal device needs to be handed over from a source access network device (S-RAN) to a target access network device (T-RAN), the source access network device may notify, by using an AMF, the target access network device of a PDU session resource to be established for the terminal device. Specifically, the source access network device may notify, by using the AMF, the target access network device of a PDU session ID, a QoS flow ID, a DRB ID, a mapping list between a DRB and a QoS flow, and the like of the PDU session resource to be established. After the target access network device configures the corresponding PDU session resource for the terminal device, the source access network device indicates the terminal device to be handed over between access network devices.

A data forwarding channel is shown by dashed lines in FIG. 4. A UPF and the T-RAN allocate port addresses to the data forwarding channel. For data (downlink data) that has been transmitted to the S-RAN but has not been sent to the terminal device, the S-RAN may send the data to the T-RAN through the data forwarding channel, and then the T-RAN sends the data to the terminal device. For data (uplink data) that has been transmitted to the S-RAN but has not been sent to a core network device, the S-RAN may send the data to the T-RAN through the data forwarding channel, and then the T-RAN sends the data to the core network device.

The data forwarding channel may be of a PDU session granularity, or may be of a DRB granularity. When forwarding is performed at the DRB granularity, data transmission without packet loss can be ensured. For example, data forwarding is performed at the DRB granularity. The S-RAN notifies, by using the AMF, the T-RAN of transmission status information of data on the corresponding DRB. For example, uplink/downlink RAN status transfer signaling carries an uplink packet data convergence protocol serial number (PDCP SN) and a hyper frame number (HFN) receiver status information, or a downlink PDCP SN and HFN transmitter status information. The status information may be described by using a UL/DL COUNT Value information element, a Receive Status of UL PDCP SDUs information element, and the like. The UL/DL COUNT Value information element includes a UL/DL PDCP SN and an HFN for a PDCP SN. The Receive Status of UL PDCP SDUs information element may indicate whether a specific UL PDCP SDU has been successfully received (for example, 0 indicates that a corresponding PDCP has not been received successfully, and 1 indicates that the corresponding PDCP has been received successfully). After receiving the above status information, the T-RAN should not transmit any uplink data with a PDCP SN value lower than the provided UL PDCP SN value, and should use a provided DL PDCP SN value as a PDCP SN value of a to-be-sent first downlink data packet to which a PDCP SN has not been allocated, to perform sequential transmission of the data, so as to avoid repeated transmission of the data.

Figure 5:
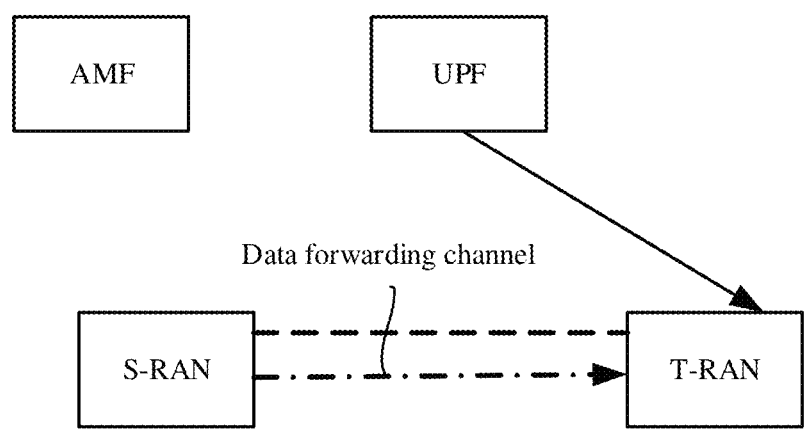
FIG. 5 is a schematic diagram of a data forwarding manner during Xn-based intra-network handover.

FIG. 5 is a schematic diagram of a data forwarding manner during Xn-based intra-network mobility. Different from the data forwarding manner shown in FIG. 4, when a terminal device needs to be handed over from an S-RAN to a T-RAN, the S-RAN may directly notify, through an Xn interface, the T-RAN of a PDU session resource to be established for the terminal device. After the T-RAN configures the corresponding PDU session resource for the terminal device, the S-RAN indicates the terminal device to be handed over between access network devices. A data forwarding channel in FIG. 5 is shown by dashed lines. The S-RAN and the T-RAN allocate port addresses to the data forwarding channel. For data (downlink data) that has been transmitted to the S-RAN but has not been sent to the terminal device, the S-RAN may send the data to the T-RAN through data forwarding channel, and then the T-RAN sends the data to the terminal device. For data (uplink data) that has been transmitted to the S-RAN but has not been sent to a core network device, the S-RAN may send the data to the T-RAN through the data forwarding channel, and then the T-RAN sends the data to the core network device.

However, in the network architecture shown in FIG. 1 or FIG. 2, in addition to intra-network handover, the terminal device may further move across networks, that is, move from an SNPN network to a PLMN network or move from a PLMN network to an SNPN network. In this case, the source access network device and the target access network device belong to different networks. When the terminal device moves across networks, on one hand, whether to move and when to move are determined by the terminal device, and are not controlled by a network side. As a result, when the terminal device moves across networks, the network side does not know whether and when the terminal device performs network handover. On the other hand, there is no direct interface between an access network of the SNPN network and an access network of the PLMN network, and an existing data forwarding method is no longer applicable.

It should be understood that a scenario in which the terminal device moves across networks from the first network to the second network is not limited in this application. For example, the terminal device may move in an inter-network cell reselection process, or the terminal device may move in an inter-network cell handover process.

It should be further understood that, "the terminal device moves from the first network to the second network" may alternatively be described as: "the terminal device performs reselection from the first network to the second network", "the terminal device is handed over from the first network to the second network", or the like.

It should be further understood that cell reselection in this application is different from cell reselection performed by a conventional terminal device in an idle state. The cell reselection in this application is that the terminal device in a connected state autonomously decides to perform inter-network cell "handover", instead of being controlled by a network side to perform cell "handover". That is, the cell reselection in this application is different from the conventional cell reselection and handover process and may also be referred to as another term, for example, inter-network autonomous handover.

The embodiments of this application provide a data transmission method, so that when the terminal device moves across networks, data forwarding can be implemented.

In a possible implementation, data forwarding may be performed after the terminal device moves to a PLMN network and an NPN PDU session resource is established for the terminal device via the PLMN network. The following describes the data transmission method in the embodiments of this application with reference to FIG. 6A and FIG. 6B and FIG. 8A and FIG. 8B.

Figure 6A:
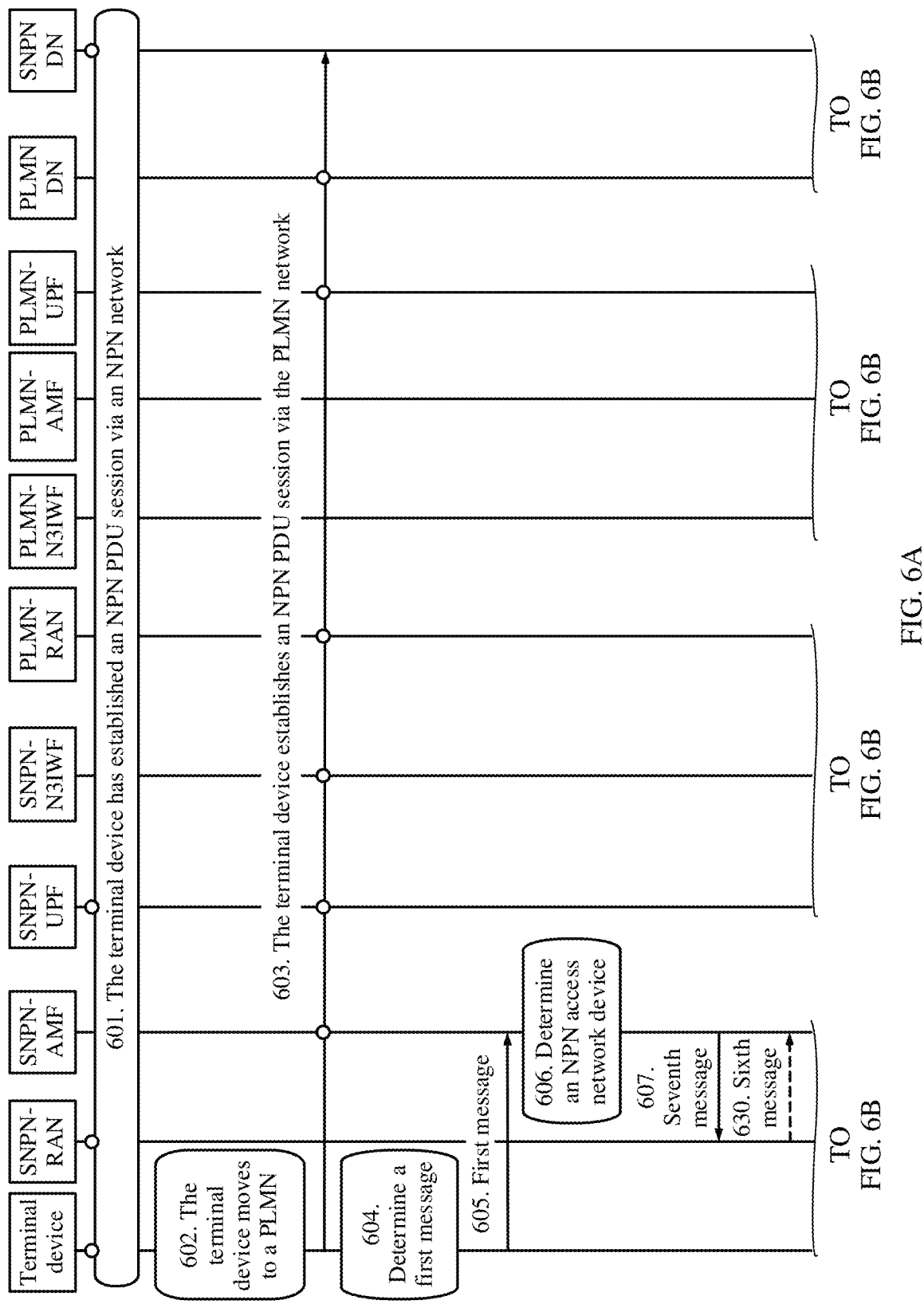
FIG. 6A and FIG. 6B are a schematic flowchart of a process of establishing a data forwarding channel after a terminal device moves according to at least one embodiment of this application.
Figure 6B:
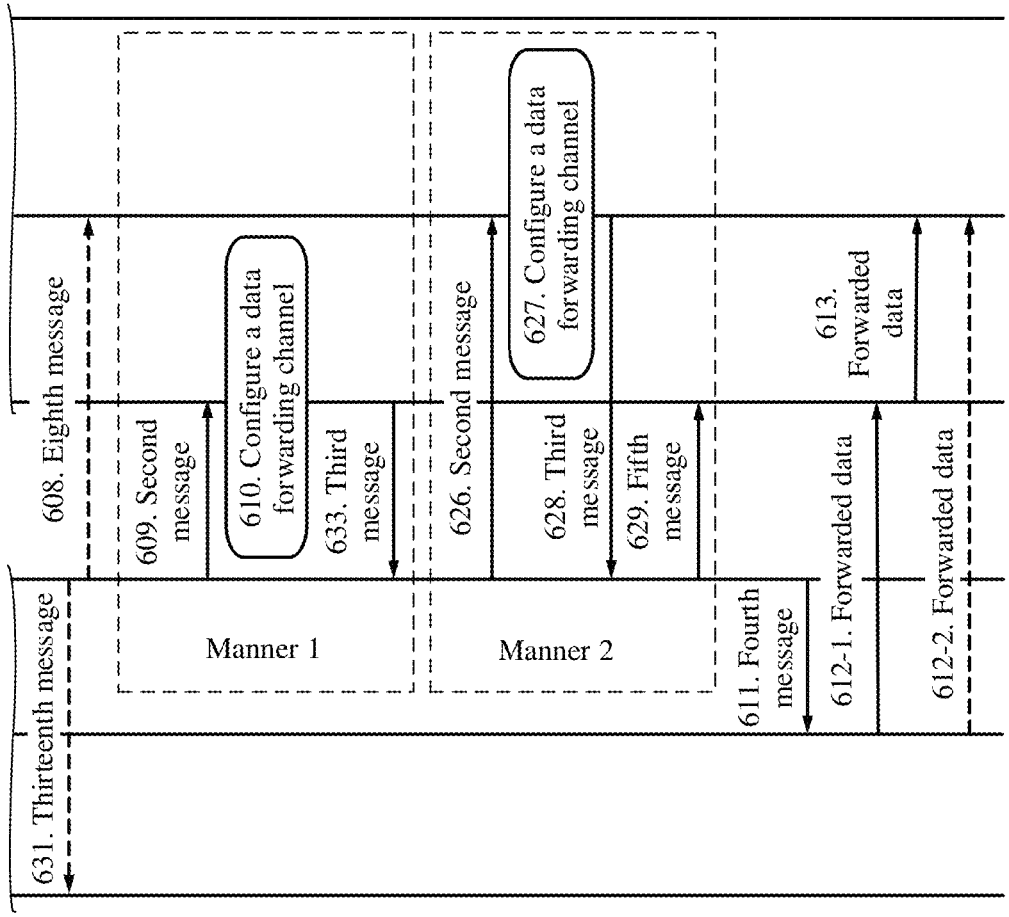

FIG. 6A and FIG. 6B are a schematic flowchart of a process of establishing a data forwarding channel according to at least one embodiment of this application.

In step 601, a terminal device is in an SNPN network, and transmits user plane data in an NPN network by using an NPN PDU session resource in the SNPN network.

In step 602, the terminal device moves from the SNPN network to a PLMN network.

In step 603, after moving from the SNPN network to the PLMN network, the terminal device reestablishes an NPN PDU session resource via the PLMN network. The PDU session resource may be used to transmit new data of the terminal device in the NPN network, or may be used to transmit to-be-forwarded uplink or downlink data of the terminal device in the NPN network. An NPN PDU session whose identifier is the same as that of the NPN PDU session established via the SNPN network may be established for the terminal device via the PLMN network, so as to ensure continuity of the previous NPN PDU session.

For example, a PDU session identity (ID) before mobility is a PDU session ID 1, and a PDU session ID after the mobility is also the PDU session ID 1. Specifically, the terminal device may establish an $N1_{NPN}$ interface with an SNPN AMF by using a PLMN RAN, a PLMN UPF, a PLMN data network, an N3IWF, or the like, and further configure an NPN PDU session resource for the terminal device via the PLMN network. For a specific establishment process, refer to FIG. 3A and FIG. 3B and the related descriptions of FIG. 3A and FIG. 3B. Details are not described herein again.

Optionally, the terminal device may send a NAS message to the SNPN AMF through the newly established $N1_{NPN}$ interface, to notify the SNPN AMF that the terminal device has moved to the PLMN network.

Optionally, the NAS message may further include at least one of a cause value, location information of the terminal device after the mobility, or location information of the terminal device before the mobility.

The cause value may be inter-network mobility, and is used to indicate a cause for establishing the NPN PDU session, or is used to indicate a cause for sending the NAS message by the terminal device. The cause value may be carried in a cause information element, and the cause information element may be a newly added information element or an existing information element that is reused. When the existing information element is reused, the existing cause value may be reused for indication or a newly added cause value may be used for indication. A manner of indicating the cause value is not specifically limited in at least one embodiment of this application. For example, when a source network and a target network are implemented in different manners, the cause value is identified by using SNPN, NPN, PLMN, SNPNtoPLMN, PLMNtoSNPN, NPNtoPLMN, PLMNtoNPN, PNI-NPNtoPLMN, PLMNto-PNI-NPN, SNPNtoSNPN, non-3GPPtoPLMN, PLMN-tonon-3GPP, non-3GPPtonon-3GPP, or InterNetwork-mobility, to indicate NAS information sent by the terminal device due to inter-network mobility, or to indicate that the terminal device needs to establish a PDU session resource due to inter-network mobility, to maintain service continuity.

For example, the foregoing cause value may include the following several possible implementations:

In a possible implementation, if the source network is an SNPN, and the target network is a PNI-NPN or a PLMN, the cause value may be an SNPN character, indicating that an NPN PDU session resource is requested to be established due to an SNPN service.

In another possible implementation, if the source network is a PNI-NPN, and the target network is an SNPN or a PLMN, the cause value is a PNI-NPN character, indicating that a PNI-NPN PDU session resource is requested to be established due to a PNI-NPN service.

In still another possible implementation, if the source network is a PLMN, and the target network is an SNPN or a PNI-NPN, the cause value is a PLMN character, indicating that a PLMN PDU session resource is requested to be established due to a PLMN service.

In still another possible implementation, if the source network is an SNPN, and the target network is a PNI-NPN or a PLMN, the cause value may be an SNPN to PNI-NPN character or an SNPN to PLMN character, indicating that user equipment first accesses the SNPN network, and then the user equipment moves from the SNPN network to the PNI-NPN or the PLMN network, and requests to establish an NPN PDU session resource due to a service of the SNPN network.

In still another possible implementation, if the source network is a PNI-NPN or a PLMN, and the target network is an SNPN, the cause value may be a PNI-NPN to SNPN character or a PLMN to SNPN character, indicating that user equipment first accesses the PNI-NPN or the PLMN network, and then the user equipment moves from the PNI-NPN or the PLMN network to the SNPN network, and requests to establish a PNI-NPN PDU session resource or a PLMN PDU session resource due to a service of the PNI-NPN or the PLMN network.

In still another possible implementation, if the source network is an SNPN, and the target network is another SNPN, the cause value may be an SNPNtoSNPN character or an NID1 to NID2 character, indicating that user equipment first accesses the SNPN network, and then the user equipment moves from the SNPN network to the another SNPN network, and requests to establish an SNPN PDU session resource due to a service of the SNPN network.

It should be understood that the foregoing several possible cases are merely used as examples to describe possible expression forms of the cause value, and constitute no limitation on the protection scope of this application. Details about the cause value are not described in this application. Optionally, before an NPN PDU session resource is established via the PLMN network, a PLMN PDU session resource needs to be established to carry the NPN PDU session resource. In a process of establishing the PLMN PDU session resource, a cause value for establishing the PLMN PDU session resource may be carried. Expression forms of the cause value may also be the foregoing implementations. Details are not described again. The location information of the terminal device after the mobility may be at least one of a PLMN ID of the PLMN network, a tracking area code (TAC), an NG-RAN cell ID, a UE ID, an NG-RAN node ID, or an address of an SNPN N3IWF connected in the PLMN network. The UE ID may be a cell radio network temporary identifier (C-RNTI), an NG-RAN node UE NGAP ID, a RAN UE ID, or the like.

The location information of the terminal before the mobility may be at least one of a TAC, an NG-RAN cell ID, a UE ID, an NG-RAN node ID, or an address of a connected PLMN N3IWF. The address of the N3IWF may be N3IWF transport network layer information, for example, an IP address of the SNPN N3IWF.

To further ensure continuity of the NPN PDU session, data forwarding may be performed. To be specific, uplink data or downlink data that has been transmitted to an NPN access network device continues to be transmitted to the terminal device or an NPN data network.

In at least one embodiment of this application, data forwarding may be requested to be performed in the following manners.

Manner 1: The terminal device determines, based on a data receiving/sending status of the terminal device, whether to request to perform data forwarding.

When data forwarding needs to be performed, specifically, in step 604, the terminal device determines a first message. The first message is used to indicate that the terminal device moves across networks, and requests to establish a data forwarding channel.

Optionally, the first message may carry a cause value for data forwarding, to indicate a cause for data forwarding. The cause for data forwarding may be inter-network mobility, and the cause value may be in the foregoing implementations. The cause for data forwarding may be carried in a cause information element, and the cause information element may be a newly added information element or an existing information element that is reused. When the existing information element is reused, the existing cause value may be reused for indication or a newly added cause value may be used for indication. A manner of indicating the cause for data forwarding is not specifically limited in at least one embodiment of this application. For example, when the source network is an SNPN network, and the target network is a PLMN network, the cause value may be SNPN to PLMN, indicating that an NPN PDU session resource needs to be established to forward data of an NPN PDU session, due to mobility of the terminal device from the SNPN to the PLMN. Because the terminal device reports information about forwarded data, the terminal device may further indicate the forwarded data by using the first message.

Optionally, when a data forwarding channel of a PDU session granularity is established, the first message may carry a PDU session ID, a QoS flow identifier, a DRB identifier (DRB ID), a mapping list between a DRB and a QoS flow, or the like for data forwarding.

Optionally, when a data forwarding channel of a DRB granularity is established, the first message further needs to carry transmission status information of data on the DRB in addition to the PDU session ID, the QoS flow identifier, the DRB identifier (DRB ID), or the mapping list between a DRB and a QoS flow for data forwarding. The transmission status information of the data on the DRB includes: a PDCP SN and HFN receiver status information, or a downlink PDCP SN and an HFN transmitter status information. Specifically, the status information may be described by a UL/DL COUNT Value information element, a Receive Status of UL PDCP SDUs information element, a Transmit Status of UL PDCP SDUs information element, and the like. The UL/DL COUNT Value information element includes a UL/DL PDCP SN and an HFN for a PDCP SN. The Receive Status of UL PDCP SDUs information element may reflect whether a specific UL PDCP SDU has been successfully received. For example, 0 indicates that a corresponding PDCP has not been successfully received, and 1 indicates that the corresponding PDCP has been successfully received. The Transmit Status of UL PDCP SDUs information element may reflect whether a specific UL PDCP SDU has been successfully sent. For example, 0 indicates that a corresponding PDCP has not been successfully sent, and 1 indicates that the corresponding PDCP has been successfully sent.

In step 605, the terminal device sends the first message to the SNPN AMF, and the SNPN AMF receives the first message. Optionally, the first message may be a NAS message. Therefore, the terminal device may send the first message through the $N1_{NPN}$ interface. Optionally, the first message may be RAN status transfer signaling.

In step 606, after receiving the first message, the SNPN AMF determines the NPN access network device in which the terminal device is located before the terminal device moves to the PLMN network.

Optionally, when the first message carries the location information of the terminal device before the mobility, the SNPN AMF may determine, based on the location information of the terminal device before the mobility, an SNPN RAN in which the terminal device is located before the mobility.

In step 607, the SNPN AMF sends a seventh message to the SNPN RAN determined in step 606. The seventh message is used to indicate, to the NPN access network device, that the terminal device needs to perform data forwarding.

Optionally, when the first message also indicates forwarded data, the SNPN AMF may forward the indication to the SNPN RAN by using the seventh message, and the SNPN RAN may determine the forwarded data based on the indication of the seventh message. For example, the SNPN AMF may indicate the forwarded data by using the radio access network status transfer (RAN status transfer) signaling.

In addition, when the first message includes the address information of the SNPN N3IWF connected to the terminal device after the mobility, the AMF may further notify, by using a seventh message, the SNPN RAN of the address information of the SNPN N3IWF connected to the terminal device after the mobility. Therefore, when there is a direct interface between the SNPN RAN and the SNPN N3IWF network element, the SNPN RAN directly sends the forwarded data to the SNPN N3IWF. Optionally, the AMF may alternatively notify, by using a seventh message, the SNPN RAN of address information of a UPF to which data needs to be forwarded. The UPF may be a UPF of the NPN network required for the NPN PDU session resource established after the terminal device moves.

Optionally, the seventh message may further carry the cause value for data forwarding. The cause value for data forwarding may be in the foregoing implementations.

In at least one embodiment of this application, data forwarding may alternatively be requested to be performed in the following manner.

Manner 2: The SNPN RAN determines, based on a data receiving/sending status of the terminal device, whether to request to perform data forwarding.

Specifically, in step 604, the terminal device determines a first message. The first message is used to indicate that the terminal device moves across networks.

In step 605, the terminal device sends the first message to the SNPN AMF, and the SNPN AMF receives the first message. Optionally, the first message may be a NAS message. Therefore, the terminal device may send the first message through the $N1_{NPN}$ interface.

In step 606, after receiving the first message, the SNPN AMF determines the NPN access network device in which the terminal device is located before the terminal device moves to the PLMN network.

Optionally, when the first message carries the location information of the terminal device before the mobility, the SNPN AMF may determine, based on the location information of the terminal device before the mobility, an SNPN RAN in which the terminal device is located before the mobility.

In step 607, the SNPN AMF sends a seventh message to the SNPN RAN determined in step 606. The seventh message is used to indicate, to the SNPN RAN, that the terminal device moves across networks.

After receiving the seventh message, the SNPN RAN determines, based on the data receiving/sending status of the terminal device, whether to request to perform data forwarding. When data forwarding needs to be performed, step 630 is performed. The SNPN RAN sends a sixth message to the SNPN AMF, and the SNPN AMF receives the sixth message. The sixth message is used to request to establish a data forwarding channel for the terminal device.

Optionally, the sixth message may carry a cause why data forwarding is required. The cause for data forwarding may be inter-network mobility. The cause for data forwarding may be carried in a cause information element, and the cause information element may be a newly added information element or an existing information element that is reused. When the existing information element is reused, the existing cause value may be reused for indication or a newly added cause value may be used for indication. A manner of indicating the cause for data forwarding is not specifically limited in at least one embodiment of this application.

The SNPN RAN may further indicate information about forwarded data by using the sixth message.

Optionally, when a data forwarding channel of a PDU session granularity is established, the sixth message may carry a PDU ID, a QoS flow identifier, a DRB identifier (DRB ID), a mapping list between a DRB and a QoS flow, or the like for data forwarding. Optionally, when a data forwarding channel of a DRB granularity is established, the sixth message further needs to carry transmission status information of data on the DRB in addition to the PDU ID, the QoS flow identifier, the DRB identifier (DRB ID), or the mapping list between a DRB and a QoS flow for data forwarding. The transmission status information of the data on the DRB includes: a PDCP SN and HFN receiver status information, or a downlink PDCP SN and an HFN transmitter status information description. Specifically, the status information may be described by a UL/DL COUNT Value information element, a Receive Status of UL PDCP SDUs information element, a Transmit Status of UL PDCP SDUs information element, and the like. The UL/DL COUNT Value information element includes a UL/DL PDCP SN and an HFN for a PDCP SN. The Receive Status of UL PDCP SDUs information element may reflect whether a specific UL PDCP SDU has been successfully received. For example, 0 indicates that a corresponding PDCP has not been successfully received, and 1 indicates that the corresponding PDCP has been successfully received. The Transmit Status of UL PDCP SDUs information element may reflect whether a specific UL PDCP SDU has been successfully sent. For example, 0 indicates that a corresponding PDCP has not been successfully sent, and 1 indicates that the corresponding PDCP has been successfully sent. Optionally, the sixth message may be RAN status transfer signaling.

Further, in step 631, the SNPN AMF sends a thirteenth message to the terminal device, and the terminal device receives the thirteenth message. The thirteenth message is used to indicate the information about the forwarded data. Optionally, the thirteenth message may be a NAS message. Therefore, the terminal device may send the thirteenth message through the N1NPN interface.

Optionally, step 603 is performed after the terminal device receives the thirteenth message. To be specific, after obtaining to-be-forwarded data, the terminal device requests to establish a corresponding NPN PDU session resource, and notifies the SNPN AMF of a PDU session identifier to which the forwarded data belongs, or may notify the SNPN AMF of a PDU session identifier list corresponding to the forwarded data and a sequence of forwarding the data by using various PDU sessions. The PDU session identifier may be a PDU session identifier of a source network SNPN, or may be a PDU session identifier of a target network PLMN network. Optionally, the thirteenth message may carry a cause value, to notify the SNPN AMF that a cause for data forwarding is inter-network mobility. A cause value may be in the foregoing expression forms. Details are not described again. The PDU session resource may be used to transmit new data of a new PDU session, and may also be used as a data forwarding channel.

Optionally, if step 603 is performed before the terminal device receives the thirteenth message, the SNPN AMF may notify the terminal device by using the thirteenth message that the NPN PDU session resource established in step 603 may also be used for forwarding data, and notify the terminal device of the PDU session identifier to which the forwarded data belongs, or notify the terminal device of the PDU session identifier list corresponding to the forwarded data and the sequence of forwarding the data by using the various PDU sessions. The PDU session identifier may be a PDU session identifier of a source network SNPN, or may be a PDU session identifier of a target network PLMN network. Optionally, the thirteenth message may carry a cause value, to notify the terminal device that a cause for data forwarding is inter-network mobility. A cause value may be in the foregoing expression forms. Details are not described again. After the terminal device sends the first message to the SNPN AMF, the terminal device, the SNPN RAN, and the SNPN AMF determine a connection management (CM) status or a radio resource control (RRC) status of the terminal device in the SNPN network, and the terminal device, the PLMN RAN, and a PLMN AMF determine a CM status or an RRC status of the terminal device in the PLMN network, so that the terminal device, the SNPN RAN, the SNPN AMF, the PLMN RAN, and the PLMN AMF store, release, resume, or establish a context. The connection management status includes a connection management connected state (CM-connected) or a connection management idle state (CM-Idle). The radio resource control status includes a radio resource control connected state (RRC-connected), a radio resource control idle state (RRC-idle), or a radio resource control inactive state (RRC-inactive).

Figure 7A:
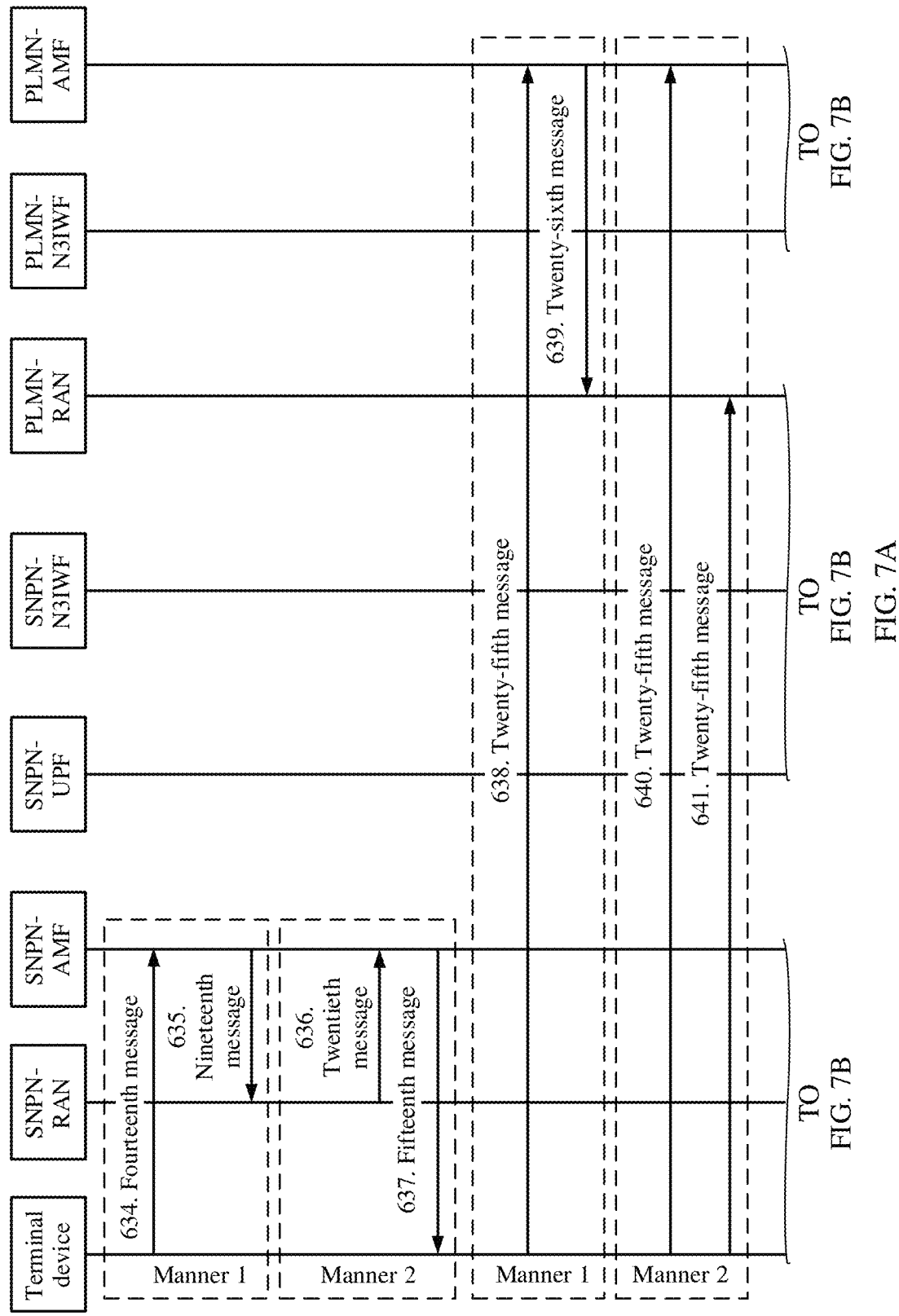
FIG. 7A and FIG. 7B are a schematic diagram of determining RRC statuses of a terminal device in an SNPN network and a PLMN network according to at least one embodiment of this application.
Figure 7B:
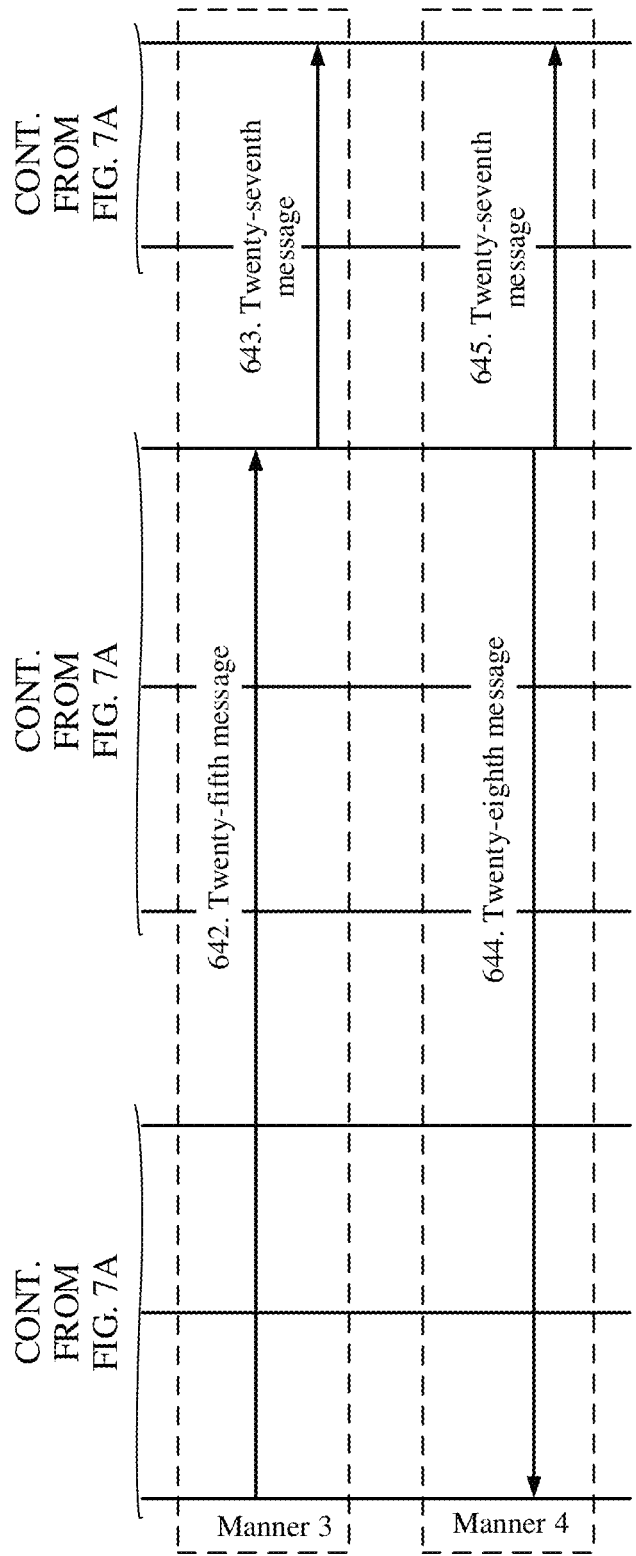

1. As shown in FIG. 7A and FIG. 7B, the CM status or the RRC status of the terminal device in the SNPN network may be indicated in the following two manners.

Manner 1: Perform steps 634 and 635.

After determining the CM status or the RRC status, the terminal device performs step 634: The terminal device sends a fourteenth message to the SNPN AMF, and the SNPN AMF receives the fourteenth message. The fourteenth message is used to indicate the CM status or the RRC status of the terminal device in the SNPN network.

In step 635, after receiving the fourteenth message, the SNPN AMF sends a nineteenth message to the SNPN RAN, and the SNPN RAN receives the nineteenth message. The nineteenth message is used to indicate the CM status or the RRC status of the terminal device in the SNPN network.

In other words, the terminal device determines the CM status or the RRC status, and indicates the CM status or the RRC status to the SNPN AMF, and then the SNPN AMF indicates the CM status or the RRC status to the SNPN RAN with reference to the CM status or the RRC status of the terminal device on the SNPN AMF.

A specific indication manner may be that the connection management status or the radio resource control status of the terminal device in the first network after the mobility may be indicated by including an indication identifier in the fourteenth message and the nineteenth message, or by using the message. For example, the foregoing message is a radio resource control release (RRC release) message, a proximity indication, an uplink information transfer (UL information transfer) indication, a measurement report, a radio resource control setup request (RRC setup request) message, a radio resource control setup complete (RRC setup complete) message, a radio resource control reestablishment request (RRC reestablishment request) message, a radio resource control reestablishment complete (RRC reestablishment complete) message, a radio resource control resume request (RRC resume request) message, a radio resource control reconfiguration complete (RRC reconfiguration complete) message, a location measurement indication, user context release command (UE context release Command) signaling, or other newly defined signaling.

Manner 2: Perform steps 636 and 637.

After receiving the seventh message, the SNPN RAN determines the CM status or the RRC status, and further performs step 636: The SNPN RAN sends a twentieth message to the SNPN AMF, and the SNPN AMF receives the twentieth message. The twentieth message is used to indicate the CM status or the RRC status of the terminal device in the SNPN network.

In step 637, after receiving the twentieth message, the SNPN AMF sends a fifteenth message to the terminal device, and the terminal device receives the fifteenth message. The fifteenth message is used to indicate the CM status or the RRC status of the terminal device in the SNPN network.

In other words, the SNPN RAN determines the CM status or the RRC status, and indicates the CM status or the RRC status to the SNPN AMF, and then the SNPN AMF indicates the CM status or the RRC status to the terminal device with reference to the CM status or the RRC status of the terminal device on the SNPN AMF.

For a specific indication manner, refer to the descriptions in Manner 1. Details are not described herein again.

Optionally, the information in the foregoing two manners may carry a cause value. The cause value is used by a transmit end to notify a receive end of a cause for sending the information. The cause value may be in the foregoing expression forms. Details are not described again.

For example, after moving from the SNPN network to the PLMN network, the terminal device sends a NAS message to the SNPN AMF to request to resume a context of the terminal device. The message carries a cause value to notify the SNPN AMF of a NAS request initiated because the terminal device moves across networks. Then, the SNPN AMF sends a NAS message to notify the terminal device that context information of the terminal device is successfully resumed.

For another example, the terminal device does not move from the SNPN network to the PLMN network, and still stays in the SNPN network, and the terminal device sends an RRC resume request (RRC Resume request) message to the SNPN RAN. The message carries a cause value to notify the SNPN RAN of an RRC resume request initiated because the terminal device is ready to move across networks but does not move. If the SNPN RAN locally stores a context of the terminal device, the SNPN RAN sends an RRC resume message to the terminal device. If the SNPN RAN does not locally store the context of the terminal device, the SNPN RAN may obtain the context of the terminal device from the SNPN AMF, and then sends an RRC resume message to the terminal device. 2. As shown in FIG. 7A and FIG. 7B, the CM status or the RRC status of the terminal device in the PLMN network may be indicated in the following four manners.

Manner 1: Perform steps 638 and 639.

After determining the CM status or the RRC status, the terminal device performs step 638: The terminal device sends a twenty-fifth message to the PLMN AMF, and the PLMN AMF receives the twenty-fifth message. The twenty-fifth message is used to indicate the CM status or the RRC status of the terminal device in the SNPN network.

In step 639, after receiving the twenty-fifth message, the PLMN AMF sends a twenty-sixth message to the PLMN RAN, and the PLMN RAN receives the twenty-sixth message. The twenty-sixth message is used to indicate the CM status or the RRC status of the terminal device in the PLMN network.

In other words, the terminal device determines the CM status or the RRC status, and indicates the CM status or the RRC status to the PLMN AMF, and then the PLMN AMF indicates the CM status or the RRC status to the PLMN RAN with reference to the CM status or the RRC status of the terminal device on the PLMN AMF.

A specific indication manner may be that the connection management status or the radio resource control status of the terminal device in the first network after the mobility may be indicated by including an indication identifier in the twenty-fifth message and the twenty-sixth message, or by using the message. For example, the foregoing message is a radio resource control release (RRC release) message, a proximity indication, an uplink information transfer (UL information transfer) indication, a measurement report, a radio resource control setup request (RRC setup request) message, a radio resource control setup complete (RRC setup complete) message, a radio resource control reestablishment request (RRC reestablishment request) message, a radio resource control reestablishment complete (RRC reestablishment complete) message, a radio resource control resume request (RRC resume request) message, a radio resource control reconfiguration complete (RRC reconfiguration complete) message, a location measurement indication, user context release command (UE context release Command) signaling, or other newly defined signaling.

Manner 2: Perform steps 640 and 641.

The terminal device determines the CM status or the RRC status, and further performs steps 640 and 641: The terminal device sends a twenty-fifth message to the PLMN AMF and the PLMN RAN, and the PLMN AMF and the PLMN RAN receive the twenty-fifth message. The twenty-fifth message is used to indicate the CM status or the RRC status of the terminal device in the PLMN network.

In other words, the terminal device determines the CM status or the RRC status, and indicates the CM status or the RRC status to the PLMN AMF and the PLMN RAN.

For a specific indication manner, refer to the descriptions in Manner 1. Details are not described herein again.

Manner 3: Perform steps 642 and 643.

After determining the CM status or the RRC status, the terminal device further performs step 642: The terminal device sends a twenty-fifth message to the PLMN RAN, and the PLMN RAN receives the twenty-fifth message. The twenty-fifth message is used to indicate the CM status or the RRC status of the terminal device in the PLMN network.

In step 643, after receiving the twenty-fifth message, the PLMN RAN sends a twenty-seventh message to the PLMN AMF, and the PLMN AMF receives the twenty-seventh message. The twenty-seventh message is used to indicate the CM status or the RRC status of the terminal device in the PLMN network.

In other words, the terminal device determines the CM status or the RRC status, and indicates the CM status or the RRC status to the PLMN RAN, and then the PLMN RAN indicates the CM status or the RRC status to the PLMN AMF with reference to the CM status or the RRC status of the terminal device on the PLMN RAN. For a specific indication manner, refer to the descriptions in Manner 1. Details are not described herein again.

Manner 4: Perform steps 644 and 645.

The PLMN RAN determines the CM status or the RRC status, and further performs 644 and 645: The PLMN RAN sends a twenty-seventh message to the PLMN AMF, and sends a twenty-eighth message to the terminal device, the PLMN AMF receives the twenty-seventh message, and the terminal device receives the twenty-eighth message. The twenty-seventh message and the twenty-eighth message are used to indicate the CM status or the RRC status of the terminal device in the SNPN network.

In other words, the PLMN RAN determines the CM status or the RRC status, and indicates the CM status or the RRC status to the PLMN AMF and the terminal device.

For a specific indication manner, refer to the descriptions in Manner 1. Details are not described herein again.

It may be understood that when the terminal device determines the CM status or the RRC status, the terminal device may further indicate, by using the first message, the CM status or the RRC status of the terminal device in the SNPN network, or the CM status or the RRC status of the terminal device in the PLMN network.

Optionally, the information in the foregoing four manners may carry a cause value. The cause value is used by a transmit end to notify a receive end of a cause for sending the information. The cause value may be in the foregoing expression forms. Details are not described again.

For example, after moving from the SNPN network to the PLMN network, the terminal device sends an RRC resume request (RRC Resume request) message to the PLMN RAN. The message carries a cause value to notify the PLMN RAN of the RRC resume request initiated because the terminal device moves across networks. If the PLMN RAN does not locally store a context of the UE, the PLMN RAN may obtain the context of the terminal device from the PLMN AMF, and then send an RRC resume (RRC Resume) message to the terminal device.

In at least one embodiment of this application, a data forwarding channel may be configured in the following manner.

Manner 1: An SNPN UPF configures a data forwarding channel for forwarded data. For details, refer to steps 609, 610, and 633 in FIG. 6B.

Specifically, in step 609, the SNPN AMF sends a second message to the SNPN UPF, and the SNPN UPF receives the second message. The second message is used to indicate to establish a data forwarding channel for the terminal device.

After receiving the first message of the terminal device, the SNPN AMF sends the second message to the SNPN UPF, to indicate the SNPN UPF to establish a data forwarding channel between the SNPN RAN and the SNPN UPF for the terminal device for user plane data forwarding. The second message carries information about the forwarded data.

Optionally, when the first message also indicates the forwarded data, the SNPN AMF may forward the indication to the SNPN UPF by using the second message. For example, the SNPN AMF may indicate the information about the forwarded data by using the radio access network status transfer (RAN status transfer) signaling.

In addition, when the first message includes an address of an SNPN N3IWF connected to the terminal device after the mobility, the AMF may further notify, by using the second message, the SNPN UPF of the address of the SNPN N3IWF connected to the terminal device after the mobility. Therefore, the SNPN UPF sends the forwarded data to the SNPN N3IWF.

Optionally, the second message may further carry the cause for data forwarding. The cause value for data forwarding may be in the foregoing implementations.

In step 610, after receiving the second message, the SNPN UPF configures a data forwarding channel for the terminal device.

Specifically, the SNPN UPF configures at least one of uplink forwarding user plane transport network layer information (UL Forwarding UP TNL Information) and downlink forwarding user plane transport network layer information (DL Forwarding UP TNL Information) for a corresponding PDU session, a DRB, or a QoS flow. The forwarding user plane transport network layer information may include a transport layer address (for example, an IP address of an endpoint) and a GTP tunnel endpoint identifier (such as a GTP-TEID, GTP-Tunnel Endpoint Identifier).

In step 633, the SNPN UPF sends a third message to the SNPN AMF. The third message is used to indicate the transport network layer information.

In at least one embodiment of this application, a data forwarding channel may alternatively be configured in the following manner.

Manner 2: The SNPN N3IWF configures a data forwarding channel for forwarded data. For details, refer to steps 626 to 629 in FIG. 6B.

Specifically, in step 626, the SNPN AMF sends a second message to the SNPN N3IWF, and the SNPN N3IWF receives the second message. The second message is used to indicate to establish a data forwarding channel for the terminal device. The second information carries information about the forwarded data.

Optionally, when the first message also indicates the forwarded data, the SNPN AMF may forward the indication to the SNPN N3IWF by using the second message. For example, the SNPN AMF may indicate the forwarded data by using the radio access network status transfer (RAN status transfer) signaling.

Optionally, the second message may further carry the cause for data forwarding. The cause for data forwarding may be inter-network mobility.

In step 627, after receiving the second message, the SNPN N3IWF configures the data forwarding channel for the terminal device.

Specifically, the SNPN N3IWF configures at least one of uplink forwarding user plane transport network layer information (UL Forwarding UP TNL Information) and downlink forwarding user plane transport network layer information (DL Forwarding UP TNL Information) for a corresponding PDU session, a DRB, or a QoS flow. The forwarding user plane transport network layer information may include a transport layer address (for example, an IP address of an endpoint) and a GTP tunnel endpoint identifier (such as a GTP-TEID, GTP-Tunnel Endpoint Identifier).

In step 628, the SNPN N3IWF sends a third message to the SNPN AMF, and the SNPN AMF receives the third message. The third message is used to indicate transport network layer information of the data forwarding channel for the terminal device.

In step 629, the SNPN AMF sends an fifth message to the SNPN UPF, and the SNPN UPF receives the fifth message. The fifth message is used to indicate transport network layer information of the data forwarding channel for the terminal device.

After the data forwarding channel is configured, further, in step 611, the SNPN AMF sends a fourth message to the SNPN RAN, and the SNPN RAN receives the fourth message. The fourth message is used to indicate transport network layer information of the data forwarding channel for the terminal device.

Further, when there is no direct interface between the SNPN RAN and the SNPN N3IWF network element, steps 612-1 and 613 are performed. That is, the SNPN RAN sends forwarded data to the SNPN UPF based on the fourth message, and the SNPN UPF receives the forwarded data. That is, the SNPN RAN transmits the forwarded data through the data forwarding channel that is between the SNPN RAN and the SNPN UPF and that is configured by the SNPN UPF in step 610. In step 613, the SNPN UPF sends the received forwarded data to the SNPN N3IWF network element.

When there is a direct interface between the SNPN RAN and the SNPN N3IWF network element, step 612-2 is performed. That is, the SNPN RAN directly sends the forwarded data to the SNPN N3IWF. It should be understood that when there is a direct interface between the SNPN RAN and the SNPN N3IWF network element, steps 612-1 and 613 may also be performed.

Figure 8B:
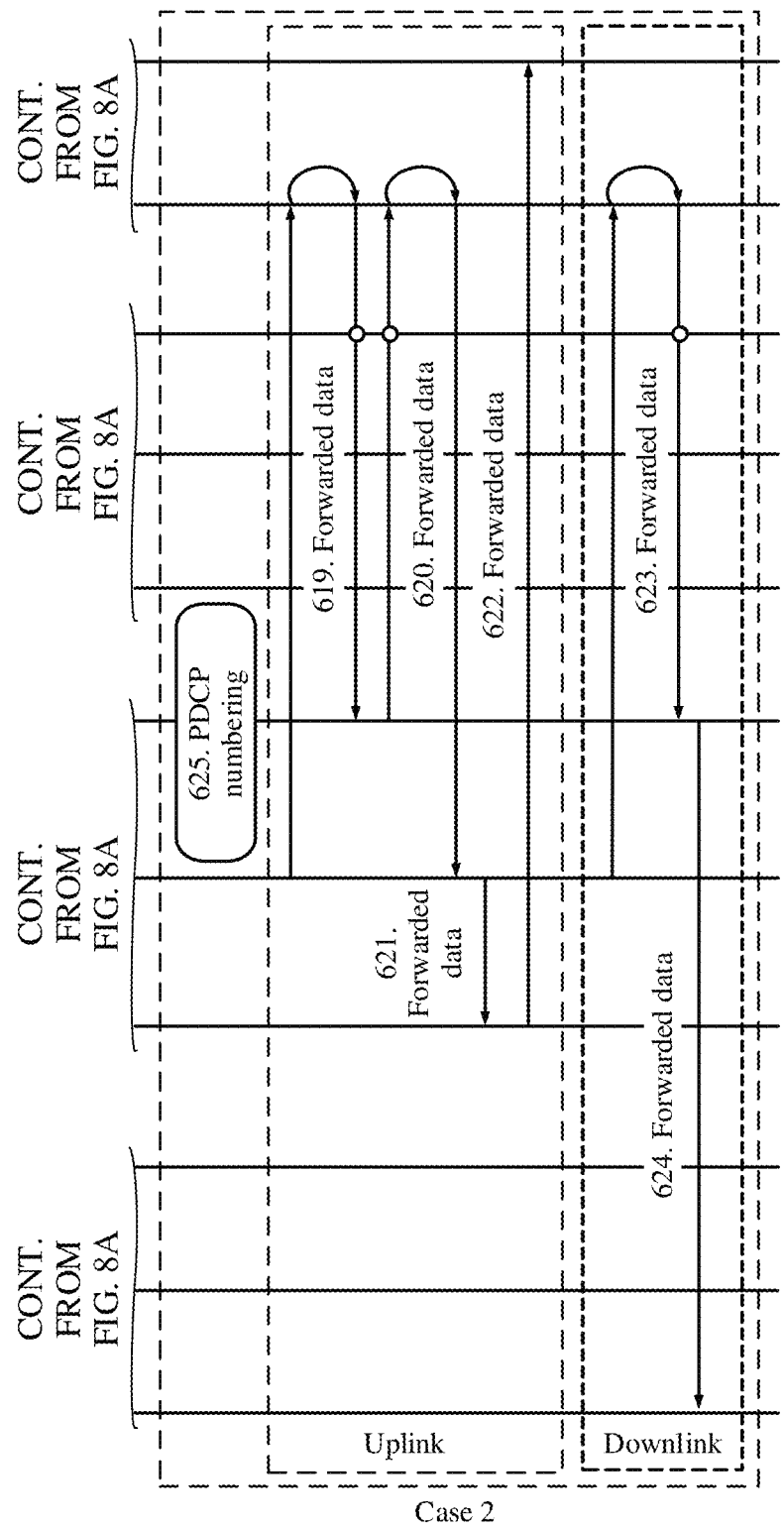

The NPN PDU session configured by the PLMN network for the terminal device may include newly arrived data in addition to forwarded data, or data is forwarded at a granularity of a DRB. Therefore, the forwarded data and the newly arrived data are numbered, to ensure sequential transmission of the data. FIG. 8A and FIG. 8B are a schematic flowchart of data forwarding according to at least one embodiment of this application. After the SNPN N3IWF network element receives forwarded data, based on different functions of the SNPN N3IWF network element, a data forwarding process may be classified into two cases shown in FIG. 8A and FIG. 8B.

Case 1: The SNPN N3IWF network element has a PDCP coding function.

When the SNPN N3IWF network element has the PDCP coding function, the SNPN N3IWF network element may perform step 614 to perform PDCP numbering on forwarded data and newly arrived data. Specifically, the SNPN N3IWF performs PDCP numbering on the forwarded data and the newly arrived data based on information about the forwarded data. The SNPN N3IWF may learn, from the SNPN AMF, information about data to be forwarded. Optionally, before step 614, the SNPN AMF performs step 608: The SNPN AMF sends an eighth message to the SNPN N3IWF, and the SNPN N3IWF receives the eighth message. The eighth message is used to indicate the information about the forwarded data. Optionally, the eighth message may be radio access network status transfer (RAN status transfer) signaling.

When the forwarded data is uplink data of a DRB granularity, step 615 is performed after step 614. The SNPN N3IWF network element sequentially sends uplink data of an NPN PDU session to be forwarded and newly arrived data of the NPN PDU session to the SNPN UPF based on information such as an uplink PDCP sequence number included in the information about the forwarded data received in step 608. Further, in step 616, the SNPN UPF uploads the received forwarded data and the newly arrived data to the NPN data network, to complete uplink data transmission.

When the forwarded data is downlink data of a DRB granularity, step 617 is performed after step 614. The SNPN N3IWF network element sends, based on information such as a downlink PDCP sequence number included in the information about the forwarded data received in step 608, PDCP-numbered forwarded data of an NPN PDU session to the PLMN RAN via a data network of the PLMN network, the PLMN UPF, and the like. That is, after data is forwarded by using an NPN PDU session resource, and downlink data transmission is completed, a data transmission end maker is added to the end of the forwarded data, and then newly arrived downlink data of the NPN PDU session is transmitted to the PLMN RAN by using NPN PDU session resource. Further, in step 618, the PLMN RAN sends the received forwarded data and the newly arrived data to the terminal device, to complete downlink data transmission.

It may be understood that the SNPN N3IWF should not transmit any uplink data whose PDCP SN value is lower than the UL PDCP SN value provided in the eighth message, and should use a provided DL PDCP SN value as a PDCP SN value of a to-be-sent first downlink data packet to which a PDCP SN has not been allocated, to perform sequential transmission of the data, so as to avoid repeated transmission of the data.

It should be understood that when uplink forwarded data or downlink forwarded data is of a PDU session granularity, the N3IWF only needs to sequentially send the forwarded data and the newly arrived data to the terminal device or an NPN core network.

Case 2: The SNPN N3IWF network element does not have a PDCP coding function.

When the SNPN N3IWF network element does not have the PDCP coding function, the PLMN RAN may perform PDCP numbering on forwarded data and newly arrived data. Before the PLMN RAN numbers the forwarded data, the terminal device may notify, for example, by using a thirty-seventh message or a forty-third message, the PLMN RAN of information about data to be forwarded. Alternatively, the PLMN RAN may directly obtain, from a twenty-sixth message or a thirty-sixth message, information about data to be forwarded, so as to correctly transmit the newly arrived data and the forwarded data.

When the forwarded data is uplink data and data is forwarded at a granularity of a DRB, because the SNPN N3IWF network element does not have a PDCP coding function, the SNPN N3IWF network element may first send forwarded NPN PDU session data to the PLMN RAN by using the NPN PDU session resource, so that the PLMN RAN transmits the forwarded data based on information such as an uplink PDCP sequence number included in the information about the forwarded data. Specifically, in step 619, the SNPN N3IWF network element sends forwarded data on which PDCP numbering is not performed, to the PLMN RAN via a PLMN data network, a PLMN UPF, or the like. The PLMN RAN performs step 625 to select, based on information such as an uplink PDCP sequence number included in information about forwarded data, forwarded data to be uploaded to the core network from forwarded data of the NPN PDU session. In step 620, the PLMN RAN sends the forwarded data of the NPN PDU session and the newly arrived data of the NPN PDU session to the SNPN N3IWF network element via the PLMN UPF, the PLMN data network, or the like. In step 621, the SNPN N3IWF network element sends the forwarded data and the newly arrived data to the SNPN UPF. In step 622, the SNPN UPF uploads the received forwarded data and the newly arrived data to the NPN data network, to complete uplink data transmission. It should be understood that in this case, the N3IWF forwards uplink forwarded data of the NPN PDU session to the PLMN RAN through the IPsec tunnel, and the PLMN RAN transmits the data to the N3IWF through the IPsec tunnel. The N3IWF then transmits the data to an NPN data network DN. Therefore, the DN needs to parse an IPsec packet header twice for the forwarded data.

When the forwarded data is downlink data, and the forwarded data is of a DRB granularity, in step 623, the SNPN N3IWF network element sends the forwarded data that is of the NPN PDU session and on which PDCP numbering is not performed, and the newly arrived data of the NPN PDU session to the PLMN RAN via the PLMN data network, the PLMN UPF, and the like. The PLMN RAN performs step 625 to perform PDCP numbering on the forwarded data and the newly arrived data. Further, in step 624, the PLMN RAN sends the forwarded data that is of the NPN PDU session and on which PDCP numbering is performed, and the newly arrived data of the NPN PDU session to the terminal device, to complete downlink data transmission. It may be understood that, the PLMN RAN should not transmit any uplink data with a PDCP SN value lower than the UL PDCP SN value provided in the eighth message, and should use a provided DL PDCP SN value as a PDCP SN value of a to-be-sent first downlink data packet to which a PDCP SN has not been allocated, to perform sequential transmission of the data, so as to avoid repeated transmission of the data.

It should be understood that when the uplink forwarded data or the downlink forwarded data is of a PDU session granularity, the PLMN RAN only needs to sequentially send the forwarded data and the newly arrived data to the terminal device or the NPN core network.

It should be understood that when the N3IWF has a PDCP numbering function, the PLMN RAN may also perform PDCP numbering.

In another possible implementation, before the NPN PDU session resource is established for the terminal device via the PLMN network, a data forwarding channel between the SNPN RAN and the SNPN UPF may be configured for the terminal device, so as to perform data forwarding. The following describes a data transmission method in at least one embodiment of this application with reference to FIG. 9.

Figure 9A:
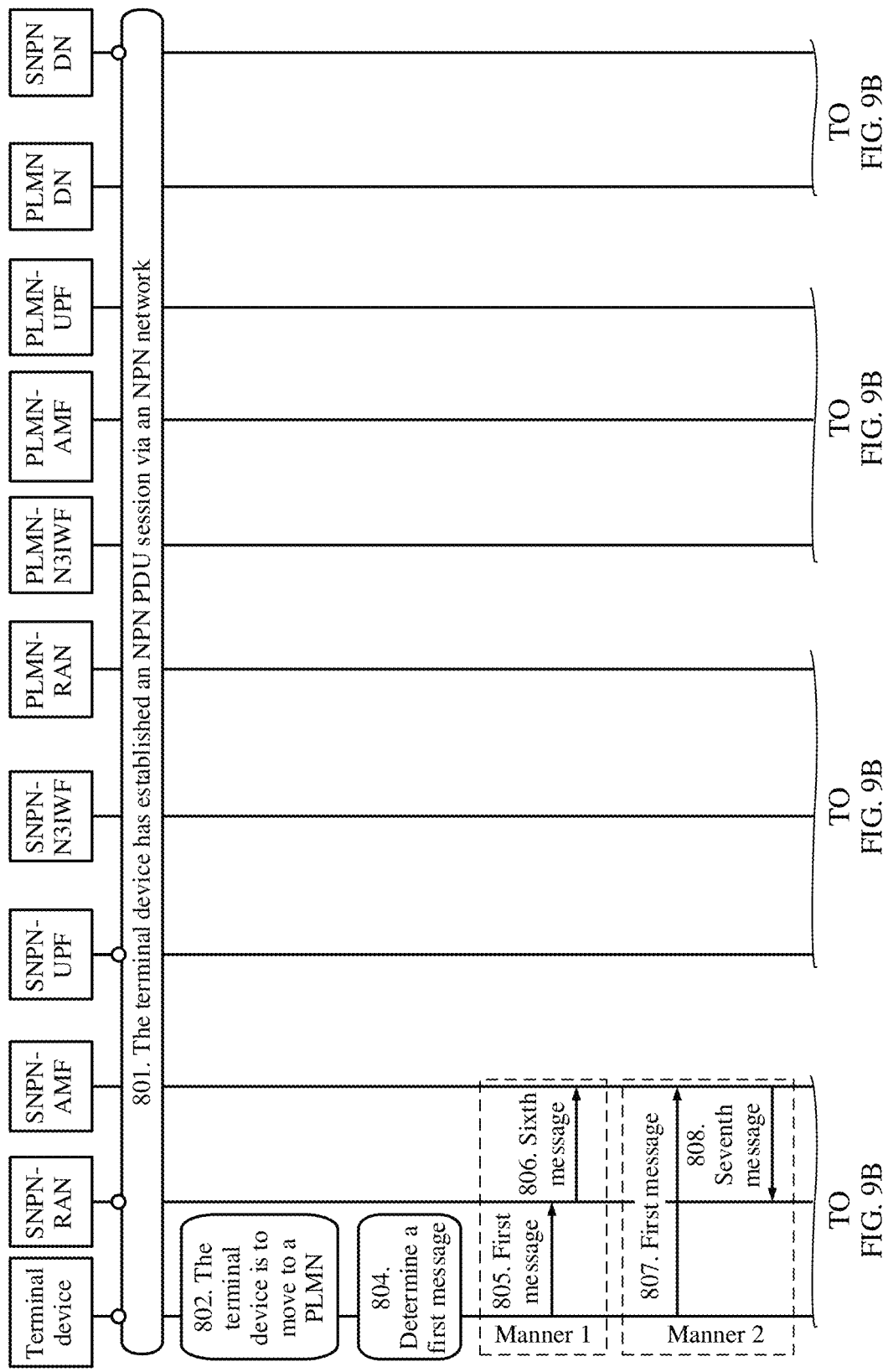
Figure 9C:
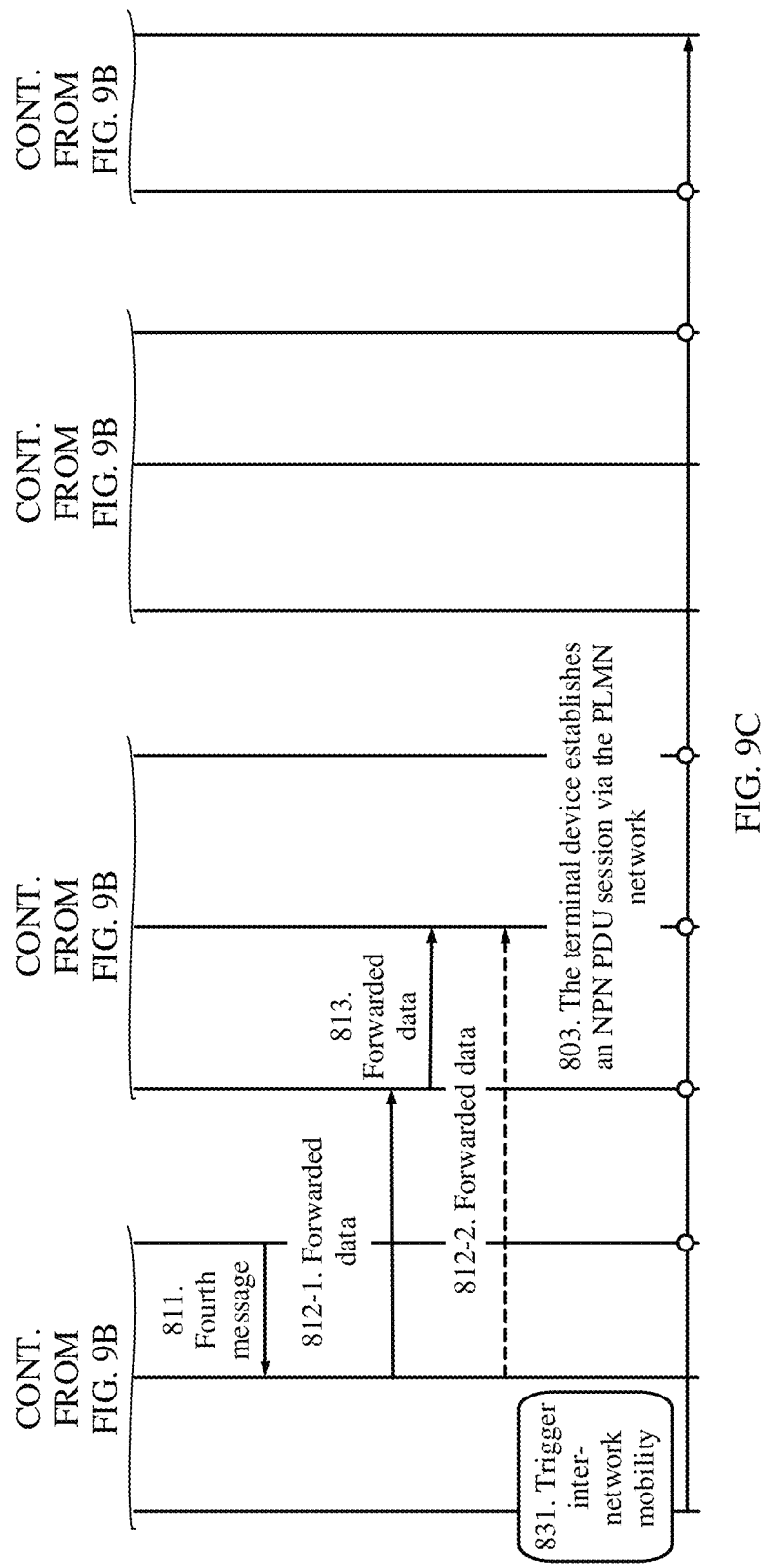

FIG. 9A, FIG. 9B, and FIG. 9C are a schematic flowchart of a process of establishing a data forwarding channel according to at least one embodiment of this application.

In step 801, a terminal device is in an SNPN network, and transmits user plane data in an NPN network by using a PDU session in the SNPN network.

In step 802, the terminal device is to move from the SNPN network to a PLMN network.

In at least one embodiment of this application, data forwarding may be requested to be performed in the following manners.

The terminal device determines, based on a data receiving/sending status of the terminal device, whether to request to perform data forwarding.

When data forwarding needs to be performed, specifically, in step 804, the terminal device determines a first message. The first message is used to indicate that the terminal device is to move across networks, and requests to establish a data forwarding channel.

Optionally, the first message may carry a cause why data forwarding is required. For specific descriptions, refer to the related descriptions of FIG. 6A and FIG. 6B. For brevity, details are not described herein again.

Because the terminal device reports information about the forwarded data, the terminal device may further indicate the information about the forwarded data by using the first message. For specific descriptions, refer to the related descriptions of FIG. 6A and FIG. 6B. For brevity, details are not described herein again.

Optionally, the first message may further include at least one of a PLMN ID of a PLMN network to which the terminal device is to move, a TAC, an NG-RAN cell ID, a UE ID, an NG-RAN node ID, or an address of a connected SNPN N3IWF. The UE ID may be a C-RNTI, an NG-RAN node UE NGAP ID, or the like. The address of the SNPN N3IWF may be transport network layer information of the SNPN N3IWF, for example, an IP address of the SNPN N3IWF.

Further, the SNPN RAN and the SNPN AMF are separately notified that the terminal device is to move across networks, and data forwarding is requested to be performed.

Manner 1: Perform steps 805 and 806.

In step 805, the terminal device sends the first message to the SNPN RAN, and the SNPN RAN receives the first message.

In step 806, after receiving the first message, the SNPN RAN sends a sixth message to the SNPN AMF, and the SNPN AMF receives the sixth message. The sixth message is used to indicate, to the SNPN AMF, that the terminal device requests to perform data forwarding. Optionally, the sixth message may carry the information about the forwarded data.

Manner 2: Perform steps 807 and 808.

In step 807, the terminal device sends the first message to the SNPN AMF, and the SNPN AMF receives the first message. Optionally, the first message may be a NAS message. Therefore, the terminal device may send the first message through an N1NPN interface.

In step 808, after receiving the first message, the SNPN AMF sends a seventh message to the SNPN RAN, and the SNPN RAN receives the seventh message. The seventh message is used to indicate, to the SNPN RAN, that the terminal device requests to perform data forwarding.

In at least one embodiment of this application, data forwarding may alternatively be requested to be performed in the following manner.

The SNPN RAN determines, based on a data receiving/sending status of the terminal device, whether to request to perform data forwarding.

In this case, the first message may be used only to indicate that the terminal device is to move across networks. After the SNPN RAN receives the first message, the SNPN RAN determines, based on the receiving/sending status of the data of the terminal device, whether to request data forwarding. When data forwarding needs to be performed, the SNPN RAN includes the cause for data forwarding, the information about the forwarded data, and the like in a second message. Optionally, the SNPN RAN may further notify the terminal device of the information about the forwarded data.

Alternatively, after receiving the first message, the SNPN AMF indicates, in a third message, that the terminal device is to move across networks. After receiving the third message, the SNPN RAN determines, based on the receiving/sending status of the data of the terminal device, whether to request data forwarding. When data forwarding needs to be performed, the SNPN RAN may further notify the SNPN AMF of the cause for data forwarding, the information about the forwarded data, and the like. Optionally, the SNPN RAN may further notify the terminal device of the information about the forwarded data.

After the terminal device sends the first message to the SNPN AMF, the terminal device, the SNPN RAN, and the SNPN AMF determine a connection management (CM) status or a radio resource control (RRC) status of the terminal device in the SNPN network, and the terminal device, the PLMN RAN, and a PLMN AMF determine a CM status or an RRC status of the terminal device in the PLMN network, so that the terminal device, the SNPN RAN, the SNPN AMF, the PLMN RAN, and the PLMN AMF store, release, resume, or establish a context. The connection management status includes a connection management connected state (CM-connected) or a connection management idle state (CM-Idle). The radio resource control status includes a radio resource control connected state (RRC-connected), a radio resource control idle state (RRC-idle), or a radio resource control inactive state (RRC-inactive).

1. As shown in FIG. 10A and FIG. 10B, the RRC status of the terminal device in the SNPN network may be indicated in the following four manners.

Manner 1: Perform steps 834 and 835.

After determining the RRC status, the terminal device performs steps 834 and 835: The terminal device separately sends a fourteenth message to the SNPN AMF and the SNPN RAN, and the SNPN AMF and the SNPN RAN receive the fourteenth message. The fourteenth message is used to indicate the RRC status of the terminal device in the SNPN network.

In other words, the terminal device determines the RRC status, and indicates the RRC status to the SNPN AMF and the SNPN RAN.

A specific indication manner may be that the connection management status or the radio resource control status of the terminal device in the first network may be indicated by including an indication identifier in the fourteenth message, or by using the message. For example, the foregoing message is a radio resource control release (RRC release) message, a proximity indication, an uplink information transfer (UL information transfer) indication, a measurement report, a radio resource control setup request (RRC setup request) message, a radio resource control setup complete (RRC setup complete) message, a radio resource control reestablishment request (RRC reestablishment request) message, a radio resource control reestablishment complete (RRC reestablishment complete) message, a radio resource control resume request (RRC resume request) message, a radio resource control reconfiguration complete (RRC reconfiguration complete) message, a location measurement indication, or other newly defined signaling.

Manner 2: Perform steps 836 and 837.

After determining the RRC status, the terminal device performs step 836: The terminal device sends a fourteenth message to the SNPN AMF, and the SNPN AMF receives the fourteenth message. The fourteenth message is used to indicate the RRC status of the terminal device in the SNPN network.

In step 837, after receiving the fourteenth message, the SNPN AMF sends a twenty-second message to the SNPN RAN, and the SNPN RAN receives the twenty-second message. The twenty-second message is used to indicate the RRC status of the terminal device in the SNPN network.

In other words, the terminal device determines the RRC status, and indicates the RRC status to the SNPN AMF, and then the SNPN AMF indicates the RRC status to the SNPN RAN with reference to the RRC status of the terminal device on the SNPN AMF.

For a specific indication manner, refer to the related descriptions of Manner 1. Details are not described herein again.

Manner 3: Perform steps 838 and 839.

After determining the RRC status, the terminal device performs step 838: The terminal device sends a fourteenth message to the SNPN RAN, and the SNPN RAN receives the fourteenth message. The fourteenth message is used to indicate the RRC status of the terminal device in the SNPN network.

In step 839, after receiving the fourteenth message, the SNPN RAN sends a twenty-third message to the SNPN AMF, and the SNPN AMF receives the twenty-third message. The twenty-third message is used to indicate the RRC status of the terminal device in the SNPN network.

In other words, the terminal device determines the RRC status, and indicates the RRC status to the SNPN RAN, and then the SNPN RAN sends the RRC status to the SNPN AMF with reference to the RRC status of the terminal device on the SNPN RAN.

For a specific indication manner, refer to the related descriptions of Manner 1. Details are not described herein again.

Manner 4: Perform steps 840 and 841.

After determining the RRC status, the SNPN RAN performs 840 and 841: The SNPN RAN respectively sends a twenty-third message and a fifteenth message to the SNPN AMF and the terminal device, the SNPN AMF receives the twenty-third message, and the terminal device receives the fifteenth message. The fifteenth message and the twenty-third message are used to indicate the RRC status of the terminal device in the SNPN network.

In other words, the SNPN RAN determines the RRC status, and indicates the RRC status to the SNPN AMF and the terminal device.

For a specific indication manner, refer to the related descriptions of Manner 1. Details are not described herein again.

Optionally, the information in the foregoing four manners may carry a cause value. The cause value is used by a transmit end to notify a receive end of a cause for sending the information. The cause value may be in the foregoing expression forms. Details are not described again.

For example, before moving from the SNPN network to the PLMN network, the terminal device sends a NAS message to the SNPN AMF to request to reserve a context of the terminal device. The message carries a cause value to notify the SNPN AMF of a NAS request initiated because the terminal device moves across networks. Then, the SNPN AMF sends a NAS message to notify the terminal device that context information of the terminal device is successfully reserved.

For another example, before the terminal device moves from the SNPN network to the PLMN network, the terminal device sends a proximity indication, a measurement report, or a location measurement indication message to the SNPN RAN. The message carries a cause value to notify the SNPN RAN of an information request initiated by the terminal device because the terminal device is ready to move across networks. The SNPN RAN sends an RRC release (RRC release) message to the terminal device, to notify the terminal device that a context of the terminal device is reserved.

2. As shown in FIG. 10A and FIG. 10B, the RRC status of the terminal device in the PLMN network may be indicated in the following two manners.

Manner 1: Perform steps 842 and 843.

After determining the RRC status, the terminal device performs step 842: The terminal device sends a twenty-fifth message to the PLMN AMF, and the PLMN AMF receives the twenty-fifth message. The twenty-fifth message is used to indicate the RRC status of the terminal device in the PLMN network.

In step 843, after receiving the twenty-fifth message, the PLMN AMF sends a twenty-sixth message to the PLMN RAN, and the PLMN RAN receives the twenty-sixth message. The twenty-sixth message is used to indicate the RRC status of the terminal device in the PLMN network.

In other words, the terminal device determines the RRC status, and indicates the RRC status to the PLMN AMF, and then the PLMN AMF indicates the RRC status to the PLMN RAN with reference to the RRC status of the terminal device on the PLMN AMF.

A specific indication manner may be that the connection management status or the radio resource control status of the terminal device in the first network may be indicated by including an indication identifier in the twenty-fifth message and the twenty-sixth message, or by using the message. For example, the foregoing message is a radio resource control release (RRC release) message, a proximity indication, an uplink information transfer (UL information transfer) indication, a measurement report, a radio resource control setup request (RRC setup request) message, a radio resource control setup complete (RRC setup complete) message, a radio resource control reestablishment request (RRC reestablishment request) message, a radio resource control reestablishment complete (RRC reestablishment complete) message, a radio resource control resume request (RRC resume request) message, a radio resource control reconfiguration complete (RRC reconfiguration complete) message, a location measurement indication, user context release command (UE context release Command) signaling, or other newly defined signaling.

Manner 2: Perform steps 844 and 845.

The PLMN RAN determines the RRC status, and further performs 844: The PLMN RAN sends a twenty-seventh message to the PLMN AMF, and the PLMN AMF receives the twenty-seventh message. The twenty-seventh message is used to indicate the RRC status of the terminal device in the PLMN network.

In step 845, after receiving the twenty-seventh message, the PLMN AMF sends a twenty-ninth message to the terminal device, and the terminal device receives the twenty-ninth message. The twenty-ninth message is used to indicate the RRC status of the terminal device in the PLMN network.

In other words, the PLMN RAN determines the RRC status, and indicates the RRC status to the PLMN AMF, and then the PLMN AMF indicates the RRC status to the terminal device with reference to the RRC status of the terminal device on the PLMN AMF.

For a specific indication manner, refer to the related descriptions of Manner 1. Details are not described herein again.

It may be understood that when the terminal device determines the RRC status, the terminal device may further indicate, by using the first message, the RRC status of the terminal device in the SNPN network, or the RRC status of the terminal device in the PLMN network.

Optionally, the information in the foregoing two manners may carry a cause value. The cause value is used by a transmit end to notify a receive end of a cause for sending the information. The cause value may be in the foregoing expression forms. Details are not described again.

For example, before moving from the SNPN network to the PLMN network, the terminal device sends a NAS message to the PLMN AMF to request to reserve a context of the terminal device. The message carries a cause value to notify the PLMN AMF of a NAS request initiated because the terminal device moves across networks. Then, the PLMN AMF initiates an initial context setup request (initial UE context setup request) message to the PLMN RAN, and the PLMN RAN determines whether to establish the context for the terminal device. Then, the PLMN RAN sends an initial context setup response (initial UE context setup response) message, and the PLMN AMF further sends a NAS message to notify the terminal device that context information of the terminal device is reserved. It should be understood that, an interaction process between the PLMN AMF and the PLMN RAN may be omitted.

Figure 11B:
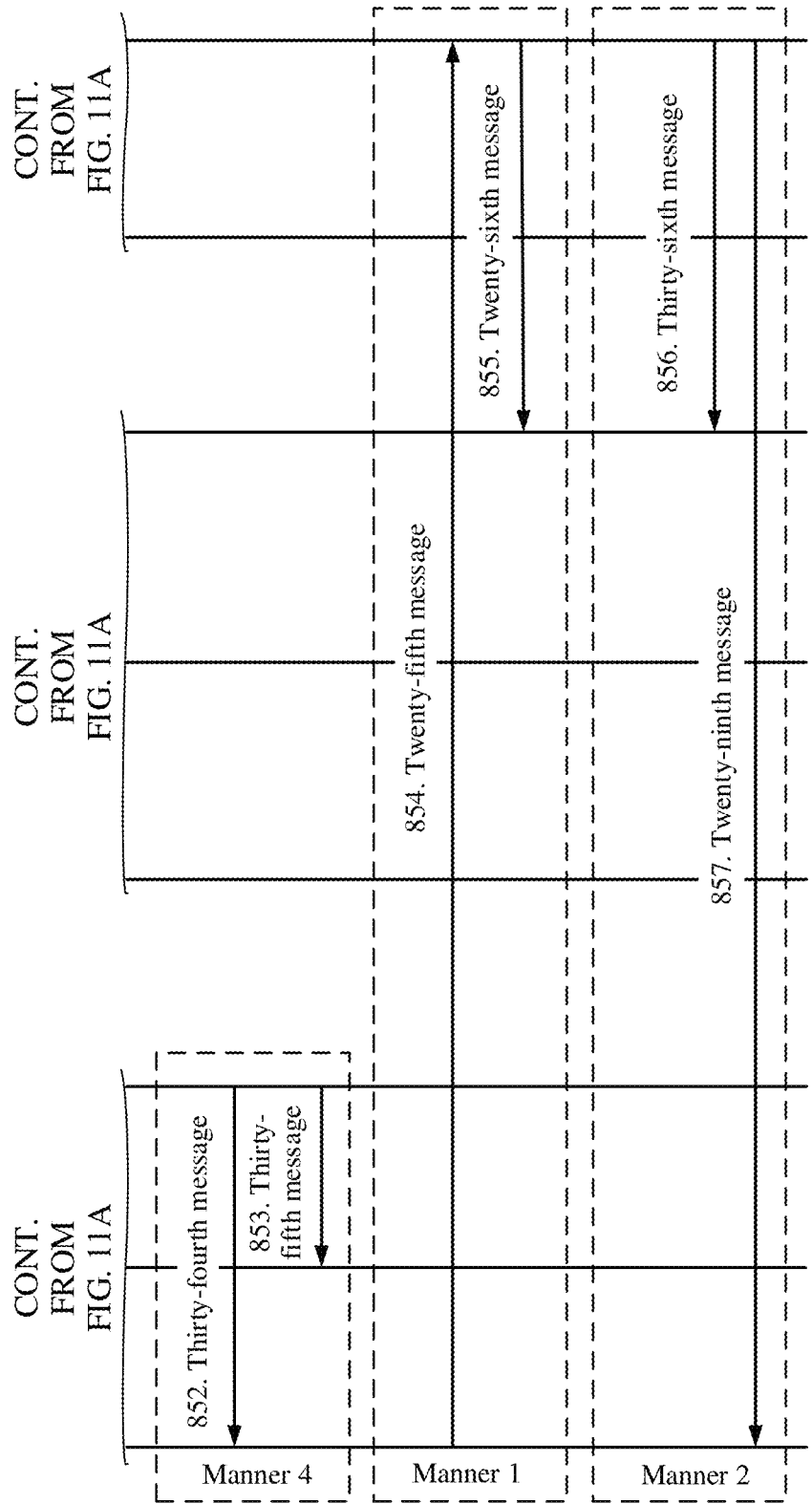

3. As shown in FIG. 11A and FIG. 11B, the CM status of the terminal device in the SNPN network may be indicated in the following four manners.

Manner 1: Perform steps 846 and 847.

After determining the CM status, the terminal device performs steps 846 and 847: The terminal device separately sends a fourteenth message to the SNPN AMF and the SNPN RAN, and the SNPN AMF and the SNPN RAN receive the fourteenth message. The fourteenth message is used to indicate the CM status of the terminal device in the SNPN network.

In other words, the terminal device determines the CM status, and indicates the CM status to the SNPN AMF and the SNPN RAN.

A specific indication manner may be that the connection management status or the radio resource control status of the terminal device in the first network may be indicated by including an indication identifier in the fourteenth message, or by using the message. For example, the foregoing message is a radio resource control release (RRC release) message, a proximity indication, an uplink information transfer (UL information transfer) indication, a measurement report, a radio resource control setup request (RRC setup request) message, a radio resource control setup complete (RRC setup complete) message, a radio resource control reestablishment request (RRC reestablishment request) message, a radio resource control reestablishment complete (RRC reestablishment complete) message, a radio resource control resume request (RRC resume request) message, a radio resource control reconfiguration complete (RRC reconfiguration complete) message, a location measurement indication, or other newly defined signaling.

Manner 2: Perform steps 848 and 849.

After determining the CM status, the terminal device performs step 848: The terminal device sends a fourteenth message to the SNPN AMF, and the SNPN AMF receives the fourteenth message. The fourteenth message is used to indicate the CM status of the terminal device in the SNPN network.

In step 849, after receiving the fourteenth message, the SNPN AMF sends a twenty-second message to the SNPN RAN, and the SNPN RAN receives the twenty-second message. The twenty-second message is used to indicate the CM status of the terminal device in the SNPN network.

In other words, the terminal device determines the CM status, and indicates the CM status to the SNPN AMF, and then the SNPN AMF indicates the CM status to the SNPN RAN with reference to the CM status of the terminal device on the SNPN AMF.

For a specific indication manner, refer to the related descriptions of Manner 1. Details are not described herein again.

Manner 3: Perform steps 850 and 851.

After determining the CM status, the terminal device performs step 850: The terminal device sends a fourteenth message to the SNPN RAN, and the SNPN RAN receives the fourteenth message. The fourteenth message is used to indicate the CM status of the terminal device in the SNPN network.

In step 851, after receiving the fourteenth message, the SNPN RAN sends a twenty-third message to the SNPN AMF, and the SNPN AMF receives the twenty-third message. The twenty-third message is used to indicate the CM status of the terminal device in the SNPN network.

In other words, the terminal device determines the CM status, and indicates the CM status to the SNPN RAN, and then the SNPN RAN sends the CM status to the SNPN AMF with reference to the CM status of the terminal device on the SNPN RAN.

For a specific indication manner, refer to the related descriptions of Manner 1. Details are not described herein again.

Manner 4: Perform steps 852 and 853.

After determining the CM status, the SNPN AMF performs steps 852 and 853: The SNPN AMF respectively sends a thirty-fourth message and a thirty-fifth message to the SNPN RAN and the terminal device, the SNPN RAN receives the thirty-fifth message, and the terminal device receives the thirty-fourth message. The thirty-fourth message and the thirty-fifth message are used to indicate the CM status of the terminal device in the SNPN network.

In other words, the SNPN AMF determines the CM status, and indicates the CM status to the SNPN RAN and the terminal device.

For a specific indication manner, refer to the related descriptions of Manner 1. Details are not described herein again.

Optionally, the information in the foregoing two manners may carry a cause value. The cause value is used by a transmit end to notify a receive end of a cause for sending the information. The cause value may be in the foregoing expression forms. Details are not described again.

For example, before moving from the SNPN network to the PLMN network, the terminal device sends a NAS message to the SNPN AMF to request to reserve a context of the terminal device. The message carries a cause value to notify the SNPN AMF of a NAS request initiated because the terminal device moves across networks. Then, the SNPN AMF sends a NAS message to notify the terminal device that context information of the terminal device is reserved.

For example, before moving from the SNPN network to the PLMN network, the terminal device sends a NAS message to the SNPN AMF to request to release a context of the terminal device, for example, by using a detach process. The message carries a cause value to notify the SNPN AMF of a NAS request initiated by the terminal device because the terminal device moves across networks. Then, the SNPN AMF sends a UE context release command (UE context release command) message to the SNPN RAN. The SNPN RAN further sends an RRC release (RRC Release) message to notify the terminal device that context information of the terminal device is released, to enable the terminal device to be in the CM idle state and the RRC idle state.

4. As shown in FIG. 11A and FIG. 11B, the CM status of the terminal device in the PLMN network may be indicated in the following two manners.

Manner 1: Perform steps 854 and 855.

After determining the CM status, the terminal device performs step 854: The terminal device sends a twenty-fifth message to the PLMN AMF, and the PLMN AMF receives the twenty-fifth message. The twenty-fifth message is used to indicate the CM status of the terminal device in the PLMN network.

In step 855, after receiving the twenty-fifth message, the PLMN AMF sends a twenty-sixth message to the PLMN RAN, and the PLMN RAN receives the twenty-sixth message. The twenty-sixth message is used to indicate the CM status of the terminal device in the PLMN network.

In other words, the terminal device determines the CM status, and indicates the CM status to the PLMN AMF, and then the PLMN AMF indicates the CM status to the PLMN RAN.

A specific indication manner may be that the connection management status or the radio resource control status of the terminal device in the first network may be indicated by including an indication identifier in the twenty-fifth message and the twenty-sixth message, or by using the message. For example, the foregoing message is a radio resource control release (RRC release) message, a proximity indication, an uplink information transfer (UL information transfer) indication, a measurement report, a radio resource control setup request (RRC setup request) message, a radio resource control setup complete (RRC setup complete) message, a radio resource control reestablishment request (RRC reestablishment request) message, a radio resource control reestablishment complete (RRC reestablishment complete) message, a radio resource control resume request (RRC resume request) message, a radio resource control reconfiguration complete (RRC reconfiguration complete) message, a location measurement indication, user context release command (UE context release Command) signaling, or other newly defined signaling.

Manner 2: Perform steps 856 and 857.

The PLMN AMF determines the CM status, and further performs steps 856 and 857: The PLMN AMF sends a thirty-sixth message to the PLMN RAN. The PLMN RAN receives the thirty-sixth message, and sends a twenty-ninth message to the terminal device. The terminal device receives the twenty-ninth message. The twenty-ninth message and the thirty-sixth message are used to indicate the CM status of the terminal device in the PLMN network.

In other words, the PLMN AMF determines the CM status, and indicates the CM status to the PLMN RAN and the terminal device.

For a specific indication manner, refer to the related descriptions of Manner 1. Details are not described herein again.

Optionally, the information in the foregoing two manners may carry a cause value. The cause value is used by a transmit end to notify a receive end of a cause for sending the information. The cause value may be in the foregoing expression forms. Details are not described again.

It may be understood that when the terminal device determines the CM status, the terminal device may further indicate, by using the first message, the CM status of the terminal device in the SNPN network, or the CM status of the terminal device in the PLMN network. In at least one embodiment of this application, the data forwarding channel may be configured in the following manner.

Manner 1: An SNPN UPF configures a data forwarding channel for forwarded data.

For details, refer to steps 809, 810, and 828.

Specifically, in step 809, the SNPN AMF sends a second message to the SNPN UPF, and the SNPN UPF receives the second message. The second message is used to indicate to establish a data forwarding channel for the terminal device.

After receiving the first message or the sixth message, the SNPN AMF sends the second message to the SNPN UPF, to indicate the SNPN UPF to establish a data forwarding channel between the SNPN RAN and the SNPN UPF for the terminal device for user plane data forwarding. The second information carries information about the forwarded data.

Optionally, when the first message also indicates the forwarded data, the SNPN AMF may forward the indication to the SNPN UPF by using the second message. For example, the SNPN AMF may indicate the information about the forwarded data by using the radio access network status transfer (RAN status transfer) signaling.

In addition, when the first message includes address information of an SNPN N3IWF connected to the terminal device after mobility, the AMF may further notify the SNPN RAN, by using a second message, of the address of the SNPN N3IWF connected to the terminal device after the mobility. Therefore, the SNPN UPF sends the forwarded data to the SNPN N3IWF.

Optionally, the second message may further carry the cause for data forwarding. The cause for data forwarding may be inter-network mobility.

In step 810, after receiving the second message, the SNPN UPF configures a data forwarding channel for the terminal device.

Specifically, the SNPN UPF configures at least one of uplink forwarding user plane transport network layer information (UL Forwarding UP TNL Information) and downlink forwarding user plane transport network layer information (DL Forwarding UP TNL Information) for a corresponding PDU session, a DRB, or a QoS flow. The forwarding user plane transport network layer information may include a transport layer address (for example, an IP address of an endpoint) and a GTP tunnel endpoint identifier (such as a GTP-TEID, GTP-Tunnel Endpoint Identifier).

In step 828, the SNPN UPF sends a third message to the SNPN AMF. The third message is used to indicate the transport network layer information.

In at least one embodiment of this application, a data forwarding channel may alternatively be configured in the following manner.

Manner 2: The SNPN N3IWF configures a data forwarding channel for forwarded data. For details, refer to steps 826 to 829.

Specifically, in step 826, the SNPN AMF sends a second message to the SNPN N3IWF, and the SNPN N3IWF receives the second message. The second message is used to indicate to establish a data forwarding channel for the terminal device. The second information carries information about the forwarded data.

Optionally, when the first message also indicates the forwarded data, the SNPN AMF may forward the indication to the SNPN N3IWF by using the second message. For example, the SNPN AMF may indicate the forwarded data by using the radio access network status transfer (RAN status transfer) signaling.

Optionally, the second message may further carry the cause for data forwarding. The cause for data forwarding may be inter-network mobility.

In step 827, after receiving the second message, the SNPN N3IWF configures the data forwarding channel for the terminal device.

Specifically, the SNPN N3IWF configures at least one of uplink forwarding user plane transport network layer information (UL Forwarding UP TNL Information) and downlink forwarding user plane transport network layer information (DL Forwarding UP TNL Information) for a corresponding PDU session, a DRB, or a QoS flow. The forwarding user plane transport network layer information may include a transport layer address (for example, an IP address of an endpoint) and a GTP tunnel endpoint identifier (such as a GTP-TEID, GTP-Tunnel Endpoint Identifier).

In step 828, the SNPN N3IWF sends a third message to the SNPN AMF, and the SNPN AMF receives the third message. The third message is used to indicate transport network layer information of the data forwarding channel for the terminal device.

In step 829, the SNPN AMF sends a fifth message to the SNPN UPF, and the SNPN UPF receives the fifth message. The fifth message is used to indicate transport network layer information of the data forwarding channel for the terminal device.

After the data forwarding channel is configured, further, in step 811, the SNPN AMF sends a fourth message to the SNPN RAN, and the SNPN RAN receives the fourth message. The fourth message is used to indicate transport network layer information of the data forwarding channel for the terminal device.

Further, when there is no direct interface between the SNPN RAN and the SNPN N3IWF network element, steps 812-1 and 813 are performed. That is, the SNPN RAN sends forwarded data to the SNPN UPF based on the fourth message, and the SNPN UPF receives the forwarded data. That is, the SNPN RAN transmits the forwarded data through the data forwarding channel that is between the SNPN RAN and the SNPN UPF and that is configured by the SNPN UPF in step 810. In step 813, the SNPN UPF sends the received forwarded data to the SNPN N3IWF network element.

When there is a direct interface between the SNPN RAN and the SNPN N3IWF network element, step 812-2 is performed. That is, the SNPN RAN directly sends the forwarded data to the SNPN N3IWF.

After the forwarded data arrives at the SNPN N3IWF, the terminal device may perform step 831 to trigger inter-network mobility. In step 803, an NPN PDU session is reestablished via the PLMN network. For a specific establishment process, refer to FIG. 3A and FIG. 3B and the related descriptions of FIG. 3A and FIG. 3B. Details are not described herein again. An NPN PDU session whose identifier is the same as that of the NPN PDU session established via the SNPN network may be established for the terminal device via the PLMN network, so as to ensure continuity of the previous NPN PDU session. For example, a PDU session identity (ID) before mobility is a PDU ID 1, and a PDU ID after the mobility is also the PDU ID 1.

Optionally, steps 831 and 803 may alternatively be performed before 812-1, 813, and 812-2. This is not limited in at least one embodiment of this application.

Specifically, there may be two cases for a data forwarding process based on different functions of the SNPN N3IWF. For details, refer to FIG. 8A and FIG. 8B and the related descriptions of FIG. 8A and FIG. 8B. Details are not described herein again.

For FIG. 6A and FIG. 6B or FIG. 9A, FIG. 9B, and FIG. 9C, the terminal device may further notify the SNPN RAN, the SNPN AMF, the PLMN AMF, and the PLMN RAN that the terminal device has left the SNPN network.

With reference to FIG. 12A and FIG. 12B to FIG. 14A and FIG. 14B, the following describes a process in which the terminal device interacts with network elements in the SNPN to notify whether the terminal device successfully moves.

Figure 12A:
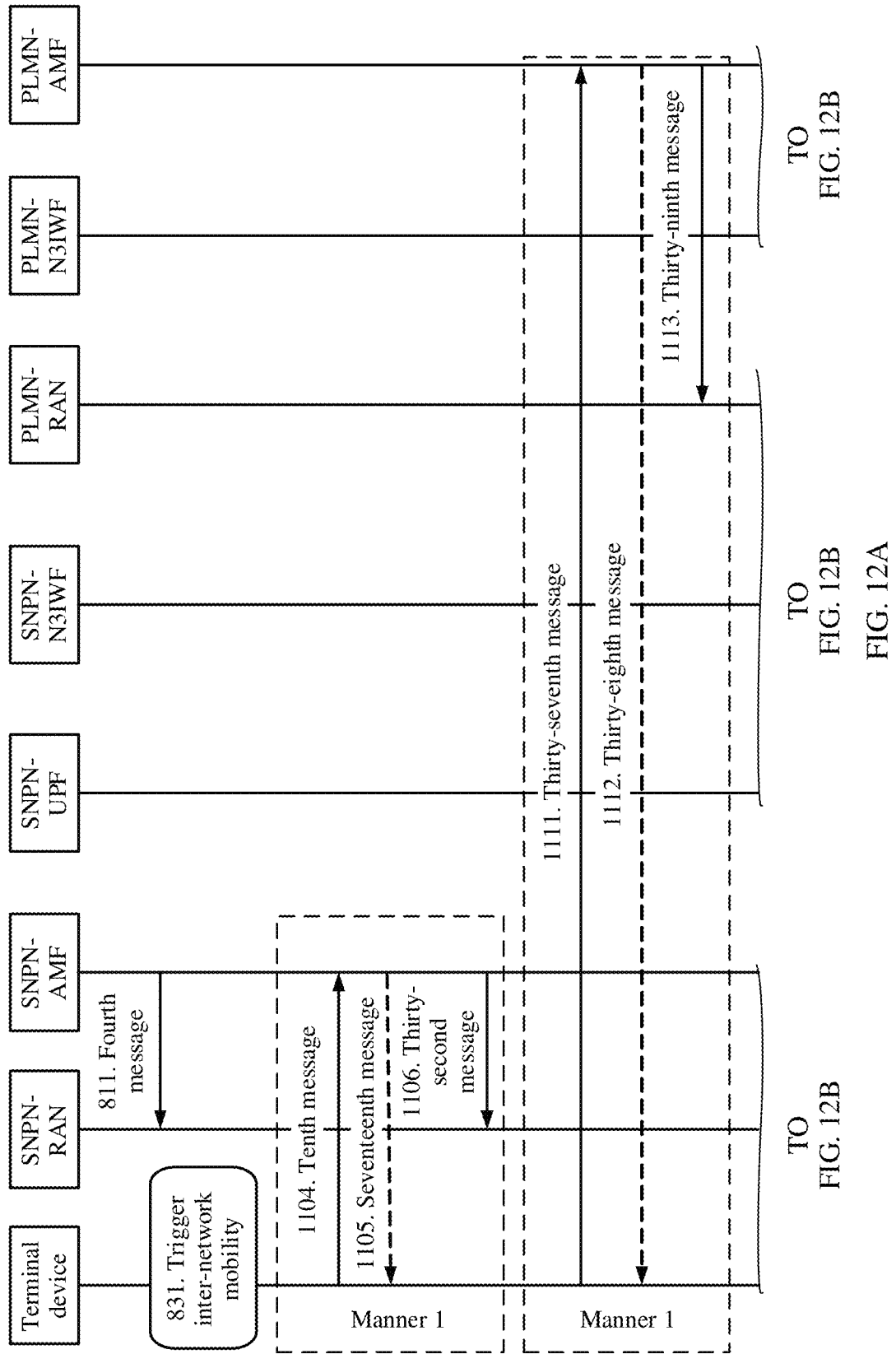
FIG. 12A and FIG. 12B are a schematic flowchart of a processing process when a terminal device moves across networks according to at least one embodiment of this application.
Figure 12B:
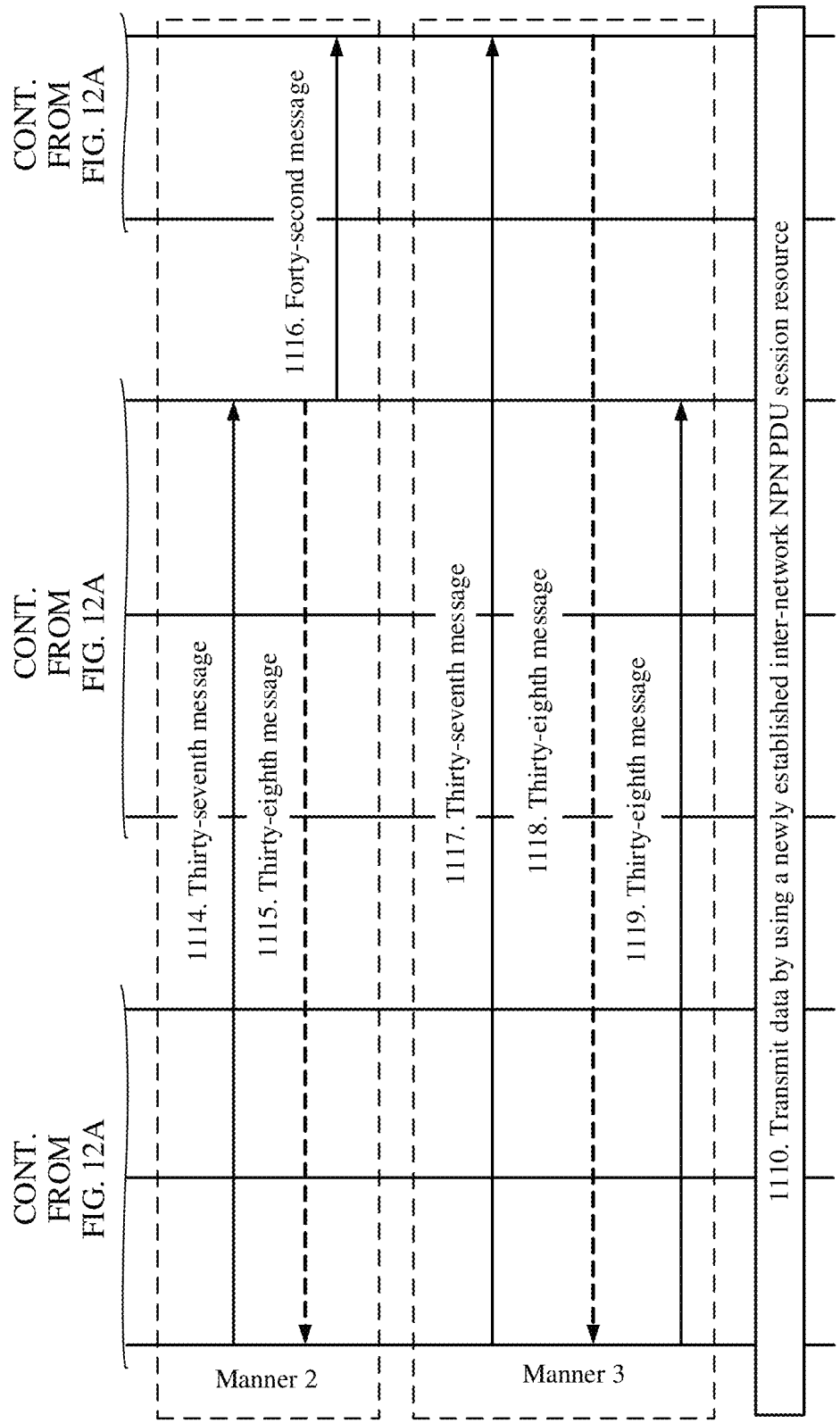
Figure 13B:
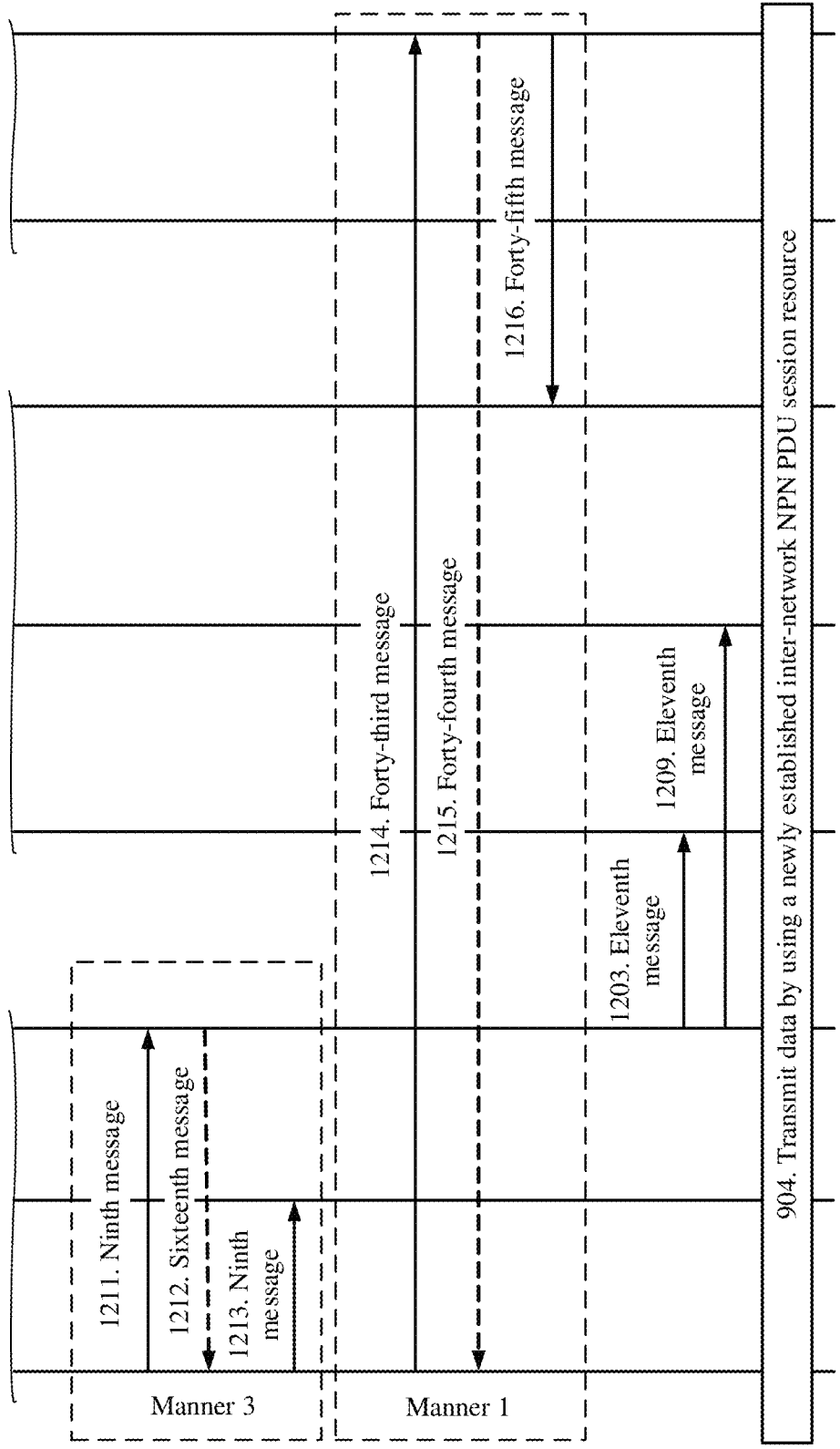
Figure 14B:
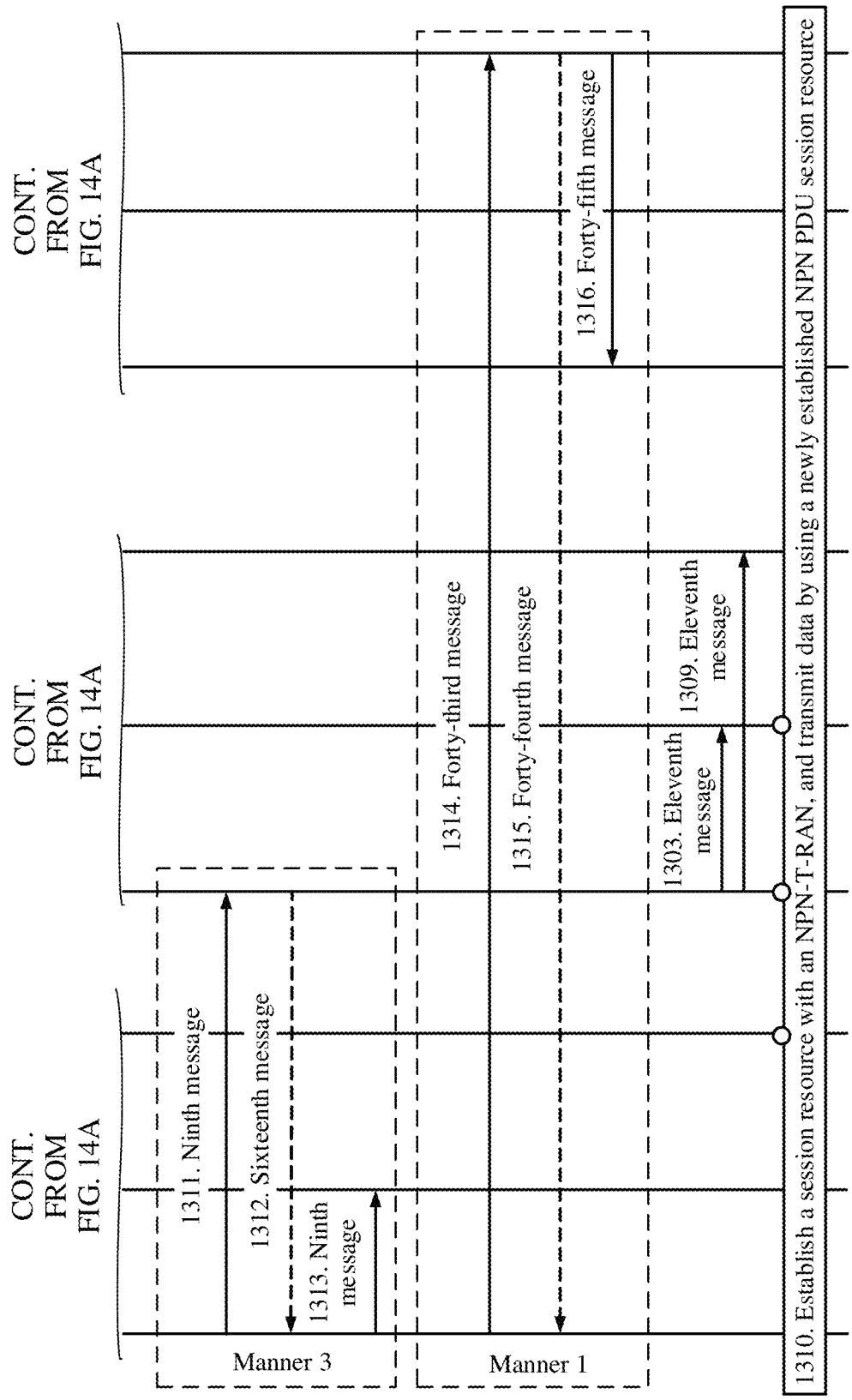

When the terminal device triggers inter-network mobility, as shown in FIG. 12A and FIG. 12B, the terminal device sends a tenth message to the SNPN AMF or the SNPN RAN. The tenth message is used to indicate that the terminal device has moved from the SNPN to the PLMN.

When the terminal device does not trigger inter-network mobility, the terminal device sends a ninth message to the SNPN AMF or the SNPN RAN. The ninth message is used to indicate that the terminal device has not moved from the SNPN to the PLMN.

Optionally, the ninth message and the tenth message each may be a radio resource control resume request (RRC resume request) message, a radio resource control setup request (RRC setup request) message, a radio resource control setup complete (RRC setup complete) message, a radio resource control reestablishment request (RRC reestablishment request) message, an uplink information transfer (UL information transfer) message, and the like.

Optionally, after the terminal device sends the ninth message to the SNPN AMF or the SNPN RAN, the terminal device is further configured to receive a sixteenth message from the SNPN AMF or the SNPN RAN. The sixteenth message is a response message of the ninth message. The sixteenth message is used to indicate the terminal device to perform at least one of the following operations in the SNPN: performing RRC resume, performing RRC reestablishment, performing RRC release, changing or maintaining a CM status, or establishing or resuming a control plane or user plane bearer resource.

Optionally, after the terminal device sends the tenth message to the SNPN AMF or the SNPN RAN, the SNPN AMF or the SNPN RAN is further configured to send a seventeenth message to the terminal device. The seventeenth message is a response message of the tenth message. The seventeenth message is used to indicate the terminal device to perform at least one of the following operations in the SNPN: performing RRC resume, performing RRC reestablishment, performing RRC release, changing or maintaining a CM status, or establishing or resuming a control plane or user plane bearer resource.

Optionally, the sixteenth message and the seventeenth message each may be a radio resource control resume (RRC resume) message, a radio resource control setup (RRC setup) message, a radio resource control reestablishment (RRC reestablishment) message, a radio resource control release (RRC Release) message, or a downlink information transfer (DL information transfer) message.

Optionally, the ninth message or the sixteenth message includes a cause value, and the cause value is used to indicate that the terminal device has not moved from the SNPN to the PLMN.

Optionally, the cause value in the ninth message and the sixteenth message may be that, the terminal device has not moved from an NPN, an SNPN, a PNI-NPN, or a non-3GPP network to a 5G system, or the terminal device has not moved from a 5G system to an NPN, an SNPN, a PNI-NPN, or a non-3GPP network, or the terminal device has not moved from an NPN, an SNPN, a PNI-NPN, or a non-3GPP network to another NPN, SNPN, PNI-NPN, or non-3GPP network.

Optionally, the tenth message or the seventeenth message includes a cause value, and the cause value is used to indicate that the terminal device has moved from an NPN, an SNPN, a PNI-NPN, or a non-3GPP network to a 5G system, or indicate that the terminal device has moved from a 5G system to an NPN, an SNPN, a PNI-NPN, or a non-3GPP network, or indicate that the terminal device has moved from an NPN, an SNPN, a PNI-NPN, or a non-3GPP network to another NPN, SNPN, PNI-NPN, or non-3GPP network. The cause value in the forty-fourth message and the forty-sixth message may be NPN to 5GS, 5GS to NPN, SNPN to 5GS, 5GS to SNPN, PNI-NPN to 5GS, 5GS to PNI-NPN, non-3GPP to 5GS, 5GS to non-3GPP, SNPN, NPN, PNI-NPN, non-3GPP, 5GS, SNPN to SNPN, PNI-NPN to PNI-NPN, NID to NID, PLMN, SNPN to PLMN, PLMN to SNPN, NPN to PLMN, PLMN to NPN, PNI-NPN to PLMN, PLMN to PNI-NPN, non-3GPP to PLMN, PLMN to non-3GPP, non-3GPP to non-3GPP, non-3GPP to non-3GPP, InterNetwork-mobility, or the like.

Optionally, the ninth message, the eleventh message, the twelfth message, the eighteenth message, the forty-third message, and the forty-fifth message in FIG. 13A and FIG. 13B and FIG. 14A and FIG. 14B may carry a PDU ID, a DRB ID, a QFI, a mapping relationship between a QFI and a DRB, a cause for releasing a data forwarding channel, and the like.

Optionally, the cause for releasing a data forwarding channel may be that the terminal device has not moved across networks.

By using the foregoing messages, the terminal device side and the SNPN network side may resume, reestablish, or release the context information of the terminal device, and establish, resume, or release the control plane or user plane bearer resource, so as to enable the terminal device to be in the corresponding CM status or RRC status.

For example, when the terminal device has not moved from the SNPN network to the PLMN network, the terminal device sends an RRC resume request message (the ninth message) to the SNPN RAN. The message may carry a cause value to notify the SNPN RAN that the terminal device has not moved from the SNPN network to the PLMN network, the context of the terminal device in the SNPN (the SNPN network) needs to be resumed, and the established data forwarding channel needs to be released. After receiving the ninth message, the SNPN RAN feeds back an RRC resume RRC resume message (the sixteenth message) to the terminal device, and resumes the context of the terminal device in the SNPN Immediately, after receiving the ninth message, the SNPN RAN may also send a message to notify the SNPN AMF that the terminal device has not moved to the PLMN network, and the context of the terminal device needs to be resumed. Alternatively, the SNPN AMF may feed back the sixteenth message to the terminal device by using the NAS message. After receiving the information indicating that the terminal device has not moved to the PLMN network, the SNPN AMF may send a notification to the SNPN UPF, the SNPN N3IWF, or the SNPN RAN to release the established data forwarding channel. The notification carries a release cause value.

For example, when moving from the SNPN network to the PLMN network, the terminal device sends a NAS message (the tenth message) to the SNPN AMF. The message may carry a cause value to notify the SNPN AMF that the terminal device has moved from the SNPN network to the PLMN network, and the context of the terminal device needs to be resumed in the PLMN (the PLMN network). After receiving the tenth message, the SNPN AMF feeds back the seventeenth message to the terminal device, and notifies the terminal device that the context of the terminal device is resumed in the SNPN.

With reference to FIG. 12A and FIG. 12B to FIG. 14A and FIG. 14B, the following describes a process in which the terminal device interacts with network elements in the PLMN network to notify whether the terminal device successfully moves.

When the terminal device triggers inter-network mobility, the terminal device sends a thirty-seventh message to the PLMN AMF or the PLMN RAN. The thirty-seventh message is used to indicate that the terminal device has moved from the SNPN to the PLMN.

When the terminal device does not trigger inter-network mobility, the terminal device sends a forty-third message to the PLMN AMF or the PLMN RAN. The forty-third message is used to indicate that the terminal device has not moved from the SNPN to the PLMN.

Optionally, the thirty-seventh message and the forty-third message each may be a radio resource control resume request (RRC resume request) message, a radio resource control setup request (RRC setup request) message, a radio resource control setup complete (RRC setup complete) message, a radio resource control reestablishment request (RRC reestablishment request) message, an uplink information transfer (UL information transfer) message, and the like.

Optionally, after the terminal device sends the thirty-seventh message to the PLMN AMF or the PLMN RAN, the terminal device is further configured to receive a thirty-eighth message from the PLMN AMF or the PLMN RAN. The thirty-eighth message is a response message of the thirty-seventh message. The thirty-eighth message is used to indicate the terminal device to perform at least one of the following operations in the PLMN: performing RRC resume, performing RRC reestablishment, performing RRC release, changing or maintaining a CM status, or establishing or resuming a control plane or user plane bearer resource.

Optionally, after the terminal device sends the forty-third message to the PLMN AMF or the PLMN RAN, the PLMN AMF or the PLMN RAN is further configured to send a forty-fourth message to the terminal device. The forty-fourth message is a response message of the forty-third message. The forty-fourth message is used to indicate the terminal device to perform at least one of the following operations in the PLMN: performing RRC resume, performing RRC reestablishment, performing RRC release, changing or maintaining a CM status, or establishing or resuming a control plane or user plane bearer resource.

Optionally, the thirty-eighth message and the forty-fourth message each may be a radio resource control resume (RRC resume) message, a radio resource control setup (RRC setup) message, a radio resource control reestablishment (RRC reestablishment) message, a radio resource control release (RRC Release) message, or a downlink information transfer (DL information transfer) message.

Optionally, the forty-third message or the forty-fourth message includes a cause value, and the cause value is used to indicate that the terminal device has not moved from the SNPN to the PLMN; and the thirty-seventh message and the thirty-eighth message include a cause value, and the cause value is used to indicate that the terminal device has moved from the SNPN to the PLMN.

Optionally, the cause value in the forty-third message and the forty-fourth message may be that, the terminal device has not moved from an NPN, an SNPN, a PNI-NPN, or a non-3GPP network to a 5G system, or the terminal device has not moved from a 5G system to an NPN, an SNPN, a PNI-NPN, or a non-3GPP network, or the terminal device has not moved from an NPN, an SNPN, a PNI-NPN, or a non-3GPP network to another NPN, SNPN, PNI-NPN, or non-3GPP network.

Optionally, the thirty-seventh message or the thirty-eighth message includes a cause value, and the cause value is used to indicate that the terminal device has moved from an NPN, an SNPN, a PNI-NPN, or a non-3GPP network to a 5G system, or indicate that the terminal device has moved from a 5G system to an NPN, an SNPN, a PNI-NPN, or a non-3GPP network, or indicate that the terminal device has moved from an NPN, an SNPN, a PNI-NPN, or a non-3GPP network to another NPN, SNPN, PNI-NPN, or non-3GPP network. The cause value in the forty-fourth message and the forty-sixth message may be NPN to 5GS, 5GS to NPN, SNPN to 5GS, 5GS to SNPN, PNI-NPN to 5GS, 5GS to PNI-NPN, non-3GPP to 5GS, 5GS to non-3GPP, SNPN, NPN, PNI-NPN, non-3GPP, 5GS, SNPN to SNPN, PNI-NPN to PNI-NPN, NID to NID, PLMN, SNPN to PLMN, PLMN to SNPN, NPN to PLMN, PLMN to NPN, PNI-NPN to PLMN, PLMN to PNI-NPN, non-3GPP to PLMN, PLMN to non-3GPP, non-3GPP to non-3GPP, non-3GPP to non-3GPP, InterNetwork-mobility, or the like.

Optionally, the forty-third message, the forty-fourth message, the thirty-seventh message, and the thirty-eighth message may carry a PDU ID, a DRB ID, a QFI, a mapping relationship between a QFI and a DRB, a cause for releasing a data forwarding channel, and the like.

Optionally, the cause for releasing a data forwarding channel may be that the terminal device has not moved across networks.

By using the foregoing messages, the terminal device side and the PLMN network side may resume, reestablish, or release the context information of the terminal device, and establish, resume, or release the control plane or user plane bearer resource, so as to enable the terminal device to be in the corresponding CM status or RRC status.

For example, when the terminal device has not moved from the SNPN network to the PLMN network, the terminal device sends a NAS message (the forty-third message) to the PLMN AMF. The message may carry a cause value to notify the PLMN AMF that the terminal device has not moved from the SNPN network to the PLMN network, the context of the terminal device needs to be resumed in the SNPN (the SNPN network), and the established data forwarding channel needs to be released. After receiving the forty-third message, the PLMN AMF feeds back the forty-fourth message to the terminal device, and resumes the context of the terminal device in the SNPN.

For example, when moving from the SNPN network to the PLMN network, the terminal device sends a NAS message (the thirty-seventh message) to the PLMN AMF. The message may carry a cause value to notify the PLMN AMF that the terminal device has moved from the SNPN network to the PLMN network, and the context of the terminal device needs to be resumed in the PLMN (the PLMN network). After receiving the thirty-seventh message, the PLMN AMF sends the context of the terminal device to the PLMN RAN. The PLMN RAN feeds back the thirty-eighth message to the terminal device, and notifies the terminal device that the context of the terminal device is resumed in the PLMN. It should be understood that the PLMN AMF may also feed back the thirty-eighth message to the terminal device.

If the terminal device has not moved from the SNPN to the PLMN, that is, the terminal device is still in a source SNPN RAN and has not moved across networks, or the terminal device has moved from a source SNPN RAN (an NPN-S-RAN) to a target SNPN RAN (an NPN-T-RAN), that is, the terminal device performs intra-network handover, as shown in FIG. 13A and FIG. 13B and FIG. 14A and FIG. 14B, after a data forwarding channel used for inter-network mobility is established, the SNPN AMF may send an eleventh message to the SNPN UPF and the SNPN N3IWF to release the established data forwarding channel.

The following describes apparatus embodiments of this application with reference to FIG. 15 to FIG. 26.

Figure 15:
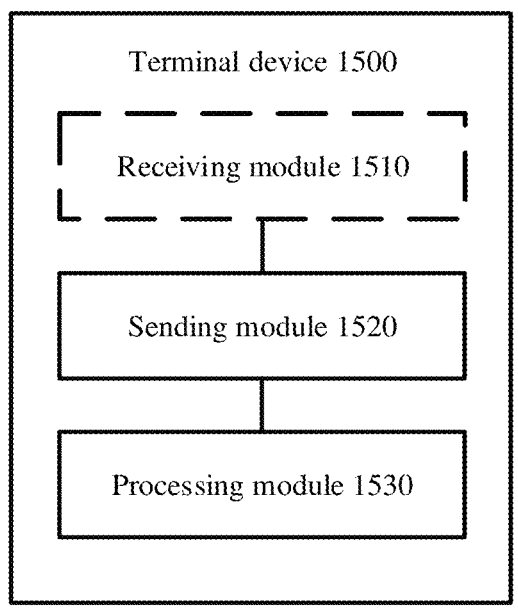
FIG. 15 is a schematic diagram of a structure of a terminal device according to at least one embodiment of this application.

FIG. 15 is a schematic diagram of a structure of a terminal device according to at least one embodiment of this application. The terminal device 1500 shown in FIG. 15 may correspond to the foregoing terminal device. As shown in FIG. 15, the terminal device 1500 includes a sending module 1520 and a processing module 1530.

The processing module 1530 is configured to determine a first message, where the first message is used to indicate that the terminal device is to move from a first network to a second network.

The sending module 1520 is used by the terminal device to send the first message to a first network device. The first network device is a network element in the first network, and the first network device is an access and mobility management function AMF network element or an access network device.

Optionally, the first network is an SNPN network, and the second network is a PLMN network or a PNI-NPN network.

Optionally, the first network is a PNI-NPN network, and the second network is a PLMN network or an SNPN network.

Optionally, the first network is a PLMN network, and the second network is a PNI-NPN network or an SNPN network.

Optionally, the first network is an SNPN network, the second network is an SNPN network, and network IDs of the first network and the second network are different.

Optionally, the first network is a PNI-NPN network, the second network is a PNI-NPN network, and network IDs of the first network and the second network are different.

Optionally, the first network is a PLMN network, the second network is a PLMN network, and network IDs of the first network and the second network are different.

Optionally, the first network is a non-3GPP network, the second network is a non-3GPP network, and network IDs of the first network and the second network are different.

Optionally, the first message is further used to indicate, to the first network device, a connection management status or a radio resource control status of the terminal device in the first network.

Optionally, the sending module 1520 is further configured to send a fourteenth message to the first network device, where the fourteenth message is used to indicate, to the first network device, a connection management status or a radio resource control status of the terminal device in the first network. The connection management status includes a connection management connected state and a connection management idle state, and the radio resource control status includes a radio resource control connected state, a radio resource control idle state, and a radio resource control inactive state.

It may be understood that the terminal device may indicate the connection management status or the radio resource control status of the terminal device in the first network by including an indication identifier in the first message or the fourteenth message, or by using the message. For example, the foregoing message is a radio resource control release (RRC release) message, a proximity indication, an uplink information transfer (UL information transfer) indication, a measurement report, a radio resource control setup request (RRC setup request) message, a radio resource control setup complete (RRC setup complete) message, a radio resource control reestablishment request (RRC reestablishment request) message, a radio resource control reestablishment complete (RRC reestablishment complete) message, a radio resource control resume request (RRC resume request) message, a radio resource control reconfiguration complete (RRC reconfiguration complete) message, a location measurement indication, or other newly defined signaling.

It may be understood that the terminal device not only performs an information exchange process with the first network, but also needs the information and needs to perform the information exchange process with the second network.

Optionally, the terminal device further includes a receiving module 1510, configured to receive a fifteenth message from the first network device, where the fifteenth message is used to indicate, to the terminal device, a connection management status or a radio resource control status of the terminal device in the first network. The connection management status includes a connection management connected state and a connection management idle state, and the radio resource control status includes a radio resource control connected state, a radio resource control idle state, and a radio resource control inactive state.

It may be understood that the terminal device may indicate the connection management status or the radio resource control status of the terminal device in the first network by including an indication identifier in the first message or the fourteenth message, or by using the message. For example, the foregoing message is a radio resource control release (RRC release) message, a proximity indication, an uplink information transfer (UL information transfer) indication, a measurement report, a radio resource control setup request (RRC setup request) message, a radio resource control setup complete (RRC setup complete) message, a radio resource control reestablishment request (RRC reestablishment request) message, a radio resource control reestablishment complete (RRC reestablishment complete) message, a radio resource control resume request (RRC resume request) message, a radio resource control reconfiguration complete (RRC reconfiguration complete) message, a location measurement indication, or other newly defined signaling.

It may be understood that the terminal device not only performs an information exchange process with the first network, but also needs the information and needs to perform the information exchange process with the second network.

Optionally, the first message is further used to indicate at least one of information about forwarded data or a cause for data forwarding.

Optionally, the information about the forwarded data includes at least one of the following information: a protocol data unit PDU session identifier, a quality of service QoS flow identifier, a data radio bearer DRB identifier, a mapping list between a DRB and a QoS flow, and transmission status information of data on the DRB, or the cause for data forwarding includes inter-network mobility.

Optionally, the sending module 1520 is further configured to: send a ninth message to the first network device, where the ninth message is used to indicate that the terminal device has not moved from the first network to the second network; or send a tenth message to the first network device, where the tenth message is used to indicate that the terminal device has moved from the first network to the second network.

Optionally, the ninth message and the tenth message each may be a radio resource control resume request (RRC resume request) message, a radio resource control setup request (RRC setup request) message, a radio resource control setup complete (RRC setup complete) message, a radio resource control reestablishment request (RRC reestablishment request) message, an uplink information transfer (UL information transfer) message, and the like.

Optionally, after the terminal device sends the ninth message or the tenth message to the first network device, the receiving module 1510 is further configured to receive a sixteenth message from the first network device, where the sixteenth message is a response message of the ninth message, and the sixteenth message is used to indicate the terminal device to perform at least one of the following operations in the first network: performing RRC resume, performing RRC reestablishment, performing RRC release, changing or maintaining the connection management status, or establishing or resuming a control plane or user plane bearer resource.

Alternatively,
the receiving module 1510 is further configured to receive a seventeenth message from the first network device, where the seventeenth message is a response message of the tenth message, and the seventeenth message is used to indicate the terminal device to perform at least one of the following operations in the first network: performing RRC resume, performing RRC reestablishment, performing RRC release, changing or maintaining the connection management status, or establishing or resuming a control plane or user plane bearer resource.

Optionally, the sixteenth message and the seventeenth message each may be a radio resource control resume (RRC resume) message, a radio resource control setup (RRC setup) message, a radio resource control reestablishment (RRC reestablishment) message, a downlink information transfer (DL information transfer) message, or the like.

Optionally, the ninth message and the sixteenth message include a cause value, and the cause value is used to indicate that the terminal device has not moved from the first network to the second network; and the tenth message and the seventeenth message include a cause value, and the cause value is used to indicate that the terminal device has moved from the first network to the second network.

Optionally, the cause value in the ninth message and the sixteenth message may be that, the terminal device has not moved from an NPN, an SNPN, a PNI-NPN, or a non-3GPP network to a 5G system, or the terminal device has not moved from a 5G system to an NPN, an SNPN, a PNI-NPN, or a non-3GPP network, or the terminal device has not moved from an NPN, an SNPN, a PNI-NPN, or a non-3GPP network to another NPN, SNPN, PNI-NPN, or non-3GPP network.

Optionally, the cause value in the tenth message and the seventeenth message may be NPN to 5GS, 5GS to NPN, SNPN to 5GS, 5GS to SNPN, PNI-NPN to 5GS, 5GS to PNI-NPN, non-3GPP to 5GS, 5GS to non-3GPP, SNPN, NPN, PNI-NPN, non-3GPP, 5GS, SNPN to SNPN, PNI-NPN to PNI-NPN, NID to NID, PLMN, SNPN to PLMN, PLMN to SNPN, NPN to PLMN, PLMN to NPN, PNI-NPN to PLMN, PLMN to PNI-NPN, non-3GPP to PLMN, PLMN to non-3GPP, non-3GPP to non-3GPP, non-3GPP to non-3GPP, InterNetwork-mobility, or the like, to indicate that the terminal device has moved from an NPN, an SNPN, a PNI-NPN, or a non-3GPP network to a 5G system, or indicate that the terminal device has moved from a 5G system to an NPN, an SNPN, a PNI-NPN, or a non-3GPP network, or indicate that the terminal device has moved from an NPN, an SNPN, a PNI-NPN, or a non-3GPP network to another NPN, SNPN, PNI-NPN, or non-3GPP network.

Optionally, the first network is a non-public network NPN network, and the second network is a public land mobile network PLMN network. Alternatively, the first network is a PLMN network, and the second network is an NPN network. Alternatively, the first network is an NPN network, and the second network is another NPN network. Alternatively, the first network is a non-3GPP network, and the second network is another non-3GPP network.

The receiving module 1510 and the sending module 1520 may be implemented by a transceiver. The processing module 1530 may be implemented by a processor. For specific functions and beneficial effects of the receiving module 1510, the sending module 1520, and the processing module 1530, refer to the related descriptions of the method embodiments. Details are not described herein again.

Figure 16:
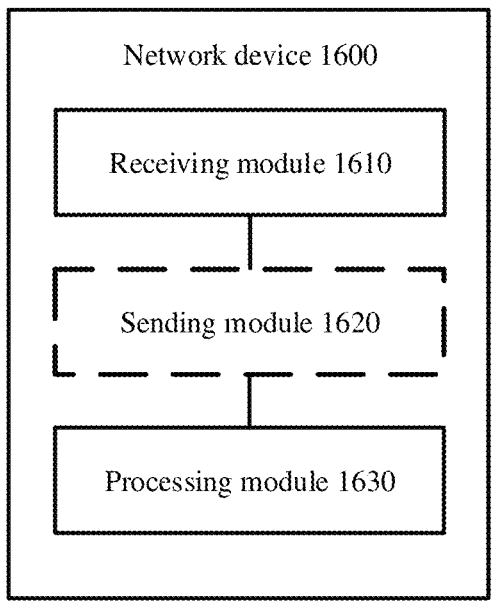
FIG. 16 is a schematic diagram of a structure of a network device according to at least one embodiment of this application.

FIG. 16 is a schematic diagram of a structure of a network device according to at least one embodiment of this application. As shown in FIG. 16, the network device 1600 includes a receiving module 1610 and a processing module 1630.

The receiving module 1610 is configured to receive a first message from a terminal device, where the first message is used to indicate that the terminal device is to move from a first network to a second network.

The processing module 1630 is configured to: after the first message is received, configure a session resource used for data forwarding for the terminal device. The first network device is a network element in the first network, and the first network device is an access and mobility management function AMF network element or an access network device.

Optionally, the first network is an SNPN network, and the second network is a PLMN network or a PNI-NPN network.

Optionally, the first network is a PNI-NPN network, and the second network is a PLMN network or an SNPN network.

Optionally, the first network is a PLMN network, and the second network is a PNI-NPN network or an SNPN network.

Optionally, the first network is an SNPN network, the second network is an SNPN network, and network IDs of the first network and the second network are different.

Optionally, the first network is a PNI-NPN network, the second network is a PNI-NPN network, and network IDs of the first network and the second network are different.

Optionally, the first network is a PLMN network, the second network is a PLMN network, and network IDs of the first network and the second network are different.

Optionally, the first network is a non-3GPP network, the second network is a non-3GPP network, and network IDs of the first network and the second network are different.

Optionally, the first message is further used to indicate, to the first network device, a connection management status or a radio resource control status of the terminal device in the first network.

Optionally, the receiving module 1610 is further configured to receive a fourteenth message from the terminal device, where the fourteenth message is used to indicate, to the first network device, a connection management status or a radio resource control status of the terminal device in the first network. The connection management status includes a connection management connected state and a connection management idle state, and the radio resource control status includes a radio resource control connected state, a radio resource control idle state, and a radio resource control inactive state.

It may be understood that the terminal device may indicate the connection management status or the radio resource control status of the terminal device in the first network by including an indication identifier in the first message or the fourteenth message, or by using the message. For example, the foregoing message is a radio resource control release (RRC release) message, a proximity indication, an uplink information transfer (UL information transfer) indication, a measurement report, a radio resource control setup request (RRC setup request) message, a radio resource control setup complete (RRC setup complete) message, a radio resource control reestablishment request (RRC reestablishment request) message, a radio resource control reestablishment complete (RRC reestablishment complete) message, a radio resource control resume request (RRC resume request) message, a radio resource control reconfiguration complete (RRC reconfiguration complete) message, a location measurement indication, or other newly defined signaling.

It may be understood that the terminal device not only performs an information exchange process with the first network, but also needs the information and needs to perform the information exchange process with the second network.

Optionally, the network device further includes a sending module 1620, configured to send a fifteenth message to the terminal device, where the fifteenth message is used to indicate, to the terminal device, a connection management status or a radio resource control status of the terminal device in the first network. The connection management status includes a connection management connected state and a connection management idle state, and the radio resource control status includes a radio resource control connected state, a radio resource control idle state, and a radio resource control inactive state.

It may be understood that the terminal device may indicate the connection management status or the radio resource control status of the terminal device in the first network by including an indication identifier in the first message or the fourteenth message, or by using the message. For example, the foregoing message is a radio resource control release (RRC release) message, a proximity indication, an uplink information transfer (UL information transfer) indication, a measurement report, a radio resource control setup request (RRC setup request) message, a radio resource control setup complete (RRC setup complete) message, a radio resource control reestablishment request (RRC reestablishment request) message, a radio resource control reestablishment complete (RRC reestablishment complete) message, a radio resource control resume request (RRC resume request) message, a radio resource control reconfiguration complete (RRC reconfiguration complete) message, a location measurement indication, or other newly defined signaling.

It may be understood that the terminal device not only performs an information exchange process with the first network, but also needs the information and needs to perform the information exchange process with the second network.

Optionally, the first message is further used to indicate at least one of information about forwarded data or a cause for data forwarding.

Optionally, the information about the forwarded data includes at least one of the following information: a protocol data unit PDU session identifier, a quality of service QoS flow identifier, a data radio bearer DRB identifier, a mapping list between a DRB and a QoS flow, and transmission status information of data on the DRB, or the cause for data forwarding includes inter-network mobility.

Optionally, the receiving module 1610 is further configured to: receive a ninth message from the terminal device, where the ninth message is used to indicate that the terminal device has not moved from the first network to the second network; or receive a tenth message from the terminal device, where the tenth message is used to indicate that the terminal device has moved from the first network to the second network.

Optionally, the ninth message and the tenth message each may be a radio resource control resume request (RRC resume request) message, a radio resource control setup request (RRC setup request) message, a radio resource control setup complete (RRC setup complete) message, a radio resource control reestablishment request (RRC reestablishment request) message, an uplink information transfer (UL information transfer) message, and the like.

Optionally, after the first network device receives the ninth message or the tenth message from the terminal device, the sending module 1620 is further configured to send a sixteenth message to the terminal device, where the sixteenth message is a response message of the ninth message, and the sixteenth message is used to indicate the terminal device to perform at least one of the following operations in the first network: performing RRC resume, performing RRC reestablishment, performing RRC release, changing or maintaining the connection management status, or establishing or resuming a control plane or user plane bearer resource.

Alternatively, the sending module 1620 is further configured to send a seventeenth message to the terminal device, where the seventeenth message is a response message of the tenth message, and the seventeenth message is used to indicate the terminal device to perform at least one of the following operations in the first network: performing RRC resume, performing RRC reestablishment, performing RRC release, changing or maintaining the connection management status, or establishing or resuming a control plane or user plane bearer resource.

Optionally, the sixteenth message and the seventeenth message each may be a radio resource control resume (RRC resume) message, a radio resource control setup (RRC setup) message, a radio resource control reestablishment (RRC reestablishment) message, a downlink information transfer (DL information transfer) message, or the like.

Optionally, the ninth message and the sixteenth message include a cause value, and the cause value is used to indicate that the terminal device has not moved from the first network to the second network; and the tenth message and the seventeenth message include a cause value, and the cause value is used to indicate that the terminal device has moved from the first network to the second network.

Optionally, the cause value in the ninth message and the sixteenth message may be that, the terminal device has not moved from an NPN, an SNPN, a PNI-NPN, or a non-3GPP network to a 5G system, or the terminal device has not moved from a 5G system to an NPN, an SNPN, a PNI-NPN, or a non-3GPP network, or the terminal device has not moved from an NPN, an SNPN, a PNI-NPN, or a non-3GPP network to another NPN, SNPN, PNI-NPN, or non-3GPP network.

Optionally, the cause value in the tenth message and the seventeenth message may be NPN to 5GS, 5GS to NPN, SNPN to 5GS, 5GS to SNPN, PNI-NPN to 5GS, 5GS to PNI-NPN, non-3GPP to 5GS, 5GS to non-3GPP, SNPN, NPN, PNI-NPN, non-3GPP, 5GS, SNPN to SNPN, PNI-NPN to PNI-NPN, NID to NID, PLMN, SNPN to PLMN, PLMN to SNPN, NPN to PLMN, PLMN to NPN, PNI-NPN to PLMN, PLMN to PNI-NPN, non-3GPP to PLMN, PLMN to non-3GPP, non-3GPP to non-3GPP, non-3GPP to non-3GPP, InterNetwork-mobility, or the like, to indicate that the terminal device has moved from an NPN, an SNPN, a PNI-NPN, or a non-3GPP network to a 5G system, or indicate that the terminal device has moved from a 5G system to an NPN, an SNPN, a PNI-NPN, or a non-3GPP network, or indicate that the terminal device has moved from an NPN, an SNPN, a PNI-NPN, or a non-3GPP network to another NPN, SNPN, PNI-NPN, or non-3GPP network.

Optionally, the first network is a non-public network NPN network, and the second network is a public land mobile network PLMN network. Alternatively, the first network is a PLMN network, and the second network is an NPN network. Alternatively, the first network is an NPN network, and the second network is another NPN network. Alternatively, the first network is a non-3GPP network, and the second network is another non-3GPP network.

The receiving module 1610 and the sending module 1620 may be implemented by a transceiver. The processing module 1630 may be implemented by a processor. For specific functions and beneficial effects of the receiving module 1610, the sending module 1620, and the processing module 1630, refer to the related descriptions of the method embodiments. Details are not described herein again.

Figure 17:
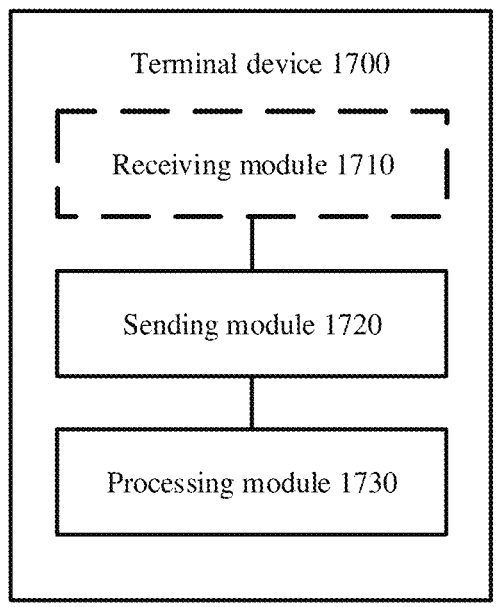
FIG. 17 is a schematic diagram of a structure of a terminal device according to at least one embodiment of this application.

FIG. 17 is a schematic diagram of a structure of a terminal device according to at least one embodiment of this application. As shown in FIG. 17, the terminal device 1700 includes a sending module 1720 and a processing module 1730.

The processing module 1730 is configured to determine a first message, where the first message is used to indicate that the terminal device has moved from a first network to a second network.

The sending module 1720 is configured to send the first message to a first network device.

The first network device is a network element in the first network, and the first network device is an access and mobility management function AMF network element or an access network device.

Optionally, the first network is an SNPN network, and the second network is a PLMN network or a PNI-NPN network.

Optionally, the first network is a PNI-NPN network, and the second network is a PLMN network or an SNPN network.

Optionally, the first network is a PLMN network, and the second network is a PNI-NPN network or an SNPN network.

Optionally, the first network is an SNPN network, the second network is an SNPN network, and network IDs of the first network and the second network are different.

Optionally, the first network is a PNI-NPN network, the second network is a PNI-NPN network, and network IDs of the first network and the second network are different.

Optionally, the first network is a PLMN network, the second network is a PLMN network, and network IDs of the first network and the second network are different.

Optionally, the first network is a non-3GPP network, the second network is a non-3GPP network, and network IDs of the first network and the second network are different.

It should be understood that a scenario in which the terminal device moves across networks from the first network to the second network is not limited in this application. For example, the terminal device may move in an inter-network cell reselection process, or the terminal device may move in an inter-network cell handover process.

It should be further understood that, "the terminal device moves from the first network to the second network" may alternatively be described as: "the terminal device performs reselection from the first network to the second network", "the terminal device is handed over from the first network to the second network", or the like.

It should be further understood that cell reselection in this application is different from cell reselection performed by a conventional terminal device in an idle state. The cell reselection in this application is that the terminal device in a connected state autonomously decides to perform inter-network cell "handover", instead of being controlled by a network side to perform cell "handover". That is, the cell reselection in this application is different from the conventional cell reselection and handover process and may also be referred to as another term, for example, inter-network autonomous handover.

Optionally, the first message is further used to indicate at least one of information about forwarded data or a cause for data forwarding.

Optionally, the information about the forwarded data includes at least one of the following information: a protocol data unit PDU session identifier, a quality of service QoS flow identifier, a data radio bearer DRB identifier, a mapping list between a DRB and a QoS flow, and transmission status information of data on the DRB, or the cause for data forwarding includes inter-network mobility.

Optionally, after the terminal device sends the first message to the first network device, the terminal device further includes a receiving module 1710, configured to receive a seventeenth message from the first network device, where the seventeenth message is a response message of the first message, and the seventeenth message is used to indicate the terminal device to perform at least one of the following operations in the first network: performing RRC resume, performing RRC reestablishment, performing RRC release, changing or maintaining a connection management status, or establishing or resuming a control plane or user plane bearer resource.

Optionally, the seventeenth message may be a radio resource control resume (RRC resume) message, a radio resource control setup (RRC setup) message, a radio resource control reestablishment (RRC reestablishment) message, a downlink information transfer (DL information transfer) message, or the like.

Optionally, the first message and the seventeenth message include a cause value, and the cause value is used to indicate that the terminal device has moved from the first network to the second network.

Optionally, the cause value in the seventeenth message may be NPN to 5GS, 5GS to NPN, SNPN to 5GS, 5GS to SNPN, PNI-NPN to 5GS, 5GS to PNI-NPN, non-3GPP to 5GS, 5GS to non-3GPP, SNPN, NPN, PNI-NPN, non-3GPP, 5GS, SNPN to SNPN, PNI-NPN to PNI-NPN, NID to NID, PLMN, SNPN to PLMN, PLMN to SNPN, NPN to PLMN, PLMN to NPN, PNI-NPN to PLMN, PLMN to PNI-NPN, non-3GPP to PLMN, PLMN to non-3GPP, non-3GPP to non-3GPP, non-3GPP to non-3GPP, InterNetwork-mobility, or the like, to indicate that the terminal device has moved from an NPN, an SNPN, a PNI-NPN, or a non-3GPP network to a 5G system, or indicate that the terminal device has moved from a 5G system to an NPN, an SNPN, a PNI-NPN, or a non-3GPP network, or indicate that the terminal device has moved from an NPN, an SNPN, a PNI-NPN, or a non-3GPP network to another NPN, SNPN, PNI-NPN, or non-3GPP network.

Optionally, the first network is a non-public network NPN network, and the second network is a public land mobile network PLMN network. Alternatively, the first network is a PLMN network, and the second network is an NPN network. Alternatively, the first network is an NPN network, and the second network is another NPN network. Alternatively, the first network is a non-3GPP network, and the second network is another non-3GPP network.

The receiving module 1710 and the sending module 1720 may be implemented by a transceiver. The processing module 1730 may be implemented by a processor. For specific functions and beneficial effects of the receiving module 1710, the sending module 1720, and the processing module 1730, refer to the related descriptions of the method embodiments. Details are not described herein again.

Figure 18:
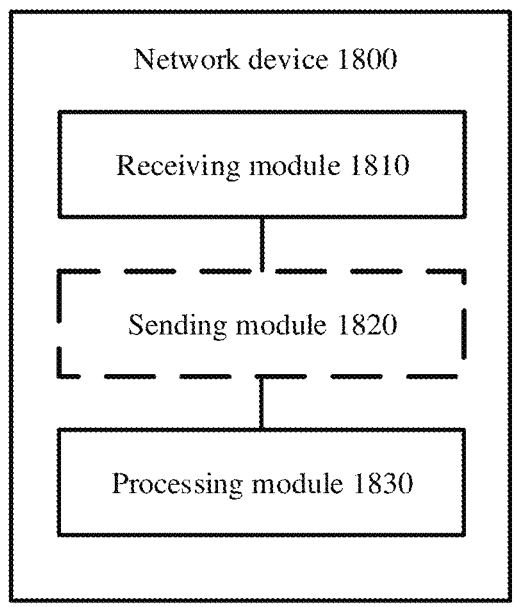
FIG. 18 is a schematic diagram of a structure of a network device according to at least one embodiment of this application.

FIG. 18 is a schematic diagram of a structure of a network device according to at least one embodiment of this application. As shown in FIG. 18, the network device 1800 includes a receiving module 1810 and a processing module 1830.

The receiving module 1810 is configured to receive a first message from a terminal device, where the first message is used to indicate that the terminal device has moved from a first network to a second network.

The processing module 1830 is configured to: after the receiving module 1810 receives the first message, configure a session resource used for data forwarding for the terminal device.

The first network device is a network element in the first network, and the first network device is an access and mobility management function AMF network element or an access network device.

Optionally, the first network is an SNPN network, and the second network is a PLMN network or a PNI-NPN network.

Optionally, the first network is a PNI-NPN network, and the second network is a PLMN network or an SNPN network.

Optionally, the first network is a PLMN network, and the second network is a PNI-NPN network or an SNPN network.

Optionally, the first network is an SNPN network, the second network is an SNPN network, and network IDs of the first network and the second network are different.

Optionally, the first network is a PNI-NPN network, the second network is a PNI-NPN network, and network IDs of the first network and the second network are different.

Optionally, the first network is a PLMN network, the second network is a PLMN network, and network IDs of the first network and the second network are different.

Optionally, the first network is a non-3GPP network, the second network is a non-3GPP network, and network IDs of the first network and the second network are different.

It should be understood that a scenario in which the terminal device moves across networks from the first network to the second network is not limited in this application. For example, the terminal device may move in an inter-network cell reselection process, or the terminal device may move in an inter-network cell handover process.

It should be further understood that, "the terminal device moves from the first network to the second network" may alternatively be described as: "the terminal device performs reselection from the first network to the second network", "the terminal device is handed over from the first network to the second network", or the like.

It should be further understood that cell reselection in this application is different from cell reselection performed by a conventional terminal device in an idle state. The cell reselection in this application is that the terminal device in a connected state autonomously decides to perform inter-network cell "handover", instead of being controlled by a network side to perform cell "handover". That is, the cell reselection in this application is different from the conventional cell reselection and handover process and may also be referred to as another term, for example, inter-network autonomous handover.

Optionally, the first message is further used to indicate at least one of information about forwarded data or a cause for data forwarding.

Optionally, the information about the forwarded data includes at least one of the following information: a protocol data unit PDU session identifier, a quality of service QoS flow identifier, a data radio bearer DRB identifier, a mapping list between a DRB and a QoS flow, and transmission status information of data on the DRB, or the cause for data forwarding includes inter-network mobility.

Optionally, the apparatus further includes a sending module 1820, configured to: after the first message from the terminal device is received, send a seventeenth message to the terminal device, where the seventeenth message is a response message of the first message, and the seventeenth message is used to indicate the terminal device to perform at least one of the following operations in the first network: performing RRC resume, performing RRC reestablishment, performing RRC release, changing or maintaining the connection management status, or establishing or resuming a control plane or user plane bearer resource.

Optionally, the seventeenth message may be a radio resource control resume (RRC resume) message, a radio resource control setup (RRC setup) message, a radio resource control reestablishment (RRC reestablishment) message, a downlink information transfer (DL information transfer) message, or the like.

Optionally, the first message and the seventeenth message include a cause value, and the cause value is used to indicate that the terminal device has moved from the first network to the second network.

Optionally, the cause value in the seventeenth message may be NPN to 5GS, 5GS to NPN, SNPN to 5GS, 5GS to SNPN, PNI-NPN to 5GS, 5GS to PNI-NPN, non-3GPP to 5GS, 5GS to non-3GPP, SNPN, NPN, PNI-NPN, non-3GPP, 5GS, SNPN to SNPN, PNI-NPN to PNI-NPN, NID to NID, PLMN, SNPN to PLMN, PLMN to SNPN, NPN to PLMN, PLMN to NPN, PNI-NPN to PLMN, PLMN to PNI-NPN, non-3GPP to PLMN, PLMN to non-3GPP, non-3GPP to non-3GPP, non-3GPP to non-3GPP, InterNetwork-mobility, or the like, to indicate that the terminal device has moved from an NPN, an SNPN, a PNI-NPN, or a non-3GPP network to a 5G system, or indicate that the terminal device has moved from a 5G system to an NPN, an SNPN, a PNI-NPN, or a non-3GPP network, or indicate that the terminal device has moved from an NPN, an SNPN, a PNI-NPN, or a non-3GPP network to another NPN, SNPN, PNI-NPN, or non-3GPP network.

Optionally, the first network is a non-public network NPN network, and the second network is a public land mobile network PLMN network. Alternatively, the first network is a PLMN network, and the second network is an NPN network. Alternatively, the first network is an NPN network, and the second network is another NPN network. Alternatively, the first network is a non-3GPP network, and the second network is another non-3GPP network.

The receiving module 1810 and the sending module 1820 may be implemented by a transceiver. The processing module 1830 may be implemented by a processor. For specific functions and beneficial effects of the receiving module 1810, the sending module 1820, and the processing module 1830, refer to the related descriptions of the method embodiments. Details are not described herein again.

Figure 19:
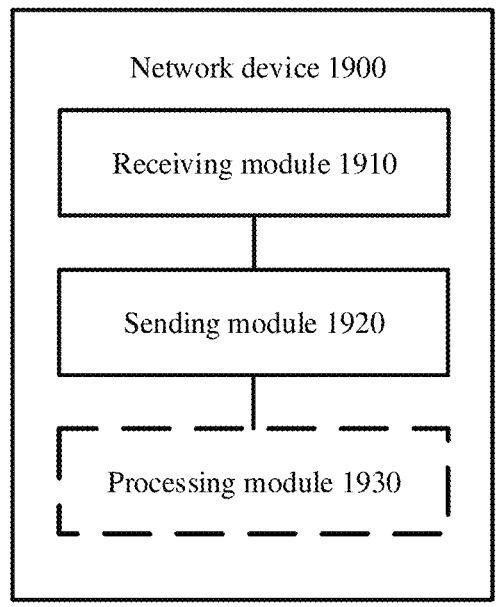
FIG. 19 is a schematic diagram of a structure of a network device according to at least one embodiment of this application.

FIG. 19 is a schematic diagram of a structure of a network device according to at least one embodiment of this application. As shown in FIG. 19, the network device 1900 includes a receiving module 1910 and a sending module 1920.

The receiving module 1910 is configured to receive a first message from a terminal device, where the first message is used to indicate that the terminal device has moved or is to move from a first network to a second network.

The sending module 1920 is configured to: after the receiving module 1910 receives the first message, send a second message to a second network device, where the second message is used to indicate that the terminal device has moved or is to move from the first network to the second network. The first network device and the second network device are network elements in the first network.

Optionally, the first network is an SNPN network, and the second network is a PLMN network or a PNI-NPN network.

Optionally, the first network is a PNI-NPN network, and the second network is a PLMN network or an SNPN network.

Optionally, the first network is a PLMN network, and the second network is a PNI-NPN network or an SNPN network.

Optionally, the first network is an SNPN network, the second network is an SNPN network, and network IDs of the first network and the second network are different.

Optionally, the first network is a PNI-NPN network, the second network is a PNI-NPN network, and network IDs of the first network and the second network are different.

Optionally, the first network is a PLMN network, the second network is a PLMN network, and network IDs of the first network and the second network are different.

Optionally, the first network is a non-3GPP network, the second network is a non-3GPP network, and network IDs of the first network and the second network are different.

It should be understood that a scenario in which the terminal device moves across networks from the first network to the second network is not limited in this application. For example, the terminal device may move in an inter-network cell reselection process, or the terminal device may move in an inter-network cell handover process.

It should be further understood that, "the terminal device moves from the first network to the second network" may alternatively be described as: "the terminal device performs reselection from the first network to the second network", "the terminal device is handed over from the first network to the second network", or the like.

It should be further understood that cell reselection in this application is different from cell reselection performed by a conventional terminal device in an idle state. The cell reselection in this application is that the terminal device in a connected state autonomously decides to perform inter-network cell "handover", instead of being controlled by a network side to perform cell "handover". That is, the cell reselection in this application is different from the conventional cell reselection and handover process and may also be referred to as another term, for example, inter-network autonomous handover.

Optionally, the second message is further used to indicate at least one of information about forwarded data or a cause for data forwarding.

Optionally, the information about the forwarded data includes at least one of the following information: a protocol data unit PDU session identifier, a quality of service QoS flow identifier, a data radio bearer DRB identifier, a mapping list between a DRB and a QoS flow, and transmission status information of data on the DRB, or the cause for data forwarding includes inter-network mobility.

Optionally, the first network device is an access and mobility management function AMF network element, the second network device is a user plane function UPF network element or an interworking function network element, and the interworking function network element is used for transmission of user plane data and control plane data between the first network and the second network.

Optionally, the receiving module 1910 is further configured to receive a third message from the UPF or the interworking function network element, where the third message is used to indicate configuration information of a first data forwarding channel for the terminal device. The sending module 1920 is further configured to send a fourth message to the first access network device, where the fourth message is used to indicate the configuration information, and the first access network device is a network element in the first network.

Optionally, when the second network device is the interworking function network element, the sending module 1920 is further configured to send a fifth message to the UPF, where the fifth message is used to indicate the configuration information.

Optionally, the receiving module 1910 is further configured to receive a sixth message from the first access network device, where the sixth message is further used to indicate at least one of information about forwarded data or a cause for data forwarding; and the first access network device is a network element in the first network. The processing module 1930 is configured to determine, based on the sixth message, the information about the forwarded data and the cause for data forwarding. Alternatively, the processing module 1930 is configured to determine, based on the first message, the information about the forwarded data and the cause for data forwarding. The first message includes the information about the forwarded data and the cause for data forwarding.

Optionally, the sending module 1920 is further configured to: after the receiving module 1910 receives the first message, send a seventh message to the first access network device. The seventh message is used to indicate, to the second network device, that the terminal device has moved or is to move from the first network to the second network, and the first access network device is a network element in the first network.

Optionally, when the interworking function network element has a packet data convergence protocol PDCP coding function, the sending module 1920 is further configured to send an eighth message to the interworking function network element. The eighth message is used to indicate the information about the forwarded data, and the information about the forwarded data includes a PDCP sequence number available for the forwarded data.

Optionally, the first message indicates that the terminal device is to move from the first network to the second network, the first network device is the first access network device, and the second network device is the access and mobility management AMF network element.

Optionally, the receiving module 1910 is further configured to receive a fourth message from the AMF, where the fourth message is used to indicate configuration information of a first data forwarding channel for the terminal device. The first access network device sends forwarded data to a user plane function UPF network element or an interworking function network element based on the configuration information, where the interworking function network element is used for transmission of user plane data and data plane data between the first network and the second network.

Optionally, the first network is an NPN network, and the second network is a PLMN network. Alternatively, the first network is a PLMN network, and the second network is an NPN network. Alternatively, the first network is an NPN network, and the second network is another NPN network. Alternatively, the first network is a non-3GPP network, and the second network is another non-3GPP network.

The receiving module 1910 and the sending module 1920 may be implemented by a transceiver. The processing module 1930 may be implemented by a processor. For specific functions and beneficial effects of the receiving module 1910, the sending module 1920, and the processing module 1930, refer to the related descriptions of the method embodiments. Details are not described herein again.

Figure 20:
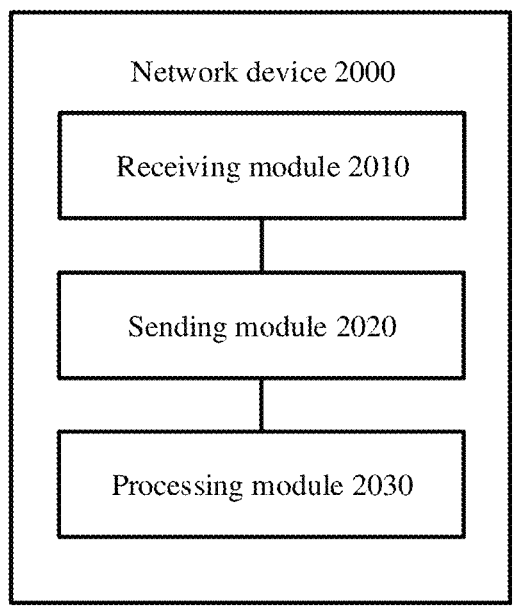
FIG. 20 is a schematic diagram of a structure of a network device according to at least one embodiment of this application.

FIG. 20 is a schematic diagram of a structure of a network device according to at least one embodiment of this application. As shown in FIG. 20, the network device 2000 includes a receiving module 2010, a sending module 2020, and a processing module 2030.

The receiving module 2010 is configured to receive a second message from a first network device, where the second message is used to indicate that a terminal device has moved or is to move from a first network to a second network.

The processing module 2030 is configured to configure a first data forwarding channel for the terminal device based on the second message.

The sending module 2020 is configured to send a third message to the first network device, where the third message is used to indicate configuration information of the first data forwarding channel for the terminal device. The first network device and a second network device are network elements in the first network.

Optionally, the first network is an SNPN network, and the second network is a PLMN network or a PNI-NPN network.

Optionally, the first network is a PNI-NPN network, and the second network is a PLMN network or an SNPN network.

Optionally, the first network is a PLMN network, and the second network is a PNI-NPN network or an SNPN network.

Optionally, the first network is an SNPN network, the second network is an SNPN network, and network IDs of the first network and the second network are different.

Optionally, the first network is a PNI-NPN network, the second network is a PNI-NPN network, and network IDs of the first network and the second network are different.

Optionally, the first network is a PLMN network, the second network is a PLMN network, and network IDs of the first network and the second network are different.

Optionally, the first network is a non-3GPP network, the second network is a non-3GPP network, and network IDs of the first network and the second network are different.

It should be understood that a scenario in which the terminal device moves across networks from the first network to the second network is not limited in this application. For example, the terminal device may move in an inter-network cell reselection process, or the terminal device may move in an inter-network cell handover process.

It should be further understood that, "the terminal device moves from the first network to the second network" may alternatively be described as: "the terminal device performs reselection from the first network to the second network", "the terminal device is handed over from the first network to the second network", or the like.

It should be further understood that cell reselection in this application is different from cell reselection performed by a conventional terminal device in an idle state. The cell reselection in this application is that the terminal device in a connected state autonomously decides to perform inter-network cell "handover", instead of being controlled by a network side to perform cell "handover". That is, the cell reselection in this application is different from the conventional cell reselection and handover process and may also be referred to as another term, for example, inter-network autonomous handover.

In the foregoing technical solution, when the terminal device is to move or has moved from across networks, the network side learns, by using the first message sent by the terminal device, that the terminal device has moved or is to move across networks, and configures a corresponding session resource for the terminal device in time for data forwarding, thereby ensuring service continuity of the terminal.

Optionally, the second message is further used to indicate at least one of information about forwarded data or a cause for data forwarding.

Optionally, the information about the forwarded data includes at least one of the following information: a PDU session identifier, a QoS flow identifier, a DRB identifier, a mapping list between a DRB and a QoS flow, or transmission status information of data on the DRB.

Optionally, the processing module 2030 is configured to configure a first data forwarding channel for the terminal device based on the second message. The sending module 2020 is further configured to send a third message to the first network device, where the third message is used to indicate configuration information of the first data forwarding channel for the terminal device.

Optionally, the receiving module 2010 is further configured to receive forwarded data from the first network device.

Optionally, the network device is an interworking function network element, the interworking function network element is used for data transmission between the first network and the second network, and the receiving module 2010 is further used by the interworking function network element to receive an eighth message from the first network device, where the eighth message is used to indicate information about forwarded data. The processing module 2030 is further configured to perform packet data convergence protocol PDCP numbering on the forwarded data based on the eighth message. The sending module 2020 is further configured to send the forwarded data based on a PDCP numbering result.

Optionally, the first message indicates that the terminal device is to move from the first network to the second network, and the receiving module 2010 is further configured to receive an eleventh message, where the eleventh message is used to indicate that the terminal device has not moved from the first network to the second network. The processing module 2030 is further configured to release the first data forwarding channel.

Optionally, the eleventh message is further used to indicate that the terminal device switches from a first access network device to a second access network device, and the processing module 2030 is further configured to establish a second data forwarding channel for the terminal device. The second data forwarding channel includes a data forwarding channel between the first access network device and the second access network device.

Optionally, the first network is an NPN network, and the second network is a PLMN network. Alternatively, the first network is a PLMN network, and the second network is an NPN network. Alternatively, the first network is an NPN network, and the second network is another NPN network. Alternatively, the first network is a non-3GPP network, and the second network is another non-3GPP network.

The receiving module 2010 and the sending module 2020 may be implemented by a transceiver. The processing module 2030 may be implemented by a processor. For specific functions and beneficial effects of the receiving module 2010, the sending module 2020, and the processing module 2030, refer to the related descriptions of the method embodiments. Details are not described herein again.

Figure 21:
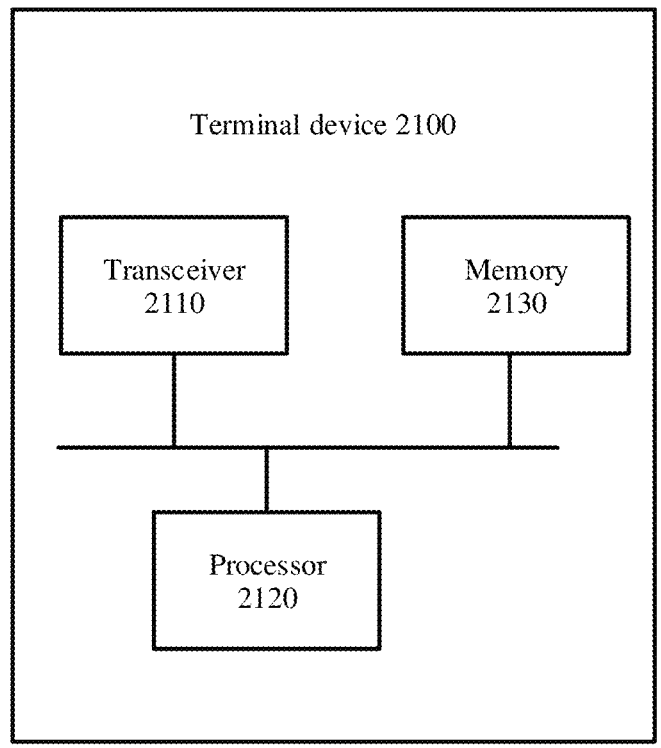
FIG. 21 is a schematic diagram of a structure of a terminal device according to at least one embodiment of this application.

FIG. 21 is a schematic diagram of a structure of a terminal device according to at least one embodiment of this application. As shown in FIG. 21, the terminal device 2100 may include a transceiver 1210, a processor 2120, and a memory 2130.

FIG. 21 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in at least one embodiment of this application.

The transceiver 2110, the processor 2120, and the memory 2130 communicate with each other through an internal connection path, to transfer at least one of a control signal or a data signal.

Specifically, the processor 2120 is configured to determine a first message, where the first message is used to indicate that the terminal device is to move from a first network to a second network. The transceiver 2110 is used by the terminal device to send the first message to a first network device. The first network device is a network element in the first network, and the first network device is an access and mobility management function AMF network element or an access network device.

For a specific working process and beneficial effects of the terminal device 2100, refer to related descriptions in the method embodiments. Details are not described herein again.

Figure 22:
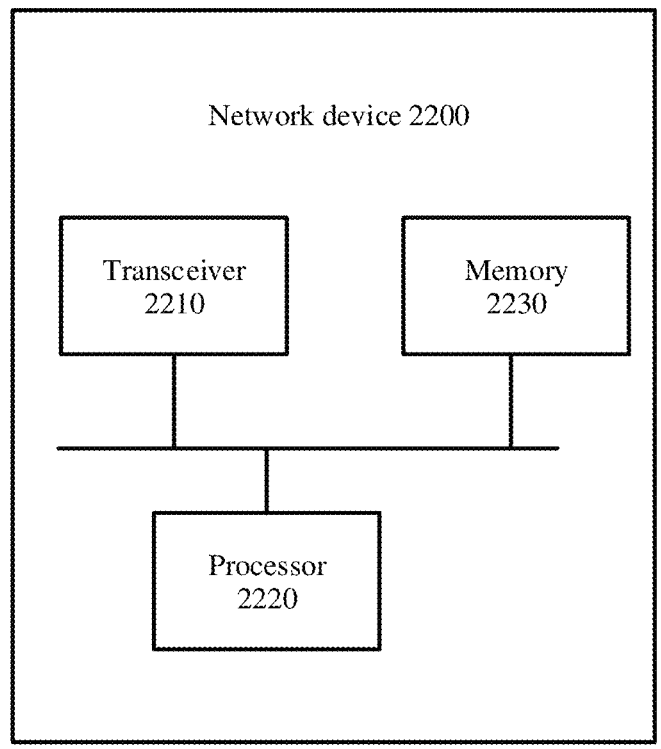
FIG. 22 is a schematic diagram of a structure of a network device according to at least one embodiment of this application.

FIG. 22 is a schematic diagram of a structure of a network device according to at least one embodiment of this application. As shown in FIG. 22, the network device 2200 may include a transceiver 1220, a processor 2220, and a memory 2230.

FIG. 22 shows only one memory and one processor. In an actual network device product, there may be one or more processors and one or more memories. The memory may also be referred to as a storage medium, a storage device, or the like. The memory may be disposed independent of the processor, or may be integrated with the processor. This is not limited in at least one embodiment of this application.

The transceiver 2210, the processor 2220, and the memory 2230 communicate with each other through an internal connection path, to transfer at least one of a control signal or a data signal.

Specifically, the transceiver 2210 is configured to receive a first message from a terminal device, where the first message is used to indicate that the terminal device is to move from a first network to a second network. The processor 2220 is configured to: after the first message is received, configure a session resource used for data forwarding for the terminal device. The first network device is a network element in the first network, and the first network device is an access and mobility management function AMF network element or an access network device.

For a specific working process and beneficial effects of the network device 2200, refer to related descriptions in the method embodiments. Details are not described herein again.

Figure 23:
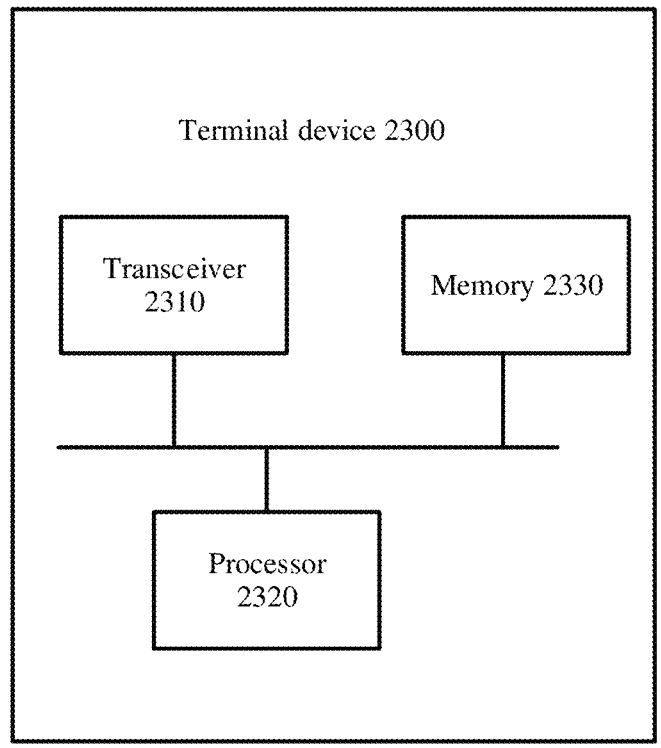
FIG. 23 is a schematic diagram of a structure of a terminal device according to at least one embodiment of this application.

FIG. 23 is a schematic diagram of a structure of a terminal device according to at least one embodiment of this application. As shown in FIG. 23, the terminal device 2300 may include a transceiver 2310, a processor 2320, and a memory 2330.

FIG. 23 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in at least one embodiment of this application.

The transceiver 2310, the processor 2320, and the memory 2330 communicate with each other through an internal connection path, to transfer at least one of a control signal or a data signal.

Specifically, the processor 2330 is configured to determine a first message, where the first message is used to indicate that the terminal device has moved from a first network to a second network. The transceiver 2310 is configured to send the first message to a first network device. The first network device is a network element in the first network, and the first network device is an access and mobility management function AMF network element or an access network device.

For a specific working process and beneficial effects of the terminal device 2300, refer to related descriptions in the method embodiments. Details are not described herein again.

Figure 24:
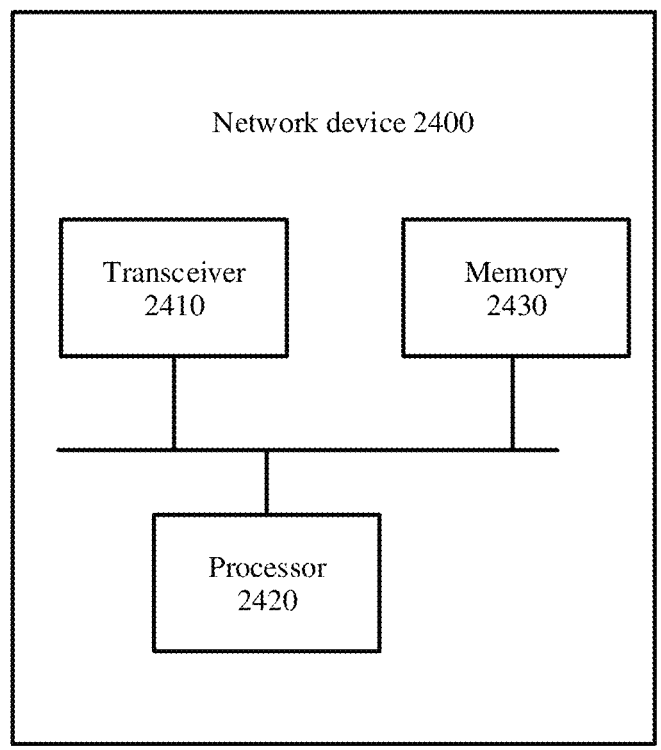
FIG. 24 is a schematic diagram of a structure of a network device according to at least one embodiment of this application.

FIG. 24 is a schematic diagram of a structure of a network device according to at least one embodiment of this application. As shown in FIG. 24, the network device 2400 may include a transceiver 1240, a processor 2420, and a memory 2430.

FIG. 24 shows only one memory and one processor. In an actual network device product, there may be one or more processors and one or more memories. The memory may also be referred to as a storage medium, a storage device, or the like. The memory may be disposed independent of the processor, or may be integrated with the processor. This is not limited in at least one embodiment of this application.

The transceiver 2410, the processor 2420, and the memory 2430 communicate with each other through an internal connection path, to transfer at least one of a control signal or a data signal.

Specifically, the transceiver 2410 is configured to receive a first message from a terminal device, where the first message is used to indicate that the terminal device has moved from a first network to a second network. The processor 2420 is configured to: after the first message is received, configure a session resource used for data forwarding for the terminal device. The first network device is a network element in the first network, and the first network device is an access and mobility management function AMF network element or an access network device.

For a specific working process and beneficial effects of the network device 2400, refer to related descriptions in the method embodiments. Details are not described herein again.

Figure 25:
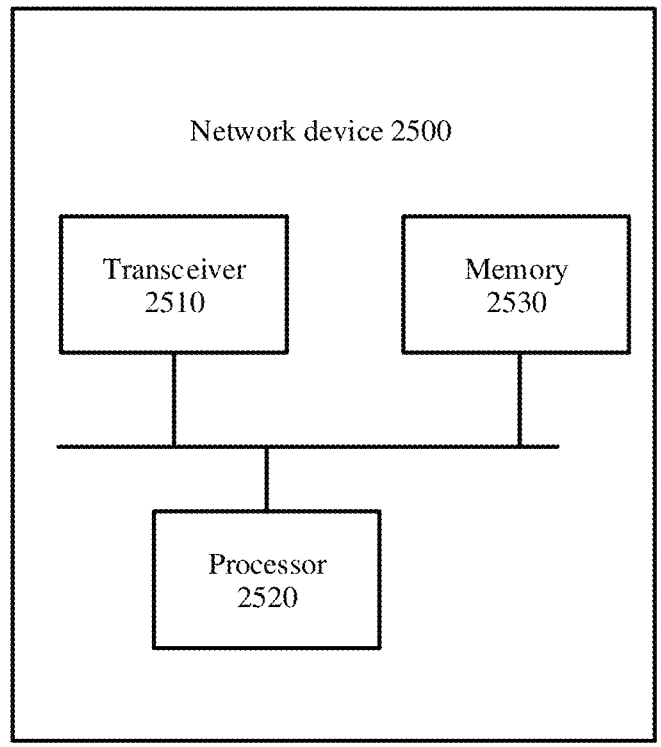
FIG. 25 is a schematic diagram of a structure of a network device according to at least one embodiment of this application.

FIG. 25 is a schematic diagram of a structure of a network device according to at least one embodiment of this application. As shown in FIG. 25, the network device 2500 may include a transceiver 1250, a processor 2520, and a memory 2530.

FIG. 25 shows only one memory and one processor. In an actual network device product, there may be one or more processors and one or more memories. The memory may also be referred to as a storage medium, a storage device, or the like. The memory may be disposed independent of the processor, or may be integrated with the processor. This is not limited in at least one embodiment of this application.

The transceiver 2510, the processor 2520, and the memory 2530 communicate with each other through an internal connection path, to transfer at least one of a control signal or a data signal.

Specifically, the transceiver 2510 is configured to receive a first message from a terminal device, where the first message is used to indicate that the terminal device has moved or is to move from a first network to a second network. The transceiver 2510 is further configured to: after the first message is received, send a second message to a second network device, where the second message is used to indicate that the terminal device has moved or is to move from the first network to the second network. The first network device and the second network device are network elements in the first network.

For a specific working process and beneficial effects of the network device 2500, refer to related descriptions in the method embodiments. Details are not described herein again.

Figure 26:
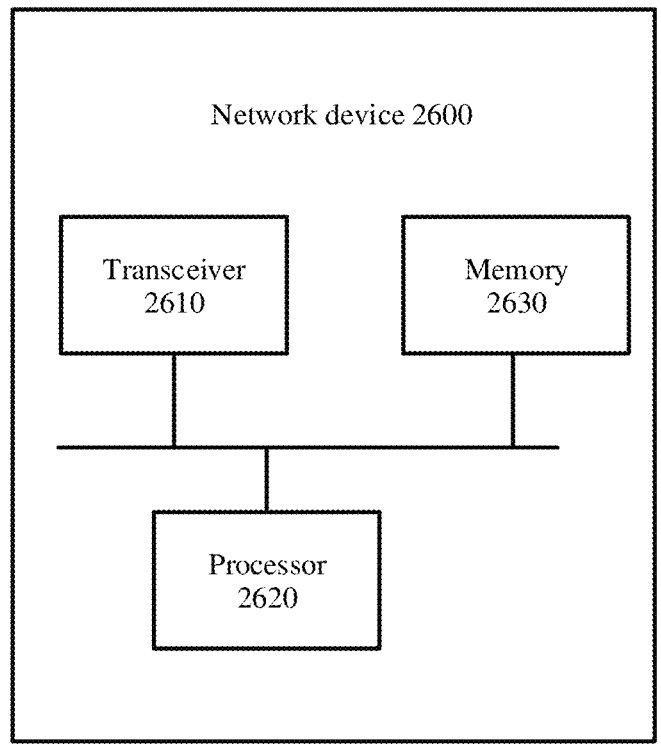
FIG. 26 is a schematic diagram of a structure of a network device according to at least one embodiment of this application.

FIG. 26 is a schematic diagram of a structure of a network device according to at least one embodiment of this application. As shown in FIG. 26, the network device 2600 may include a transceiver 1260, a processor 2620, and a memory 2630.

FIG. 26 shows only one memory and one processor. In an actual network device product, there may be one or more processors and one or more memories. The memory may also be referred to as a storage medium, a storage device, or the like. The memory may be disposed independent of the processor, or may be integrated with the processor. This is not limited in at least one embodiment of this application.

The transceiver 2610, the processor 2620, and the memory 2630 communicate with each other through an internal connection path, to transfer at least one of a control signal or a data signal.

Specifically, the transceiver 2610 is configured to receive a second message from a first network device, where the second message is used to indicate that the terminal device has moved or is to move from a first network to a second network. The processor 2620 is configured to configure a first data forwarding channel for the terminal device based on the second message. The transceiver 2610 is further configured to send a third message to the first network device, where the third message is used to indicate configuration information of the first data forwarding channel for the terminal device. The first network device and a second network device are network elements in the first network.

For a specific working process and beneficial effects of the network device 2600, refer to related descriptions in the method embodiments. Details are not described herein again.

The transceiver in the embodiments of this application may also be referred to as a transceiver unit, a transceiver, a transceiver apparatus, or the like. The processor may also be referred to as a processing unit, a processing board, a processing module, a processing apparatus, or the like. Optionally, a component that is in the transceiver and that is configured to implement a receiving function may be considered as a receiving unit, and a component that is in the transceiver and that is configured to implement a sending function may be considered as a sending unit. In other words, the transceiver includes the receiving unit and the sending unit. The receiving unit may also be sometimes referred to as a receiver machine, a receiver, a receiving circuit, or the like. The sending unit sometimes may also be referred to as a transmitter machine, a transmitter, a transmitter circuit, or the like.

The memory in the embodiments of this application is configured to store computer instructions and a parameter for running the processor.

The processor in the embodiments of this application may be an integrated circuit chip, and has a signal processing capability. In an implementation process, steps in the foregoing methods can be completed by using a hardware integrated logical circuit in the processor, or by using instructions in a form of software. The processor in the embodiments of this application may be a general-purpose processor, a digital signal processor (DSP), an application-specific integrated circuit (ASIC), a field programmable gate array (FPGA) or another programmable logic device, a discrete gate or transistor logic device, or a discrete hardware component. The processing apparatus may implement or perform the methods, steps, and logical block diagrams that are disclosed in the embodiments of this application. The general-purpose processor may be a microprocessor, or the processor may be any existing processor, or the like. The steps of the methods disclosed with reference to the embodiments of this application may be directly performed and completed by a hardware decoding processor, or may be performed and completed by using a combination of hardware and software modules in the decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory, and a processor reads instructions in the memory and completes the steps in the foregoing methods in combination with hardware of the processor.

Sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or some of the procedures or the functions according to the embodiments of this application are generated. The computer may be a general-purpose computer, a special-purpose computer, a computer network, or another programmable apparatus. The computer instructions may be stored in a non-transitory computer-readable storage medium or may be transmitted from a non-transitory computer-readable storage medium to another non-transitory computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

A person of ordinary skill in the art may be aware that, units and algorithm steps in examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electronic, mechanical, or other similar forms.

The units described as separate components may or may not be physically separate, and components displayed as units may or may not be physical units. To be specific, the components may be located at one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or a part contributing to an existing technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A data transmission method, comprising:
determining, by a terminal device, a first message, wherein the first message indicates that the terminal device is to move from a first network, which is a non-public network (NPN), to a second network, which is a public network; and
sending, by the terminal device, the first message to a first network device in the first network, wherein
the first network device is an access and mobility management function (AMF) network element or an access network device, and
the first message includes address information of a non-third generation partnership project interworking function (N3IWF) network element of the first network.

2. The method according to claim 1, wherein
the first message further indicates, to the first network device, a connection management status or a radio resource control (RRC) status of the terminal device in the first network; and
the connection management status comprises a connection management connected state and a connection management idle state, and the RRC status comprises a RRC connected state, a RRC idle state, and a RRC inactive state.

3. The method according to claim 1, further comprising:
sending, by the terminal device, a fourteenth message to the first network device, wherein the fourteenth message indicates, to the first network device, a connection management status or a radio resource control (RRC) status of the terminal device in the first network,
wherein the connection management status comprises a connection management connected state and a connection management idle state, and the RRC status comprises a RRC connected state, a RRC idle state, and a RRC inactive state.

4. The method according to claim 1, further comprising:
receiving, by the terminal device, a fifteenth message from the first network device, wherein the fifteenth message indicates, to the terminal device, a connection management status or a radio resource control (RRC) status of the terminal device in the first network, and wherein the connection management status comprises a connection management connected state and a connection management idle state, and the RRC status comprises a RRC connected state, a RRC idle state, and a RRC inactive state.

5. The method according to claim 1, wherein
the first message further indicates at least one of:
information about forwarded data, wherein the information about the forwarded data comprises at least one of: a protocol data unit (PDU) session identifier, a quality of service (QoS) flow identifier, a data radio bearer (DRB) identifier, a mapping list between a DRB and a QoS flow, and transmission status information of data on the DRB, or
a cause for data forwarding, wherein the cause for data forwarding comprises inter-network mobility.

6. The method according to claim 1, further comprising:
sending, by the terminal device, a ninth message to the first network device, wherein the ninth message indicates that the terminal device has not moved from the first network to the second network; or
sending, by the terminal device, a tenth message to the first network device, wherein the tenth message indicates that the terminal device has moved from the first network to the second network.

7. The method according to claim 6, further comprising:
after the sending the ninth message to the first network device, receiving, by the terminal device, a sixteenth message responsive to the ninth message from the first network device, wherein the sixteenth message indicates the terminal device to perform in the first network at least one of: performing radio resource control (RRC) resume, performing RRC reestablishment, performing RRC release, changing or maintaining the connection management status, or establishing or resuming a control plane or user plane bearer resource; or
after the sending the tenth message to the first network device, receiving, by the terminal device, a seventeenth message responsive to the tenth message from the first network device, wherein the seventeenth message indicates the terminal device to perform in the first network at least one of: performing RRC resume, performing RRC reestablishment, performing RRC release, changing or maintaining the connection management status, or establishing or resuming a control plane or user plane bearer resource.

8. The method according to claim 7, wherein
at least one of the ninth message or the sixteenth message comprises a cause value, and the cause value indicates that the terminal device has not moved from the first network to the second network; and
at least one of the tenth message or the seventeenth message comprises a cause value, and the cause value indicates that the terminal device has moved from the first network to the second network.

9. The method according to claim 1, wherein
the second network is a public land mobile network (PLMN) network.

10. The method according to claim 1, wherein
the N3IWF network element of the first network is connected to the terminal device after the terminal device moves from the first network to the second network.

11. A terminal device, comprising:
at least one processor;
a memory configured to store a computer program that, when executed by the at least one processor, causes the at least one processor to:
determine a first message, wherein the first message indicates that the terminal device is to move from a first network, which is a non-public network (NPN), to a second network, which is a public network; and
send the first message to a first network device in the first network, wherein
the first network device is an access and mobility management function (AMF) network element or an access network device, and
the first message includes address information of a non-third generation partnership project interworking function (N3IWF) network element of the first network, the N3IWF network element connected to the terminal device after the terminal device moves from the first network to the second network.

12. The terminal device according to claim 11, wherein
the first message, or a fourteenth message sent to the first network device by the at least one processor executing the computer program, further indicates, to the first network device, a connection management status or a radio resource control (RRC) status of the terminal device in the first network; and
the connection management status comprises a connection management connected state and a connection management idle state, and the RRC status comprises a RRC connected state, a RRC idle state, and a RRC inactive state.

13. The terminal device according to claim 11, wherein
the first message also indicates forwarded data of an NPN protocol data unit (PDU) session of the terminal device when the terminal device is in a service range of the first network, and enables the first network device to indicate the forwarded data to the N3IWF network element by using radio access network (RAN) status transfer signaling.

14. The terminal device according to claim 11, wherein
the computer program, when executed by the at least one processor, further causes the at least one processor to:
receive a fifteenth message from the first network device, wherein the fifteenth message indicates, to the terminal device, a connection management status or a radio resource control (RRC) status of the terminal device in the first network; and
the connection management status comprises a connection management connected state and a connection management idle state, and the RRC status comprises a RRC connected state, a RRC idle state, and a RRC inactive state.

15. The terminal device according to claim 11, wherein
the first message further indicates at least one of:
information about forwarded data, wherein the information about the forwarded data comprises at least one of: a protocol data unit (PDU) session identifier, a quality of service (QoS) flow identifier, a data radio bearer (DRB) identifier, a mapping list between a DRB and a QoS flow, and transmission status information of data on the DRB, or
a cause for data forwarding, wherein the cause for data forwarding comprises inter-network mobility.

16. The terminal device according to claim 11, wherein
the computer program, when executed by the at least one processor, further causes the at least one processor to:

send a ninth message to the first network device, wherein the ninth message indicates that the terminal device has not moved from the first network to the second network; or send a tenth message to the first network device, wherein the tenth message indicates that the terminal device has moved from the first network to the second network.

17. The terminal device according to claim 16, wherein the computer program, when executed by the at least one processor, further causes the at least one processor to:

after the terminal device sends the ninth message to the first network device, receive a sixteenth message responsive to the ninth message from the first network device, wherein the sixteenth message indicates the terminal device to perform in the first network at least one of: performing radio resource control (RRC) resume, performing RRC reestablishment, performing RRC release, changing or maintaining the connection management status, or establishing or resuming a control plane or user plane bearer resource; or after the terminal device sends the tenth message to the first network device, receive a seventeenth message responsive to the tenth message from the first network device, wherein the seventeenth message indicates the terminal device to perform in the first network at least one of: performing RRC resume, performing RRC reestablishment, performing RRC release, changing or maintaining the connection management status, or establishing or resuming a control plane or user plane bearer resource.

18. The terminal device according to claim 17, wherein at least one of the ninth message or the sixteenth message comprises a cause value, and the cause value indicates that the terminal device has not moved from the first network to the second network; and at least one of the tenth message or the seventeenth message comprises a cause value, and the cause value indicates that the terminal device has moved from the first network to the second network.

19. The terminal device according to claim 11, wherein second network is a public land mobile network (PLMN) network.

20. A non-transitory computer-readable storage medium, wherein the non-transitory computer-readable medium stores a computer program; and when the computer program is run on a computer, the computer is enabled to perform operations comprising:

while a terminal device is in a standalone non-public network (SNPN), establishing, by the terminal device, a first NPN protocol data unit (PDU) session of the terminal device via the SNPN, after the terminal device moving from the SNPN to a public network, establishing, by the terminal device, a second NPN PDU session via the public network, the second NPN PDU session established via the public network having a same identifier as the first NPN PDU session established via the SNPN network, determining, by the terminal device, a first message, wherein the first message indicates that the terminal device moves from the SNPN to the public network, and the first message requests to establish a data forwarding channel; and sending, by the terminal device, the first message to a first network device in the SNPN, wherein the first network device is an access and mobility management function AMF network element or an access network device in the SNPN, the first message includes address information of a non-third generation partnership project interworking function (N3IWF) network element of the SNPN, the N3IWF network element connected to the terminal device after the terminal device moves from the SNPN to the public network.

* * * * *